(12) United States Patent
Tour et al.

(10) Patent No.: US 10,505,193 B2
(45) Date of Patent: Dec. 10, 2019

(54) LASER INDUCED GRAPHENE MATERIALS AND THEIR USE IN ELECTRONIC DEVICES

(71) Applicant: WILLIAM MARSH RICE UNIVERSITY, Houston, TX (US)

(72) Inventors: James M. Tour, Bellaire, TX (US); Jian Lin, Houston, TX (US); Zhiwei Peng, Houston, TX (US); Carter Kittrell, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 445 days.

(21) Appl. No.: 15/119,516

(22) PCT Filed: Feb. 17, 2015

(86) PCT No.: PCT/US2015/016165
§ 371 (c)(1),
(2) Date: Aug. 17, 2016

(87) PCT Pub. No.: WO2015/175060
PCT Pub. Date: Nov. 19, 2015

(65) Prior Publication Data
US 2017/0062821 A1    Mar. 2, 2017

Related U.S. Application Data

(60) Provisional application No. 61/940,772, filed on Feb. 17, 2014, provisional application No. 62/005,350, filed on May 30, 2014.

(51) Int. Cl.

| | |
|---|---|
| *H01M 4/587* | (2010.01) |
| *H01M 4/32* | (2006.01) |
| *H01M 4/66* | (2006.01) |
| *H01M 10/0525* | (2010.01) |
| *C01B 32/184* | (2017.01) |
| *H01G 11/06* | (2013.01) |
| *H01G 11/70* | (2013.01) |
| *H01M 4/62* | (2006.01) |
| *H01G 11/36* | (2013.01) |
| *C08G 73/10* | (2006.01) |
| *H01G 11/68* | (2013.01) |
| *H01M 4/36* | (2006.01) |
| *H01M 10/054* | (2010.01) |

(52) U.S. Cl.
CPC .......... *H01M 4/587* (2013.01); *C01B 32/184* (2017.08); *C08G 73/10* (2013.01); *H01G 11/36* (2013.01); *H01G 11/68* (2013.01); *H01M 4/366* (2013.01); *H01M 4/625* (2013.01); *H01M 4/663* (2013.01); *H01M 10/054* (2013.01); *H01M 10/0525* (2013.01); *C01B 2204/04* (2013.01); *C01P 2006/40* (2013.01); *H01G 11/06* (2013.01); *H01G 11/70* (2013.01); *Y02E 60/13* (2013.01)

(58) Field of Classification Search
CPC ...... H01M 4/366; H01M 4/587; H01M 4/625; H01M 4/663; H01M 10/0525; H01M 10/054; C01B 32/184; C01B 2204/04; C08G 73/10; C01P 2006/40; H01G 11/06; H01G 11/36; H01G 11/68; H01G 11/70; Y02E 60/13
See application file for complete search history.

(56) References Cited

U.S. PATENT DOCUMENTS

| | | | |
|---|---|---|---|
| 5,978,391 A | 11/1999 | Das et al. | |
| 8,075,864 B2 * | 12/2011 | Choi | B82Y 30/00 423/448 |
| 2006/0176917 A1 | 8/2006 | Grek et al. | |
| 2010/0096595 A1 | 4/2010 | Prud'Homme et al. | |
| 2010/0284156 A1 | 11/2010 | Tour et al. | |
| 2012/0048195 A1 | 3/2012 | Lin | |
| 2012/0196074 A1* | 8/2012 | Ago | B82Y 30/00 428/64.1 |
| 2012/0258587 A1 | 10/2012 | Kub et al. | |

(Continued)

FOREIGN PATENT DOCUMENTS

| | | |
|---|---|---|
| CN | 101607707 A | 12/2009 |
| WO | WO-2011112598 | 9/2011 |

(Continued)

OTHER PUBLICATIONS

Extended European Search Report for EP15793409.2, dated Jan. 29, 2018.

(Continued)

*Primary Examiner* — Anca Eoff
(74) *Attorney, Agent, or Firm* — Winstead PC

(57) ABSTRACT

In some embodiments, the present disclosure pertains to methods of producing a graphene material by exposing a polymer to a laser source. In some embodiments, the exposing results in formation of a graphene from the polymer. In some embodiments, the methods of the present disclosure also include a step of separating the formed graphene from the polymer to form an isolated graphene. In some embodiments, the methods of the present disclosure also include a step of incorporating the graphene material or the isolated graphene into an electronic device, such as an energy storage device. In some embodiments, the graphene is utilized as at least one of an electrode, current collector or additive in the electronic device. Additional embodiments of the present disclosure pertain to the graphene materials, isolated graphenes, and electronic devices that are formed by the methods of the present disclosure.

45 Claims, 63 Drawing Sheets

(56) References Cited

U.S. PATENT DOCUMENTS

| | | | | |
|---|---|---|---|---|
| 2012/0264207 | A1* | 10/2012 | Sharpe | G03C 1/733 |
| | | | | 435/307.1 |
| 2012/0265122 | A1 | 10/2012 | El-Shall et al. | |
| 2013/0095389 | A1 | 4/2013 | Bhardwaj et al. | |
| 2013/0230709 | A1 | 9/2013 | Zhou et al. | |
| 2013/0235509 | A1 | 9/2013 | Ruoff et al. | |
| 2013/0273260 | A1* | 10/2013 | Chueh | B82Y 30/00 |
| | | | | 427/555 |
| 2013/0295367 | A1 | 11/2013 | Compton et al. | |
| 2014/0212596 | A1* | 7/2014 | Jahangiri-Famenini | |
| | | | | B82Y 30/00 |
| | | | | 427/551 |

FOREIGN PATENT DOCUMENTS

| | | |
|---|---|---|
| WO | WO-2013119295 | 8/2013 |
| WO | WO-2014009835 | 1/2014 |
| WO | WO-2016133571 | 8/2016 |

OTHER PUBLICATIONS

Office Action for Israeli Patent Application No. 247294, dated Feb. 27, 2018.

Office Action for Chinese Patent Application No. 201580019802.X, dated Feb. 6, 2018.

International Search Report and Written Opinion for PCT/US15/16165, dated Dec. 28, 2015.

International Preliminary Report on Patentability for PCT/US15/16165, dated Sep. 1, 2016.

Pech, D.; Brunet, M.; Durou, H.; Huang, P.; Mochalin, V.; Gogotsi, Y.; Taberna, P.-L.; Simon, P. Ultrahigh-Power Micrometre-Sized Supercapacitors Based on Onion-Like Carbon. Nat. Nanotechnol. 2010, 5, 651-654.

El-Kady, M. F.; Kaner, R. B. Scalable Fabrication of High-Power Graphene Micro-Supercapacitors for Flexible and on-Chip Energy Storage. Nat. Commun. 2013, 4, 1475.

El-Kady, M. F.; Strong, V.; Dubin, S.; Kaner, R. B. Laser Scribing of High-Performance and Flexible Graphene-Based Electrochemical Capacitors. Science 2012, 335, 1326-1330.

Zhu, Y.; Murali, S.; Stoller, M. D.; Ganesh, K.; Cai, W.; Ferreira, P. J.; Pirkle, A.; Wallace, R. M.; Cychosz, K. A.; Thommes, M. Carbon-Based Supercapacitors Produced by Activation of Graphene. Science 2011, 332, 1537-1541.

Zhang, L. L.; Zhao, X., Carbon-Based Materials as Supercapacitor Electrodes. Chem. Soc. Rev. 2009, 38 (9), 2520-2531.

Wu, Z. S.; Parvez, K.; Feng, X.; Müllen, K., Graphene-Based in-Plane Micro-Supercapacitors with High Power and Energy Densities. Nat. Commun. 2013, 4.

Chmiola, J.; Largeot, C.; Taberna, P.-L.; Simon, P.; Gogotsi, Y., Monolithic Carbide-Derived Carbon Films for Micro-Supercapacitors. Science 2010, 328 (5977), 480-483.

Gao, W.; Singh, N.; Song, L.; Liu, Z.; Reddy, A. L. M.; Ci, L.; Vajtai, R.; Zhang, Q.; Wei, B.; Ajayan, P. M., Direct Laser Writing of Micro-Supercapacitors on Hydrated Graphite Oxide Films. Nat. Nanotechnol. 2011, 6 (8), 496-500.

Futaba, D. N. et al. Shape-engineerable and highly densely packed single-walled carbon nanotubes and their application as supercapacitor electrodes. Nat. Mater. 5, 987-994 (2006).

Miller, J. R., Outlaw, R. A. & Holloway, B. C. Graphene Double-Layer Capacitor with ac Line-Filtering Performance. Science 329, 1637-1639 (2010).

Dai, L. Functionalization of Graphene for Efficient Energy Conversion and Storage. Acc. Chem. Res. 2012, 46, 31-42.

Xia, J.; Chen, F.; Li, J.; Tao, N. Measurement of the Quantum Capacitance of Graphene. Nat. Nanotechnol. 2009, 4, 505-509.

Chen, S.; Zhu, J.; Wu, X.; Han, Q.; Wang, X. Graphene Oxide-MnO2 Nanocomposites for Supercapacitors. ACS Nano 2010, 4, 2822-2830.

Zhu, Y.; Li, L.; Zhang, C.; Casillas, G.; Sun, Z.; Yan, Z.; Ruan, G.; Peng, Z.; Raji, A.-R. O.; Kittrell, C. A Seamless Three-Dimensional Carbon Nanotube Graphene Hybrid Material. Nat. Commun. 2012, 3, 1225.

Wen, Z.; Wang, X.; Mao, S.; Bo, Z.; Kim, H.; Cui, S.; Lu, G.; Feng, X.; Chen, J. Crumpled Nitrogen-Doped Graphene Nanosheets with Ultrahigh Pore Volume for High-Performance Supercapacitor. Adv. Mater. 2012, 24, 5610-5616.

Liu, C.-L.; Chang, K.-H.; Hu, C.-C.; Wen, W.-C. Microwave-Assisted Hydrothermal Synthesis of Mn3O4 Reduced Graphene Oxide Composites for High Power Supercapacitors. J. Power Sources 2012, 217, 184-192.

Zhang, C.; Peng, Z.; Lin, J.; Zhu, Y.; Ruan, G.; Hwang, C.-C.; Lu, W.; Hauge, R. H.; Tour, J. M. Splitting of a Vertical Multiwalled Carbon Nanotube Carpet to a Graphene Nanoribbon Carpet and Its Use in Supercapacitors. ACS Nano 2013, 7, 5151-5159.

Lin, J.; Zhang, C.; Yan, Z.; Zhu, Y.; Peng, Z.; Hauge, R. H.; Natelson, D.; Tour, J. M. 3-Dimensional Graphene Carbon Nanotube Carpet-Based Microsupercapacitors with High Electrochemical Performance. Nano Lett. 2012, 13, 72-78.

Liu, Z. W.; Peng, F.; Wang, H. J.; Yu, H.; Zheng, W. X.; Yang, J. Phosphorus?Doped Graphite Layers with High Electrocatalytic Activity for the O2 Reduction in an Alkaline Medium. Angew. Chem. 2011, 123, 3315-3319.

Yang, Z.; Yao, Z.; Li, G.; Fang, G.; Nie, H.; Liu, Z.; Zhou, X.; Chen, X. a.; Huang, S. Sulfur-Doped Graphene as an Efficient Metal-Free Cathode Catalyst for Oxygen Reduction. ACS Nano 2011, 6, 205-211.

Wu, Z. S.; Winter, A.; Chen, L.; Sun, Y.; Turchanin, A.; Feng, X.; Müllen, K. Three-Dimensional Nitrogen and Boron Co-Doped Graphene for High-Performance All-Solid-State Supercapacitors. Adv. Mater. 2012, 24, 5130-5135.

Fujisawa, K.; Cruz-Silva, R.; Yang, K.-S.; Kim, Y. A.; Hayashi, T.; Endo, M.; Terrones, M.; Dresselhaus, M. S. Importance of Open, Heteroatom-Decorated Edges in Chemically Doped-Graphene for Supercapacitor Applications. J. Mater. Chem. A 2014, 2, 9532-9540.

Wu, Z. S.; Parvez, K.; Winter, A.; Vieker, H.; Liu, X.; Han, S.; Turchanin, A.; Feng, X.; Müllen, K. Layer-by-Layer Assembled Heteroatom-Doped Graphene Films with Ultrahigh Volumetric Capacitance and Rate Capability for Micro-Supercapacitors. Adv. Mater. 2014, 26, 4552-4558.

Zuo, Z.; Jiang, Z.; Manthiram, A. Porous B-Doped Graphene Inspired by Fried-Ice for Supercapacitors and Metal-Free Catalysts. J. Mater. Chem. A 2013, 1, 13476-13483.

Han, J.; Zhang, L. L.; Lee, S.; Oh, J.; Lee, K.-S.; Potts, J. R.; Ji, J.; Zhao, X.; Ruoff, R. S.; Park, S. Generation of B-Doped Graphene Nanoplatelets Using a Solution Process and Their Supercapacitor Applications. ACS Nano 2012, 7, 19-26.

Niu, L.; Li, Z.; Hong, W.; Sun, J.; Wang, Z.; Ma, L.; Wang, J.; Yang, S. Pyrolytic Synthesis of Boron-Doped Graphene and Its Application as Electrode Material for Supercapacitors. Electrochim. Acta 2013, 108, 666-673.

Lin, J.; Peng, Z.; Liu, Y.; Ye, R.; Samuel, E. L.; Ruiz-Zepeda, F.; Yacaman, M. J.; Yakobson, B. I.; Tour, J. M. Laser-Induced Porous Graphene Films from Commercial Polymers. Nat. Commun. 2014, 5, 5714.

Lee, S. W.; Gallant, B. M.; Byon, H. R.; Hammond, P. T.; Shao-Horn, Y. Nanostructured Carbon-Based Electrodes: Bridging the Gap between Thin-Film Lithium-Ion Batteries and Electrochemical Capacitors. Energy Environ. Sci. 2011, 4, 1972-1985.

Dong, X.; Su, C.-Y.; Zhang, W.; Zhao, J.; Ling, Q.; Huang, W.; Chen, P.; Li, L.-J. Ultra-Large Single-Layer Graphene Obtained from Solution Chemical Reduction and Its Electrical Properties. Phys. Chem. Chem. Phys. 2010, 12, 2164-2169.

Sheng, Z.-H.; Gao, H.-L; Bao, W.-J.; Wang, F.-B.; Xia, X.-H. Synthesis of Boron Doped Graphene for Oxygen Reduction Reaction in Fuel Cells. J. Mater. Chem. 2012, 22, 390.

Chen, Z.; Ren, W.; Gao, L.; Liu, B.; Pei, S.; Cheng, H.-M., Three-Dimensional Flexible and Conductive Interconnected Graphene Networks Grown by Chemical Vapour Deposition. Nat. Mater. 2011, 10 (6), 424-428.

Notification of Substantive Examination Report for Saudi Arabia Patent Application No. 516371685, dated Jan. 10, 2019.

(56) References Cited

OTHER PUBLICATIONS

Office Action for Chinese Patent Application No. 201580019802.X, dated Dec. 20, 2018.

* cited by examiner

LASER INDUCED GRAPHENE MATERIALS AND THEIR USE IN ELECTRONIC DEVICES

CROSS-REFERENCE TO RELATED APPLICATIONS

This application claims priority to U.S. Provisional Patent Application No. 61/940,772, filed on Feb. 17, 2014; and U.S. Provisional Patent Application No. 62/005,350, filed on May 30, 2014. The entirety of each of the aforementioned applications is incorporated herein by reference.

STATEMENT REGARDING FEDERALLY SPONSORED RESEARCH

This invention was made with government support under Grant No. FA9550-14-1-0111, awarded by the U.S. Department of Defense; Grant No. FA9550-09-1-0581, awarded by the U.S. Department of Defense; Grant No. FA9550-12-1-0035, awarded by the U.S. Department of Defense; and Grant No. N00014-09-1-1066, awarded by the U.S. Department of Defense. The government has certain rights in the invention.

BACKGROUND

Current methods of making graphene-based electronic materials have numerous limitations in terms of manufacturing efficiency and electrical properties. As such, a need exists for more effective methods of making graphene-based electronic materials.

SUMMARY

In some embodiments, the present disclosure pertains to methods of producing a graphene material. In some embodiments, the methods include exposing a polymer to a laser source. In some embodiments, the exposing results in formation of a graphene that is derived from the polymer.

In some embodiments, the exposure of the polymer to a laser source also includes a step of tuning one or more parameters of the laser source. In some embodiments, the one or more parameters include, without limitation, laser wavelength, laser power, laser energy density, laser pulse width, gas environment, gas pressure, gas flow rate, and combinations thereof.

In some embodiments, the laser source includes, without limitation, a solid state laser source, a gas phase laser source, an infrared laser source, a $CO_2$ laser source, a UV laser source, a visible laser source, a fiber laser source, a near-field scanning optical microscopy laser source, and combinations thereof. In some embodiments, the laser source is a $CO_2$ laser source.

In some embodiments, the polymer is in the form of at least one of sheets, films, pellets, powders, coupons, blocks, monolithic blocks, composites, fabricated parts, electronic circuit substrates, and combinations thereof. In some embodiments, the polymer includes, without limitation, homopolymers, block co-polymers, carbonized polymers, aromatic polymers, vinyl polymers, cyclic polymers, polyimide (PI), polyetherimide (PEI), polyether ether ketone (PEEK), and combinations thereof. In some embodiments, the polymer includes a doped polymer, such as a boron doped polymer.

In some embodiments, the exposing of a polymer to a laser source includes exposing a surface of a polymer to a laser source. In some embodiments, the exposing results in formation of the graphene on the surface of the polymer. In some embodiments, the exposing includes patterning the surface of the polymer with the graphene. In some embodiments, the graphene becomes embedded with the polymer. In some embodiments, a first surface and a second surface of a polymer are exposed to a laser source to form graphenes on both surfaces of the polymer.

In some embodiments, the exposing of a polymer to a laser source results in conversion of the entire polymer to graphene. In some embodiments, the formed graphene material consists essentially of the graphene derived from the polymer. In some embodiments, the methods of the present disclosure also include a step of separating the formed graphene from the polymer to form an isolated graphene.

In some embodiments, the formed graphene includes, without limitation, single-layered graphene, multi-layered graphene, double-layered graphene, triple-layered graphene, doped graphene, porous graphene, unfunctionalized graphene, pristine graphene, functionalized graphene, turbostratic graphene, graphene coated with metal nanoparticles, metal particles coated with graphene, graphene metal carbides, graphene metal oxides, graphene metal chalcogenides, oxidized graphene, graphite, and combinations thereof. In some embodiments, the formed graphene includes porous graphene. In some embodiments, the formed graphene includes doped graphene, such as boron-doped graphene.

In some embodiments, the methods of the present disclosure also include a step of incorporating the graphene material or the isolated graphene into an electronic device. In some embodiments, the electronic device is an energy storage device or an energy generation device, such as a super capacitor or a micro supercapacitor. In some embodiments, the graphene is utilized as an electrode in the electronic device. In some embodiments, the graphene is utilized as a current collector in the electronic device. In some embodiments, the graphene is utilized as an additive in the electronic device.

Additional embodiments of the present disclosure pertain to the graphene materials and the isolated graphenes that are formed by the methods of the present disclosure. In some embodiments, the graphene material includes a polymer and a graphene derived from the polymer. In some embodiments, the graphene is on a surface of the polymer. In some embodiments, the isolated graphene is derived from a polymer and separated from the polymer.

Further embodiments of the present disclosure pertain to electronic devices that are formed by the methods of the present disclosure. In some embodiments, the electronic device has a capacitance ranging from about 2 $mF/cm^2$ to about 1,000 $mF/cm^2$. In some embodiments, the capacitance of the electronic device retains at least 90% of its original value after more than 10,000 cycles. In some embodiments, the electronic device has power densities ranging from about 5 $mW/cm^2$ to about 200 $mW/cm^2$.

DESCRIPTION OF THE FIGURES

FIG. 1 provides schemes and illustrations related to graphene materials and isolated graphenes.

FIG. 2A is a schematic of the synthesis process of LIG from PI. FIG. 2B is a scanning electron microscopy (SEM) image of LIG patterned into an owl shape. The scale bar is 1 µm. The bright contrast corresponds to LIG surrounded by the darker-colored insulating PI substrates. FIG. 2C is an SEM image of the LIG film circled in FIG. 2B. The scale bar is 10 µm. The inset is the corresponding higher magnification SEM image with a scale bar of 1 µm. FIG. 2D provides a cross-sectional SEM image of the LIG film on the PI substrate. The scale bar is 20 µm. The inset is the SEM image showing the porous morphology of LIG with a scale bar of 1 µm. FIG. 2E is a representative Raman spectrum of a LIG film and the starting PI film. FIG. 2F is an X-ray diffraction (XRD) of powdered LIG scraped from the PI film.

FIG. 3A provides photographs of commercial Kapton PI sheets (left) with a 30 cm ruler, and the laser cutting system (right). FIGS. 3B-C provide photographs of an owl and a letter R patterned on PI substrates. The scale bars are 5 mm. In FIGS. 3B-C, black contrast is LIG after exposure to the laser, while the lighter background corresponds to PI. The laser power used to scribe the images was 3.6 W.

FIG. 5A provides XPS surveys of LIG and PI. Comparison curves show that the oxygen and nitrogen peaks were significantly suppressed after PI was converted to LIG. FIG. 5B provides high resolution C1s XPS spectrum of the LIG film and PI, showing the dominant C—C peak. The C—N, C—O and C=O peaks from PI were greatly reduced in the C1s XPS spectrum of LIG, which indicates that LIG was primarily $sp^2$-carbons. FIG. 5C provides high resolution O1s XPS spectrum of a LIG-3.6 W film and PI. After laser conversion, the C—O (533.2 eV) peak becomes more dominant than C=O (531.8 eV). FIG. 5D provides high resolution N1s XPS spectrum of a LIG-3.6 W film and PI. The intensity of the N1s peak was greatly reduced after laser exposure.

FIG. 7A provides a TEM image of a thin LIG flake atop a carbon grid. The scale bar is 200 nm. FIG. 7B provides a TEM image of a thick LIG flake showing entangled tree-like ripples. The scale bar is 100 nm. Inset is the high resolution TEM (HRTEM) image of the yellow-circled region showing the mesoporous structures. The scale bar is 5 nm. FIGS. 7C-D provide TEM images of LIG in bright and dark field view. The scale bar is 10 nm. In dark field view, folded graphene containing several pores between 5 to 10 nm can be seen. These pores indicated in arrows in FIG. 7D result from curvature of the graphene layers induced by abundant pentagon-heptagon pairs.

FIG. 8A provides an HRTEM image taken at the edge of a LIG flake showing few-layer features and highly wrinkled structures. The scale bar is 10 nm. FIG. 8B provides an HRTEM image of LIG. The scale bar is 5 nm. Average lattice space of ~3.4 Å corresponds to the (002) planes of graphitic materials. FIG. 8C provides a Cs-correction scanning TEM (STEM) image taken at the edge of a LIG flake. The scale bar is 2 nm. The image shows an ultra-polycrystalline nature with grain boundaries. FIG. 8D provides a TEM image of selected area indicated as a rectangle in FIG. 8C. It shows a heptagon with two pentagons as well as a hexagon. The scale bar is 5 Å.

FIG. 9A provides a bright-field TEM image of the studied area. The scale bar is 5 nm. FIG. 9B provides a fast fourier transform (FFT) image of the LIG sample. The area has two distinct parts that can be seen on the indexed diffractogram FFT with the hexagonal crystal structure of carbon with lattice parameters a=2.461 Å and c=6.708 Å. The outer circle spots are reflections of the type (10.0) or (1.-1.0), corresponding to the basal plane of graphite 00.1. The layers are, however, very disordered and produce a rotational pattern with d-spacing of 2.10 Å. The inner circle spots are type (00.2), corresponding to a d-spacing of 3.35 Å of the folded layers of graphene containing the cavities. FIG. 9C shows that the FFT filter uses the inner circle of type (00.2) spots and neglects the outer circle of type (10.0) spots, FIG. 9D provides corresponding filtered images from FIG. 9C. The scale bar is 5 nm. The folded graphene structure was enhanced, FIG. 9E shows that the FFT filter uses the outer circle of type (10.0) spots and neglects the inner circle of type (00.2) spots, FIG. 9F shows a corresponding filtered image from FIG. 9E. The scale bar is 5 nm. The disordered graphene structure was enhanced.

FIG. 12A provides atomic percentages of carbon, oxygen and nitrogen as a function of laser power. These values are obtained from high-resolution XPS. The threshold power is 2.4 W, at which conversion from PI to LIG occurs. FIG. 12B provides correlations of the sheet resistance and LIG film thicknesses with laser powers. FIG. 12C provides Raman spectra of LIG films obtained with different laser powers. FIG. 12D provides statistical analysis of ratios of G and D peak intensities (upper panel), and average domain size along a-axis ($L_a$) as a function of laser power (x axis) calculated using eq 4.

FIG. 14A provides a scheme of the backsides of LIG films peeled from PI substrates. FIGS. 14B-D provide SEM images of backsides of LIG films obtained at laser powers of 2.4 W (FIG. 14B); 3.6 W (FIG. 14C); and 4.8 W (FIG. 14D). All of the scale bars are 10 µm. The images show increased pore size as the laser power was increased.

FIG. 15A provides a photograph of patterns induced by lasers on different polymers (PI, PEI and PET) at a laser power of 3.0 W. The two polymers that blackened were PI and PEI. FIG. 15B provides a Raman spectrum of PEI-derived LIG obtained with a laser power of 3.0 W.

FIG. 16A is a digital photograph of LIG-MSCs with 12 interdigital electrodes. The scale bar is 1 mm. FIG. 16B provides an SEM image of LIG electrodes. The scale bar is 200 µm. FIG. 16C is a schematic diagram of LIG-MSCs device architecture. FIGS. 16D-E provide CV curves of LIG-MSCs at scan rates from 20 to 10,000 $mV \cdot s^{-1}$. FIG. 16F provides specific areal capacitance ($C_A$) calculated from CV curves as a function of scan rates. FIGS. 16G-H provide CC curves of LIG-MSCs at discharge current densities ($I_D$) varied from 0.2 to 25 $mA \cdot cm^{-2}$. FIG. 16I provides $C_A$ calculated from CC curves vs. $I_D$. FIGS. 16J-K provide charge density distribution of the states within a voltage window (−0.1, 0.1) V for type I and II polycrystalline sheets. The defects at the grain boundaries are shadowed, and numbers show the misorientation angle between the grains. FIG. 16L provides a carbon layer fully composed of pentagons and heptagons (pentaheptite). FIG. 16N provides calculated quantum capacitance (defined in Example 1) of perfect and polycrystalline/disordered graphene layers.

FIG. 17A is a comparison of CV curves of LIG-MSCs obtained from PI at scan rates of 100 $mV \cdot s^{-1}$. FIG. 17B provides a specific areal capacitances of LIG-MSCs obtained from PI, calculated from CC curves at current densities of 0.2 $mA \cdot cm^{-2}$, as a function of the laser power. FIG. 17C provides a comparison of CV curves of LIG-MSCs obtained from PEI at scan rates of 1 $V \cdot s^{-1}$. FIG. 17D provides specific areal capacitances of LIG-MSCs obtained from PEI, calculated from CC curves at a current density of 0.2 $mA \cdot cm^{-2}$, as a function of the laser power. Compared to PEI derived LIG-MSCs, LIG-MSCs obtained from PI have ~10× higher capacitances prepared at the same laser powers.

FIGS. 19A-B provide CV curves of LIG-MSCs at scan rates from 20 $mV \cdot s^{-1}$ to 5 $V \cdot s^{-1}$. FIG. 19C provides specific areal capacitances vs. scan rates. FIGS. 19D-E provide CC curves of LIG-MSCs at discharge current densities from 0.1 $mA/cm^2$ to 7 $mA/cm^2$. The voltage drop is shown graphically in FIG. 19E. FIG. 19F shows a specific areal capacitances vs. discharge current densities.

FIG. 20A provides specific volumetric capacitances as a function of discharge current densities in 1 M $H_2SO_4$. FIG. 20B provides specific volumetric capacitances as a function of discharge current densities in BMIM-$BF_4$.

FIG. 21A provides CC curves of two tandem LIG-MSCs connected in series with the same discharge current density of 1 $mA/cm^2$. The operation potential window is doubled in serial configuration. FIG. 21B provides CC curves of two tandem LIG-MSCs in parallel assembly with the same discharge current density of 1 $mA/cm^2$. In this configuration, capacitance is almost doubled. FIG. 21C provides CC curves of single LIG-MSCs and 10 parallel LIG-MSCs at discharge current densities of 1 $mA/cm^2$ and 10 $mA/cm^2$, respectively. Current density increases by a factor of 10 with 10 parallel single devices. Inset is a lighted LED powered by 10 parallel LIG-MSCs.

FIG. 22A provides a specific volumetric energy and power densities of energy storage devices. FIG. 22B provides a specific areal energy and power densities of LIG-MSCs and LSG-MSCs. LSG, battery and Al electrolytic capacitor data were reproduced from the literature for comparison.

FIG. 23A shows that capacitance, calculated from CV curves at a scan rate of 100 $mV \cdot s^{-1}$, increases to 114% of the original value after 2750 cycles, and then retains almost the same value after 9000 cycles. FIG. 23B shows that capacitance, calculated from CV curves at a scan rate of 100 $mV \cdot s^{-1}$, degrades to 95.5% of original value after 1000 cycles, and then stabilizes at 93.5% after 7000 cycles.

FIG. 26A provides a synthetic scheme for the preparation of B-LIG and fabrication of the B-LIG-MSC. FIG. 26B provides a scheme of the dehydration reaction from PAA to a PI film during a curing process. FIG. 26C provides SEM images of 5B-LIG. The inset in (FIG. 26C) is the cross sectional SEM image of 5B-LIG on a PI sheet. FIG. 26D shows a TEM image of 5B-LIG. FIG. 26E shows an HRTEM image of 5B-LIG.

FIG. 30A shows the Raman spectrum of 5B-LIG. FIG. 30B shows the XRD pattern of 5B-LIG. FIG.

30C shows the TGA curve of 5B-LIG and 5B-PI at 5° C./min under argon. FIG. 30D shows the pore size distribution of 5B-LIG.

FIG. 33A shows the C1s spectrum. FIG. 33B shows the O1s spectrum. FIG. 33C shows the B1s spectrum. FIG. 33D shows the N1s spectrum.

FIG. 34A provides a schematic of a B-LIG-MSC device and the digital photograph of a fully-fabricated device under bending. FIG. 34B provides CV curves of MSCs from PI derived LIG, PAA derived LIG and PAA/H$_3$BO$_3$ derived LIG at a scan rate of 0.1 V/s. FIG. 34C provides CC curves of MSCs from PI derived LIG and PAA/H$_3$BO$_3$ derived LIG at a current density of 1.0 mA/cm$^2$. FIG. 34D provides CV curves of LIG-MSC and B-LIG-MSC with different H$_3$BO$_3$ loadings. The scan rate is set at 0.1 V/s. FIG. 34E provides Galvanostatic CC curves of LIG-MSC and B-LIG-MSC with different H$_3$BO$_3$ loadings. The current density is set at 1 mA/cm$^2$. FIG. 34F provides a comparison of calculated C$_A$ from LIG-MSC and B-LIG-MSC with different H$_3$BO$_3$ loadings. The current density is at 1 mA/cm$^2$. FIG. 34G provides a chart of LIG-MSC capacitance as a function of current. An expanded schematic of FIG. 34A is also provided.

FIG. 35A shows CV curves of 5B-LIG-MSC at scan rates of 10, 20, 50 and 100 mV/s. FIG. 35B shows galvanostatic CC curves of 5B-LIG-MSC at current densities of 0.1, 0.2 and 0.5 mA/cm$^2$. FIG. 35C shows specific C$_A$ of 5B-LIG-MSC calculated from CC curves as a function of current density. FIG. 35D shows cyclability testing of 5B-LIG-MSC. The charge-discharge cycles are performed at a current density of 1.0 mA/cm$^2$. FIG. 35E shows a digital photograph of a bent 5B-LIG-MSC at a bending radius of 10 mm. FIG. 35F shows capacitance retention of 5B-LIG-MSC at different bending radii. FIG. 35G shows bent cyclability testing of flexible 5B-LIG-MSC at a fixed bending radius of ~10 mm. The C$_p$ is calculated from discharge runtime at a current density of 1.0 mA/cm$^2$. FIG. 35H shows CV curves of the 5B-LIG-MSC at different bending cycles in (FIG. 35G) at a scan rate of 50 mV/s. FIG. 35I shows volumetric Ragone plot of 5B-LIG-MSC and LIG-MSC.

FIG. 36A provides CV curves of 5B-LIG-MSC at scan rates of 0.2, 0.5, 1.0 and 2.0 V/s. FIG. 36B provides CV curves of 5B-LIG-MSC at scan rates of 5, 10, 15 and 20 V/s. FIG. 36C provides galvanostatic CC curves of 5B-LIG-MSC at current densities of 1.0, 2.0 and 5.0 mA/cm$^2$. FIG. 36D provides galvanostatic CC curves of 5B-LIG-MSC at current densities of 10, 20 and 30 mA/cm$^2$.

FIG. 39A is a schematic illustration showing the fabrication process for assembling a single LIG-SC and stacked LIG-SC. FIG. 39B is an optical image of a fully assembled single LIG-SC manually bent. FIG. 39C is a cross-sectional SEM image of a PI substrate with both sides laser induced to form graphene. FIG. 39D is an SEM image of the LIG films showing a porous 3D network. FIG. 39E is a TEM image of a LIG thin film showing nano-sized wrinkles and ripples. The inset is a HRTEM image of a LIG nanosheet showing numerous graphene edges

FIG. 42A provides CV curves of LIG-SCs at scan rates of 5, 10, 20 and 50 mV/s. FIG. 42B provides Galvanostatic CC curves of LIG-SCs at current densities of 0.02, 0.05, 0.10 and 0.20 mA/cm$^2$. FIG. 42C provides specific areal capacitances calculated from CC curves as a function of current density. FIG. 42D provides cyclability testing of LIG-SCs with a CC current density of 0.8 mA/cm$^2$.

FIG. 43A provides a Raman spectrum of LIGs. FIG. 43B provides an XRD spectrum of LIGs.

FIG. 45A provides nitrogen adsorption/desorption curves of LIGs. The calculated surface area is 330 m$^2$/g. FIG. 45B provides pore size distributions of LIGs.

FIG. 46A provides CV curves of LIG-SCs at scan rates of 0.1, 0.2, 0.5 and 1.0 V/s. FIG. 46B provides Galvanostatic CC curves of LIG-SCs at current densities of 0.5, 1.0 and 2.0 mA/cm$^2$.

FIG. 47A provides CV curves of LIG-SC at varying bending radii. The scan rate was 0.02 V/s. FIG. 47B provides capacity retention at different bending radius. Capacitance retention was calculated from CC curves at a current density of 0.05 mA/cm$^2$. FIG. 47C provides cyclability testing of flexible LIG-SCs. Capacitance retention was calculated from CC curves at a current density of 0.4 mA/cm$^2$.

FIG. 48A provides an illustration of a stacked series LIG-SC and its corresponding circuit diagram. FIG. 48B provides an illustration of a stacked parallel LIG-SC and its corresponding circuit diagram. FIG. 48C provides galvanostatic CC curves comparing a single LIG-SC to a stacked series LIG-SC at a current density of 0.5 mA/cm$^2$. FIG. 48D provides galvanostatic CC curves comparing a single LIG-SC to a stacked parallel LIG-SC at a current density of 0.5 mA/cm$^2$. FIG. 48E provides a cyclability testing of a flexible stacked series LIG-SC at a current density of 0.5 mA/cm². Inset shows the initial CV curves (black) and the 4000th CV curve (red) at a scan rate of 0.1 V/s. FIG. 48F shows a cyclability testing of a flexible, stacked parallel LIG-SC at a current density of 1.0 mA/cm². Inset shows the initial CV curves (black) and the 6000$^{th}$ CV curve (red) at a scan rate of 0.1 V/s.

FIG. 49A provides CV curves of series LIG-SCs at scan rates of 5, 10, 20 and 50 mV/s. FIG. 49B provides galvanostatic charge-discharge curves of series LIG-SCs at current densities of 0.1, 0.2 and 0.5 mA/cm².

FIG. 50A provides CV curves of parallel LIG-SCs at scan rate of 10, 20, 50 and 100 mV/s. FIG. 50B provides galvanostatic charge-discharge curves of parallel LIG-SCs at current densities of 0.1, 0.2, 0.5 and 1.0 mA/cm². FIG. 50C provides specific areal capacitance calculated from discharge runtime as a function of current density.

FIG. 51A provides an illustration of a flexible LIG-MSC. The inset is a photograph of a LIG-MSC fixed at a bending radius of 12 mm. FIG. 51B provides CV curves of LIG-MSCs at scan rates of 10, 20, 50 and 100 mV/s. FIG. 51C provides Galvanostatic CC curves of LIG-MSCs at current densities of 0.1, 0.2, 0.5 and 1.0 mA/cm². FIG. 51D provides specific $C_A$ of LIG-MSCs from aqueous 1 M $H_2SO_4$ and PVA/$H_2SO_4$ calculated from CC curves as a function of the current density. FIG. 51E provides capacity retention of LIG-MSC at different bending radii. Capacitance retention was calculated from CC curves at a current density of 0.5 mA/cm². FIG. 51F provides cyclability testing of flexible LIG-MSCs. Capacitance retention was calculated from CC curves at a current density of 0.5 mA/cm².

FIG. 52A provides CV curves of LIG-MSCs at scan rates of 0.2, 0.5, 1.0 and 2.0 V/s. FIG. 52B provides CV curves of LIG-MSCs at scan rates of 5.0, 10 and 20 V/s. FIG. 52C provides CC curves of LIG-MSCs at current densities of 2, 5, 10 and 20 mA/cm².

FIG. 55A provides CC curves of two tandem LIG-MSCs connected in series with the same discharge current density. The operation potential window is doubled in series configuration. FIG. 55B provides CC curves of two tandem LIG-MSCs in parallel assembly with the same discharge current density. In this configuration capacitance is almost doubled. Both tandem devices and the single device were applied with the same discharge/charge current density.

DETAILED DESCRIPTION

Figure 1A:
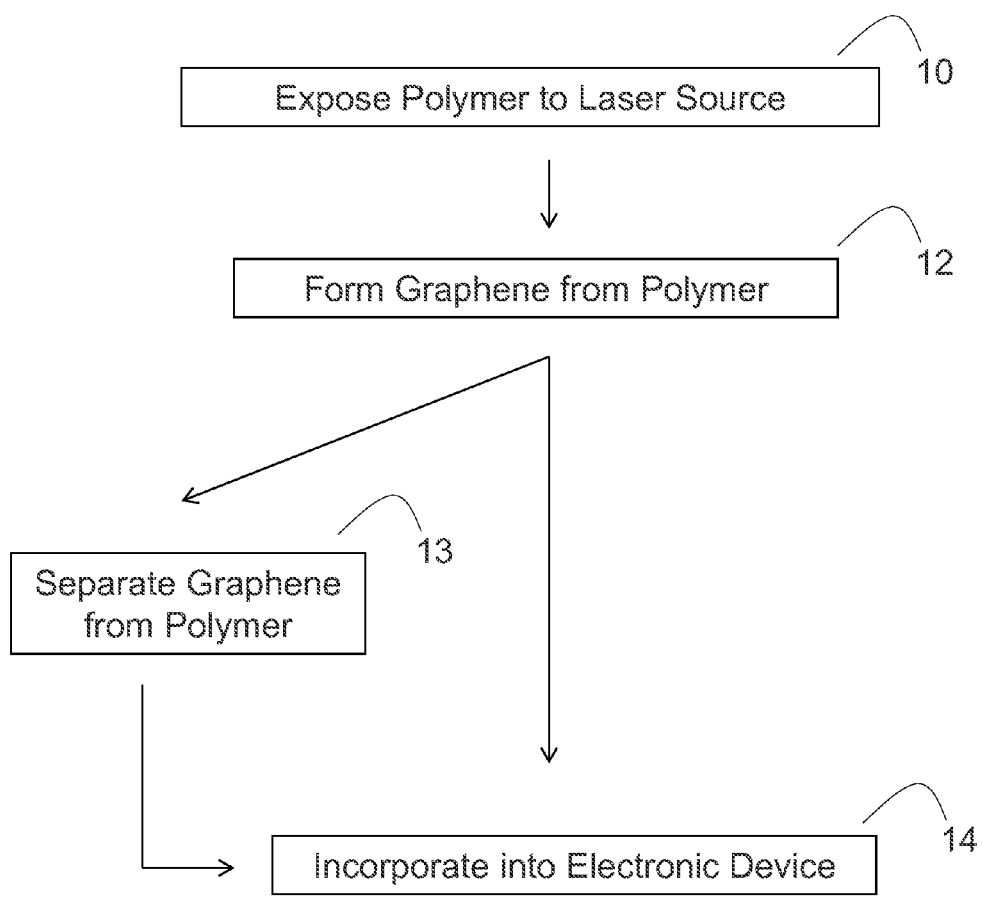
FIG. 1A provides a scheme of methods of making graphene materials and isolated graphenes, and incorporating the products into electronic devices.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Over the past decade, graphene based nanomaterials have been widely studied due to their unique physical and chemical properties. Through synthesis and engineering design, graphene can have porous and 3-dimensional (3D) structures, leading to a wide range of applications from composite fillers to energy storage devices. Despite the tremendous advances, current synthesis methods of porous graphene require either high temperature processing or multi-stepped chemical synthesis routes, thereby lessening their widespread commercial potential. Therefore, straightforward synthesis, and especially patterning, of graphene based nanomaterials in a scalable approach is still a technologically important goal in achieving commercialized microscale energy storage devices.

For instance, glassy carbon has been produced from insulating polyimide via pulsed ultraviolet (UV) laser treatment. However, to Applicants' knowledge, the detailed structural study of the obtained materials, especially at the near-atomic level; the correlation of the materials' structures to their electrochemical performances; and the formation of graphene by this route have not been disclosed.

Moreover, the technique of laser scribing insulating polymers for the fabrication of electronic devices (e.g., energy storage devices, such as microsupercapacitors or MSCs) has not yet been demonstrated. In fact, the cost-effective synthesis and patterning of carbon nanomaterials for incorporation into electronic devices has been a challenge.

Energy storage systems, such as supercapacitors (SCs) and lithium ion batteries (LIBs), have been widely studied over the past few years in order to meet the rapidly growing demand for highly efficient energy devices. Intense ongoing research has focused on miniaturized portable electronics which require small size, light weight and mechanical flexibility while maintaining high energy and power densities. Recent progress in microfabrication technologies has allowed for the in-plane manufacturing of microsupercapacitors (MSCs) made using lithographic techniques that would be suitable for integrated circuits. However, such fabrication methods may not be cost-effective for projected commodity targets, slowing their scalability and commercialization.

Graphene-based materials have been extensively studied as active electrodes in MSCs due to their unique structure and their extraordinary mechanical and electrical properties. To further improve their performance, many methods have been employed to modulate the electronic band structure of the graphene-derived materials. Among them, doping with heteroatoms (such as boron, nitrogen, phosphorus, and sulfur) has been shown to be an effective way to tailor the electrochemical properties of graphene-derived conductive materials and to enhance their capacitive performances. Particularly, substitutions of carbon with boron in the graphene lattice shifts the Fermi level toward the valance band, thereby enhancing charge storage and transfer within the doped graphene structure. Moreover, the presence of boron dopants in graphene contributes to a space-charge-layer capacitance and/or pseudocapacitance, further increasing the apparent capacitance. However, current synthesis processes for obtaining graphene (including boron-doped graphene) require either multi-step chemical reactions or high-temperature and high-vacuum environments, making them unsuitable for low-cost commodity-driven applications.

For example, a recently developed method to make graphene uses laser scribing of graphene oxide (GO) films, where GO is then reduced, patterned, and fabricated to make graphene-based devices that exhibit optimal electrochemical performance. Unfortunately, the synthesis of GO and its subsequent formation into films is still far from commercialization in bulk quantities. Furthermore, recent studies have shown that GO decomposes over time, which can lead to significant current leakage or device changes within GO-derived devices.

As such, a need exists for more effective methods of developing graphene-based materials for various electronic applications. Various embodiments of the present disclosure address this need.

In some embodiments, the present disclosure pertains to methods of producing a graphene material. In some embodiments illustrated in FIG. 1, the methods of the present disclosure include exposing a polymer to a laser source (step 10) to result in the formation of a graphene that is derived from the polymer (step 12). In some embodiments, the methods of the present disclosure also include a step of incorporating the formed graphene material into an electronic device (step 14). In some embodiments, the methods of the present disclosure also include a step of separating the formed graphene from the polymer to form an isolated graphene (step 13), and incorporating the isolated graphene into an electronic device (step 14).

Figure 1B:
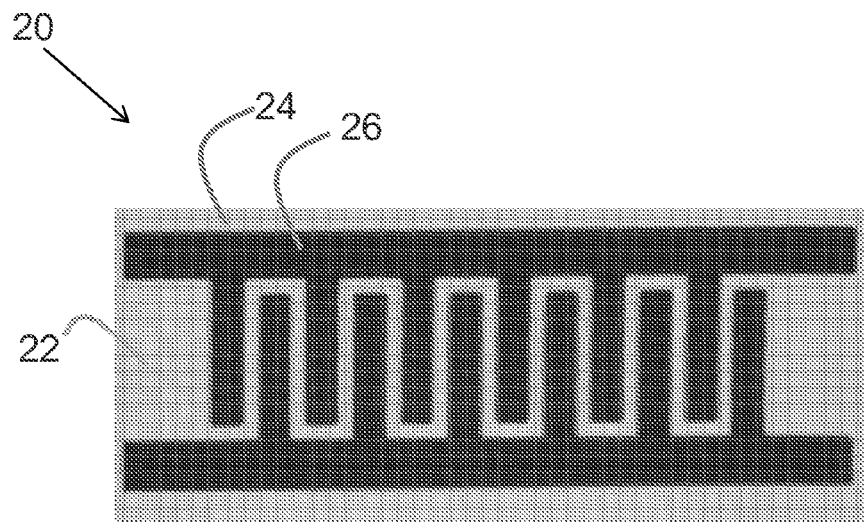
FIG. 1B provides an illustration of a formed graphene material 20.

Additional embodiments of the present disclosure pertain to the graphene materials that are formed by the methods of the present disclosure. An example of a graphene material of the present disclosure is shown in FIG. 1B. In this example, graphene material 20 includes polymer 22 with first surface 24. Graphene material 20 also includes graphene 26 derived from polymer 22. Graphene 26 in this example has an interdigitated pattern on surface 24 of polymer 22.

In some embodiments, the graphene materials and the isolated graphenes of the present disclosure serve as a component of an electronic device. In further embodiments, the present disclosure pertains to electronic devices that contain the graphene materials and isolated graphenes of the present disclosure.

Figure 1C:
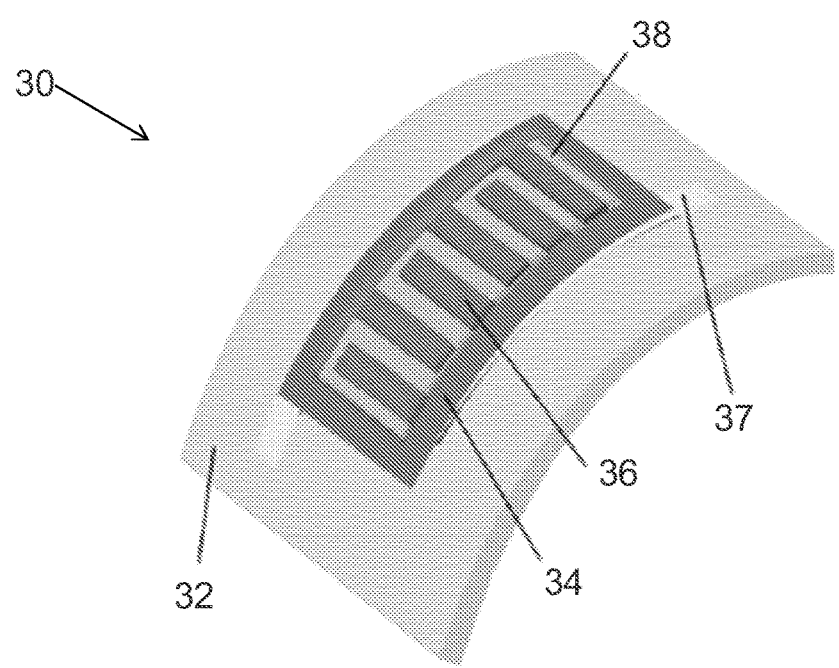
FIG. 1C provides an illustration of a formed electronic device 30.

An example of an electronic device of the present disclosure is shown in FIG. 1C. In this example, electronic device 30 includes polymer 32 and graphene 36 derived from polymer 32. Graphene 36 in this example has an interdigitated pattern and serves as an electrode in electronic device 30. As described in more detail herein, electronic device 30 also includes tape 34, paint 37, and electrolyte 38. In this example, electronic device 30 can serve as an in-plane micro supercapacitor.

Figure 1D:
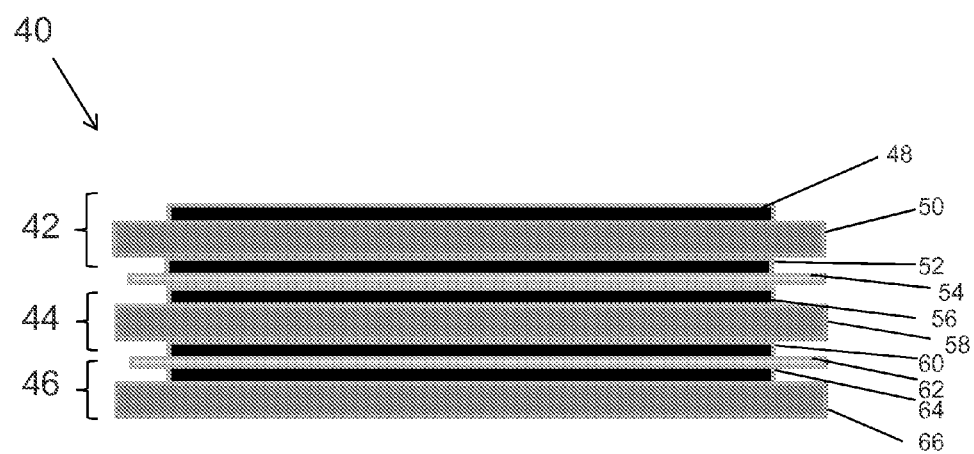
FIG. 1D provides an illustration of a formed electronic device 40.

Another example of an electronic device of the present disclosure is shown in FIG. 1D. In this example, electronic device 40 includes a stack of graphene materials 42, 44 and 46. Graphene material 42 includes polymer 50. Graphene material 42 also includes graphenes 48 and 52 derived from polymer 50. Graphenes 48 and 52 are on opposite sides of polymer 50. Likewise, graphene material 44 includes polymer 58 and graphenes 56 and 60 derived from polymer 58. Graphenes 56 and 60 are on opposite sides of polymer 58. In addition, graphene material 46 includes polymer 66 and graphene 64 derived from polymer 66. Graphene materials 42 and 44 are separated from one another by solid electrolyte 54. Likewise, graphene materials 44 and 46 are separated from one another by solid electrolyte 62. In this example, electronic device 40 can serve as a stacked supercapacitor.

As set forth in more detail herein, various methods may be utilized to expose various polymers to various laser sources to result in the formation of various types of graphenes. Various methods may also be utilized to separate the formed graphenes from the polymers. Various methods may also be utilized to incorporate the formed graphene materials and isolated graphenes of the present disclosure into various electronic devices.

Laser Sources

The polymers of the present disclosure may be exposed to various laser sources. For instance, in some embodiments, the laser source includes, without limitation, a solid state laser source, a gas phase laser source, an infrared laser source, a $CO_2$ laser source, a UV laser source, a visible laser source, a fiber laser source, near-field scanning optical microscopy laser source, and combinations thereof. In some embodiments, the laser source is a UV laser source. In some embodiments, the laser source is a $CO_2$ laser source. Additional laser sources can also be envisioned.

The laser sources of the present disclosure can have various wavelengths. For instance, in some embodiments, the laser source has a wavelength ranging from about 1 nm to about 100 μm. In some embodiments, the laser source has a wavelength ranging from about 20 nm to about 100 μm. In some embodiments, the laser source has a wavelength ranging from about 10 nm to about 400 nm. In some embodiments, the laser source has a wavelength ranging from about 400 nm to about 800 nm. In some embodiments, the laser source has a wavelength ranging from about 1 μm to about 100 μm. In some embodiments, the laser source has a wavelength ranging from about 1 μm to about 50 μm. In some embodiments, the laser source has a wavelength ranging from about 1 μm to about 20 μm. In some embodiments, the laser source has a wavelength ranging from about 5 µm to about 15 µm. In some embodiments, the laser source has a wavelength of about 10 µm. Additional wavelengths can also be envisioned.

In some embodiments, the laser sources of the present disclosure have a wavelength that matches an absorbance band in the absorbance spectrum of a polymer that is being exposed to the laser source. In such embodiments, a more efficient energy transfer from the laser source to the polymer can occur, thereby resulting in conversion of the polymer to graphene in the laser-exposed regions. In some embodiments, a polymer is chosen such that an absorbance band in the polymer matches the excitation wavelength of the laser source.

The laser sources of the present disclosure can also have various power ranges. For instance, in some embodiments, the laser source has a power ranging from about 1 W to about 10 W. In some embodiments, the laser source has a power ranging from about 1 W to about 6 W. In some embodiments, the laser source has a power ranging from about 2 W to about 5 W. In some embodiments, the laser source has a power ranging from about 2 W to about 4 W. In some embodiments, the laser source has a power ranging from about 2 W to about 3 W. In some embodiments, the laser source has powers ranging from about 2.4 W to about 5.4 W. Additional power ranges can also be envisioned. In some embodiments, the laser sources of the present disclosure have power ranges that can vary based upon the absorbance of the polymer at a chosen laser wavelength.

The laser sources of the present disclosure can also have various pulse widths. For instance, in some embodiments, the laser sources of the present disclosure have pulse widths that are in the range of femtoseconds, nanoseconds, or milliseconds. In some embodiments, the laser sources of the present disclosure have pulse widths that range from about 1 femtosecond to about 1 ms. In some embodiments, the laser sources of the present disclosure have pulse widths that range from about 1 femtosecond to about 1 ns. In some embodiments, the laser sources of the present disclosure have pulse widths that range from about 1 µs to about 1 ms. In some embodiments, the laser sources of the present disclosure have pulse widths that range from about 1 µs to about 100 µs. In some embodiments, the laser sources of the present disclosure have pulse widths that range from about 10 µs to about 50 µs. In some embodiments, the laser sources of the present disclosure have pulse widths of about 15 µs. Additional pulse widths can also be envisioned.

In some embodiments, the laser source is a $CO_2$ laser source with a wavelength of about 10.6 µm. As set forth in more detail in the Examples herein, Applicants have observed that the application of $CO_2$ laser sources to polymer surfaces (e.g., polyimides) at wavelengths of about 10.6 µm provides porous graphenes with optimal electrical properties.

The use of additional laser sources at different wavelengths can also be envisioned. For instance, in some embodiments, the polymers of the present disclosure may be exposed to a single laser source. In some embodiments, the polymers of the present disclosure may be exposed to two or more laser sources. In some embodiments, the polymers of the present disclosure may be simultaneously exposed to two or more laser sources. In some embodiments, the two or more laser sources may have the same or different wavelengths, power ranges, and pulse widths.

Exposure of a Polymer to a Laser Source

Various methods may be utilized to expose polymers to a laser source. In some embodiments, the exposure occurs manually. In some embodiments, the exposure occurs automatically. For instance, in some embodiments, the exposure occurs automatically through computer-controlled mechanisms. In some embodiments, the exposure occurs automatically through a computer patterning system. In some embodiments, the exposure occurs automatically through automated processing lines. In some embodiments, the exposure occurs automatically through automated processing lines with multiple laser sources. In some embodiments, the multiple laser sources could vary in wavelength or power to cause different degrees of graphene formation over different regions of the polymer.

In some embodiments, the exposure of polymers to a laser source includes pulsed laser irradiation. In some embodiments, the exposure of polymers to a laser source includes continuous laser irradiation. In some embodiments, the exposure of polymers to a laser source includes patterning a surface of the polymer with the formed graphene. For instance, in some embodiments, the surface of the polymer is patterned into interdigitated shapes.

In some embodiments, the exposure of a polymer to a laser source includes a step of tuning one or more parameters of the laser source. In some embodiments, the one or more tunable parameters of the laser source include, without limitation, laser wavelength, laser power, laser energy density, laser pulse widths, gas environment, gas pressure, gas flow rate, and combinations thereof.

In some embodiments, the one or more parameters of a laser source are tuned according to one or more attributes of the exposed polymer. In some embodiments, the one or more attributes of the exposed polymer include, without limitation, polymer type, polymer thickness, polymer morphology, polymer structure, polymer absorbance spectrum, a substrate upon which a polymer may be affixed, and combinations thereof.

In some embodiments, the one or more parameters of a laser source are tuned in order to maximize the absorption of the laser wavelength by the polymer. For instance, in some embodiments, the laser wavelength of the laser source is tuned to match an absorbance band of a polymer. In some embodiments, such tuning optimizes laser light absorbance by the polymer and results in optimal graphene formation upon laser-polymer interaction. In some embodiments, the absorbance band of the polymer corresponds to the wavelength of the laser source.

In some embodiments, the one or more parameters of a laser source are tuned in order to control the penetration depth of the laser wavelength by the polymer. In some embodiments, the penetration depth (or absorption depth) of a laser source is maximized by tuning the wavelength of the laser source. As such, in some embodiments, a strongly absorbed wavelength can be focused on a polymer surface to create a desired form of graphene. Moreover, the availability to choose from many wavelengths can allow for selection of a wide range of penetration depths into a polymer or type of polymer by changing the wavelength of the laser source. This in turn allows for controlling the depth of the formed graphene and the type of polymer from which graphene can be formed. For instance, in some embodiments, the laser source can be tuned to create a narrow and shallow line of graphene on a surface of a polymer by using a well-focused laser at lower power ranges.

In some embodiments, the exposure of a polymer to a laser source includes a step of tuning one or more parameters of the polymer. For instance, in some embodiments, a polymer's absorbance band can be tuned to match the excitation wavelength of a laser source. In some embodiments, the tuning occurs by modifying the structure of the polymer. In some embodiments, the modification can ensure optimal graphene formation upon laser-polymer interaction. In some embodiments, the absorbance band of a polymer can be modified to match the excitation wavelength of the laser source by adding a compound to the polymer that absorbs well at the excitation wavelength of the laser source.

In some embodiments, the exposure of a polymer to a laser source can include the utilization of optical microscopic techniques. In some embodiments, the microscopic techniques can be used to provide nanometer-scaled patterns of graphene on the polymer surface. For instance, in some embodiments, near-field scanning optical microscopy (NSOM) can be used during the exposure of a surface of a polymer to a laser source to provide nanometer-scaled patterns of graphene on the polymer surface. In some embodiments, the nanometer-scaled patterns of graphene on the polymer surface can have resolutions of about 20 nm.

Polymers

The laser sources of the present disclosure may be applied to various types of polymers. For instance, in some embodiments, the polymers of the present disclosure include, without limitation, vinyl polymers, homopolymers, block copolymers, carbonized polymers, aromatic polymers, cyclic polymers, polyimide (PI), polyetherimide (PEI), polyether ether ketone (PEEK), and combinations thereof. In some embodiments, the polymers of the present disclosure include polyimides.

In some embodiments, the polymers of the present disclosure may be chosen based on the chosen laser source. For instance, in some embodiments, a polymer with an absorbance wavelength may be exposed to a laser source with a matching laser excitation wavelength.

In some embodiments, the polymers of the present disclosure lack graphite oxides. In some embodiments, the polymers of the present disclosure lack graphene oxides. In some embodiments, the polymers of the present disclosure include aromatic monomers. The use of additional polymers can also be envisioned.

The polymers of the present disclosure may also be modified in various manners. For instance, in some embodiments, the polymers of the present disclosure may include doped polymers. In some embodiments, the doped polymers of the present disclosure may be doped with one or more dopants. In some embodiments, the one or more dopants include, without limitation, heteroatoms, metals, metal oxides, metal chalcogenides, metal nanoparticles, metal salts, organic additives, inorganic additives, metal organic compounds, and combinations thereof. In some embodiments, the one or more dopants include, without limitation, molybdenum, tungsten, iron, cobalt, manganese, magnesium, copper, gold, palladium, nickel, platinum, ruthenium, metal chalcogenides, metal halides, metal acetates, metal acetoacetonates, related salts thereof, and combinations thereof.

In some embodiments, the polymers of the present disclosure may be doped with one or more metal salts. In some embodiments, the metal salts include, without limitation, iron acetylacetonate, cobalt acetylacetonate, molyddenyl acetylacetonate, nickel acetylacetonate, iron chloride, cobalt chloride, and combinations thereof.

In some embodiments, the doped polymers of the present disclosure include heteroatom-doped polymers. In some embodiments, the heteroatom-doped polymers of the present disclosure include, without limitation, boron-doped polymers, nitrogen-doped polymers, phosphorus-doped polymers, sulfur-doped polymers, and combinations thereof. In some embodiments, the heteroatom-doped polymers of the present disclosure include boron-doped polymers. In some embodiments, the doped polymers of the present disclosure are in the form of polymer composites.

The dopants that are associated with the doped polymers of the present disclosure can have various shapes. For instance, in some embodiments, the dopants can be in the form of nanostructures. In some embodiments, the nanostructures can include, without limitation, nanoparticles, nanowires, nanotubes, and combinations thereof. Additional dopant structures can also be envisioned.

In some embodiments, the polymers of the present disclosure include carbonized polymers. In some embodiments, the carbonized polymers include glassy or amorphous carbons. In some embodiments, the polymers of the present disclosure are carbonized by annealing at high temperatures (e.g., temperatures ranging from about 500° C. to about 2,000° C.).

In some embodiments, the polymers of the present disclosure include chemically treated polymers. For instance, in some embodiments, the polymers of the present disclosure are chemically treated in order to enhance their surface areas. In some embodiments, the polymers of the present disclosure are thermally treated with a base, such as potassium hydroxide.

The polymers of the present disclosure can have various shapes. For instance, in some embodiments, the polymers of the present disclosure are in the form of a sheet or a film, such as a flat sheet or film. In some embodiments, the polymers of the present disclosure include commercially available polyimide (PI) films. In some embodiments, the polymers of the present disclosure are in the form of a powder. In some embodiments, the polymers of the present disclosure are in the form of pellets. In some embodiments, the polymers of the present disclosure are in the form of a coupon. In some embodiments, the polymers of the present disclosure are in the form of a block. In some embodiments, the polymers of the present disclosure are in the form of a fabricated part, such an aircraft wing. In some embodiments, the polymers of the present disclosure are in the form of an electronics circuit substrate. In some embodiments, the polymers of the present disclosure are in the form of a monolithic block. In some embodiments, the polymers of the present disclosure are in the form of a composite.

In some embodiments, the polymers of the present disclosure are in the form of squares, circles, rectangles, triangles, trapezoids, spheres, pellets, and other similar shapes. In some embodiments, the polymers of the present disclosure are in the form of rectangles. In some embodiments, the polymers of the present disclosure are in the form of films. In some embodiments, the polymers of the present disclosure are in the form of rolls of films.

The polymers of the present disclosure can also have various sizes. For instance, in some embodiments, the polymers of the present disclosure have lengths or widths that range from about 100 m to about 1 mm. In some embodiments, the polymers of the present disclosure have lengths or widths that range from about 100 cm to about 10 mm. In some embodiments, the polymers of the present disclosure have lengths or widths that range from about 10 cm to about 1 cm. In some embodiments, the polymers of the present disclosure are in the form of rolls of films that are 100 m long and 1 m wide.

The polymers of the present disclosure can also have various thicknesses. For instance, in some embodiments, the polymers of the present disclosure have thicknesses that range from about 10 cm to about 1 µm. In some embodiments, the polymers of the present disclosure have thicknesses that range from about 1 cm to about 1 mm. In some embodiments, the polymers of the present disclosure have thicknesses that range from about 0.3 nm to about 1 cm. In some embodiments, the polymers of the present disclosure have thicknesses that range from about 10 mm to about 1 mm.

The polymers of the present disclosure can also have various properties. For instance, in some embodiments, the polymers of the present disclosure are optically transparent. In some embodiments, the polymers of the present disclosure are rigid. In some embodiments, the polymers of the present disclosure are flexible. In some embodiments, the polymers of the present disclosure are thermally stable (over 500° C.).

Graphene Formation

Graphenes may form from various polymers in various manners. For instance, in some embodiments, the exposing of a polymer to a laser source includes exposing a surface of a polymer to a laser source. In some embodiments, the exposing results in formation of the graphene on the surface of the polymer.

Graphene can form on surfaces of polymers in various manners. For instance, in some embodiments, the graphenes form a pattern on a surface of the polymer. In some embodiments, the graphene becomes embedded with the polymer. In some embodiments, the graphene forms on an outside surface of the polymer.

In some embodiments, the polymer includes a first surface and a second surface. In some embodiments, the first surface is exposed to the laser source. As a result, the graphene forms on the first surface of the polymer. In some embodiments, the first surface and the second surface of the polymer are exposed to the laser source. As a result, the graphene forms on the first surface and the second surface of the polymer. In some embodiments, the first surface and the second surface are on opposite sides of the polymer. As a result, the graphene can form on opposite sides of the polymer in some embodiments.

In some embodiments, the exposing of a polymer to a laser source results in conversion of the entire polymer to graphene (e.g., embodiments where the polymer is in powder form). In some embodiments, the formed graphene material consists essentially of the graphene derived from the polymer.

In some embodiments, the graphene forms in a three-dimensional pattern from a polymer. As such, in some embodiments, the methods of the present disclosure can be utilized for the three-dimensional printing of graphene.

Without being bound by theory, it is envisioned that graphene can form from polymers by various mechanisms. For instance, in some embodiments, graphene forms by conversion of $sp^3$-carbon atoms of polymers to $sp^2$-carbon atoms. In some embodiments, graphene forms by photothermal conversion. In some embodiments, graphene is formed by photochemical conversion. In some embodiments, graphene is formed by both photochemical and photothermal conversion.

In some embodiments, graphene forms by extrusion of one or more elements. In some embodiments, the one or more elements can include, without limitation, hydrogen, oxygen, nitrogen, sulfur, and combinations thereof.

Separation of Formed Graphenes from Polymers

In some embodiments, the methods of the present disclosure also include a step of separating the formed graphenes from the polymer. The separated graphenes are referred to herein as isolated graphenes.

Various methods may be utilized to separate formed graphenes from polymers. In some embodiments, separating occurs chemically, such as by dissolving the polymer. In some embodiments, separating occurs mechanically, such as by mechanically stripping the graphene from the polymer. In some embodiments, separating occurs by scraping the formed graphene from a surface of a polymer. Additional methods by which to separate formed graphenes from polymers can also be envisioned.

Formed Graphenes

The methods of the present disclosure may be utilized to form various types of graphenes. As set forth previously, the formed graphenes may be associated with or separated from polymers.

In some embodiments, the graphenes of the present disclosures include, without limitation, single-layered graphene, multi-layered graphene, double-layered graphene, triple-layered graphene, doped graphene, porous graphene, unfunctionalized graphene, pristine graphene, functionalized graphene, turbostratic graphene, oxidized graphene, graphite, graphene coated with metal nanoparticles, metal particles coated with graphene, graphene metal carbides, graphene metal oxides, graphene metal chalcogenides, and combinations thereof. In some embodiments, the graphenes of the present disclosure lack graphene oxides.

In some embodiments, the graphenes of the present disclosure includes porous graphene. In some embodiments, the porous graphenes include mesoporous graphenes, microporous graphenes, and combinations thereof. In some embodiments, the pores in the porous graphenes include diameters between about 1 nanometer to about 5 micrometers. In some embodiments, the pores include mesopores with diameters of less than about 50 nm. In some embodiments, the pores include mesopores with diameters of less than about 9 nm. In some embodiments, the pores include mesopores with diameters between about 1 µm and about 500 µm. In some embodiments, the pores include mesopores with diameters between about 5 nm and about 10 nm. In some embodiments, the pores include mesopores with diameters between about 1 µm and about 500 µm. In some embodiments, the pores include micropores with diameters of less than about 2 nm. In some embodiments, the pores include micropores with diameters that range from about 1 nm to about 1 µm. Additional pore diameters can also be envisioned.

In some embodiments, the graphenes of the present disclosure include doped graphene. In some embodiments, the doped graphenes are doped with one or more dopants. In some embodiments, the dopants include, without limitation, heteroatoms, metals, metal oxides, metal chalcogenides, metal nanoparticles, metal salts, organic additives, inorganic additives, metal organic compounds, and combinations thereof.

In some embodiments, the doped graphenes include, without limitation, heteroatom-doped graphenes. In some embodiments, the heteroatom-doped graphenes of the present disclosure include, without limitation, boron-doped graphenes, nitrogen-doped graphenes, phosphorus-doped graphenes, sulfur-doped graphenes, silicon-doped graphenes, and combinations thereof. In some embodiments, the heteroatom-doped graphenes of the present disclosure include boron-doped graphenes. In some embodiments, the heteroatom-doped graphenes of the present disclosure include boron-doped porous graphenes.

In some embodiments, the dopants that are associated with doped graphenes of the present disclosure are in the form of heteroatom carbides. In some embodiments, the heteroatom carbides include, without limitation, boron carbides, boron-nitrogen carbides, silicon-carbides, and combinations thereof.

In some embodiments, the dopants of the doped graphenes of the present disclosure are in the form of nanoparticles. In some embodiments, the nanoparticles are coated on the graphene. In some embodiments, the nanoparticles include, without limitation, metal oxides, metal carbides, metal chalcogenides, and transition metal dichalcogenides. In some embodiments, the metal oxides include, without limitation, iron oxides, cobalt oxides, nickel oxides, molybdenum oxides, and copper oxides. In some embodiments, the metal carbides include, without limitation, iron carbides, tungsten carbides, nickel carbides, manganese carbides, cobalt carbides, and molybdenum carbides. In some embodiments, the transition metal dichalcogenides include, without limitation, tungsten disulfide, molybdenum disulfide, and molybdenum diselenide.

The graphenes of the present disclosure can have various surface areas. For instance, in some embodiments, the graphenes of the present disclosure have surface areas ranging from about 100 $m^2/g$ to about 3,000 $m^2/g$. In some embodiments, the graphenes of the present disclosure have surface areas ranging from about 500 $m^2/g$ to about 2800 $m^2/g$. In some embodiments, the graphenes of the present disclosure have surface areas ranging from about 100 $m^2/g$ to about 400 $m^2/g$. In some embodiments, the graphenes of the present disclosure have surface areas ranging from about 150 $m^2/g$ to about 350 $m^2/g$.

The graphenes (e.g., porous graphene layers) of the present disclosure can have various thicknesses. For instance, in some embodiments, the graphenes of the present disclosure have thicknesses that range from about 0.3 nm to about 1 cm. In some embodiments, the graphenes of the present disclosure have thicknesses that range from about 0.3 nm to about 50 μm. In some embodiments, the graphenes of the present disclosure have a thickness of about 25 μm.

The graphenes of the present disclosure can also have various shapes. For instance, in some embodiments, the graphenes of the present disclosure are in the form of flakes. In some embodiments, the graphenes of the present disclosure are highly wrinkled. In some embodiments, the graphenes of the present disclosure have ripple-like wrinkled structures.

In some embodiments, the graphenes of the present disclosure have a three-dimensional network. For instance, in some embodiments, the graphenes of the present disclosure are in the shape of a foam with porous structures.

In some embodiments, the graphenes of the present disclosure have an ordered porous morphology. In some embodiments, the graphenes of the present disclosure are in polycrystalline form. In some embodiments, the graphenes of the present disclosure are in ultra-polycrystalline form. In some embodiments, the graphenes of the present disclosure contain grain boundaries. In some embodiments, the graphenes of the present disclosure include a polycrystalline lattice. In some embodiments, the polycrystalline lattice may include ring structures. In some embodiments, the ring structures include, without limitation, hexagons, heptagons, pentagons, and combinations thereof. In some embodiments, the graphenes of the present disclosure have a hexagonal crystal structure. In some embodiments, the graphenes of the present disclosure have heptagon-pentagon pairs that comprise 20% to 80% of the surface structure.

In some embodiments, the graphenes of the present disclosure include pristine graphene. In some embodiments, the graphenes of the present disclosure include unfunctionalized graphene. In some embodiments, the graphenes of the present disclosure include functionalized graphene that has been functionalized with one or more functional groups. In some embodiments, the functional groups include, without limitation, oxygen groups, hydroxyl groups, esters, carboxyl groups, ketones, amine groups, nitrogen groups, and combinations thereof.

The graphenes of the present disclosure can have various carbon, nitrogen and oxygen contents. For instance, in some embodiments, the graphenes of the present disclosure have a carbon content ranging from about 70 wt % to about 98 wt %. In some embodiments, the graphenes of the present disclosure have an oxygen content ranging from about 0 wt % to about 25 wt %. In some embodiments, the graphenes of the present disclosure have a nitrogen content ranging from about 0 wt % to about 7.5 wt %.

Reaction Conditions

The methods of the present disclosure may occur under various reaction conditions. For instance, in some embodiments, the methods of the present disclosure can occur under ambient conditions. In some embodiments, the ambient conditions include, without limitation, room temperature, ambient pressure, and presence of air. In some embodiments, the methods of the present disclosure occur at room temperature in the presence of air.

In some embodiments, the methods of the present disclosure can occur in the presence of one or more gases. In some embodiments, the one or more gases include, without limitation, hydrogen, ammonia, argon nitrogen, oxygen, carbon dioxide, methane, ethane, ethene, chlorine, fluorine, acetylene, natural gas, and combinations thereof.

In some embodiments, the methods of the present disclosure can occur in an environment that includes ambient air. In some embodiments, the environment includes, without limitation, hydrogen, argon, methane, and combinations thereof. Additional reaction conditions can also be envisioned.

Graphene Materials

The methods of the present disclosure can be utilized to form various types of graphene materials. In additional embodiments, the present disclosure pertains to the graphene materials that are formed by the methods of the present disclosure.

In some embodiments, the graphene materials of the present disclosure include a polymer and a graphene derived from the polymer. In some embodiments, the graphene is on a surface of the polymer. In some embodiments, the graphene materials of the present disclosure consist essentially of graphenes.

Suitable graphenes, polymers and polymer surfaces were described previously. Suitable arrangements of graphenes on polymer surfaces were also described previously (e.g., FIG. 1B). For instance, in some embodiments, the graphene includes a pattern on a surface of the polymer. In some embodiments, the graphene is embedded with the polymer. In some embodiments, the graphene is on an outside surface of the polymer. In some embodiments, the graphene is on a first surface of the polymer. In some embodiments, the graphene is on a first surface and a second surface of the polymer. In some embodiments, the first surface and the second surface are on opposite sides of the polymer.

Isolated Graphenes

The methods of the present disclosure can also be utilized to form various types of isolated graphenes. In additional embodiments, the present disclosure pertains to the isolated graphenes that are formed by the methods of the present disclosure. In some embodiments, the isolated graphene is derived from a polymer and separated from the polymer. Suitable graphenes, polymers and polymer surfaces were described previously.

Incorporation of Graphene Materials and Isolated Graphenes into Electronic Devices In some embodiments, the methods of the present disclosure also include a step of incorporating the graphene materials and isolated graphenes of the present disclosure into an electronic device. In some embodiments, the graphene materials and isolated graphenes of the present disclosure serve as a component of the electronic device. In additional embodiments, the present disclosure pertains to methods of forming an electronic device by forming a graphene material or an isolated graphene of the present disclosure and incorporating the graphene material or the isolated graphene into the electronic device. In further embodiments, the present disclosure pertains to electronic devices that contain the graphene materials or isolated graphenes of the present disclosure.

As set forth in more detail herein, the graphene materials and isolated graphenes of the present disclosure can be incorporated into various electronic devices in various manners. Furthermore, the graphene materials and isolated graphenes of the present disclosure can serve as various electronic device components.

Electronic Device Formation

Various methods may be utilized to incorporate graphene materials and isolated graphenes into electronic devices. For instance, in some embodiments, the incorporation includes stacking a plurality of graphene materials into the electronic device. In some embodiments, the graphene materials are stacked in a series configuration. In some embodiments, the graphene materials are stacked in a parallel configuration.

The graphene materials and isolated graphenes of the present disclosure can be incorporated into various electronic devices (e.g., FIGS. 1C-D). For instance, in some embodiments, the electronic device is an energy storage device or an energy generation device.

In some embodiments, the electronic device includes, without limitation, supercapacitors, micro supercapacitors, pseudo capacitors, batteries, micro batteries, lithium-ion batteries, sodium-ion batteries, magnesium-ion batteries, electrodes (e.g., conductive electrodes), sensors (e.g., gas, humidity and chemical sensors), photovoltaic devices, electronic circuits, fuel cell devices, thermal management devices, biomedical devices, and combinations thereof. In some embodiments, the graphene materials and isolated graphenes of the present disclosure may be utilized in the electronic devices as components of hydrogen evolution reaction catalysts, oxygen reduction reaction catalysts, oxygen evolution reaction catalysts, hydrogen oxidation reaction catalysts, and combinations thereof.

The incorporation of graphene materials and isolated graphenes of the present disclosure into electronic devices may result in the formation of various structures. For instance, in some embodiments, the electronic devices of the present disclosure may be in the form of at least one of vertically stacked electronic devices, in-plane electronic devices, symmetric electronic devices, asymmetric electronic devices, and combinations thereof. In some embodiments, the electronic devices of the present disclosure include an in-plane electronic device. In some embodiments, the electronic devices of the present disclosure include a flexible electronic device.

In some embodiments, the electronic devices of the present disclosure include a super capacitor (SC), such as a flexible, solid-state supercapacitor. In some embodiments, the electronic device is a microsupercapacitor (MSC), such as a flexible microsupercapacitor or a flexible in-plane microsupercapacitor (MSC) (e.g., FIG. 1C). In some embodiments, the electronic devices of the present disclosure include vertically stacked electronic devices, such as vertically stacked supercapacitors (e.g., FIG. 1D).

In some embodiments, the electronic devices of the present disclosure may also be associated with an electrolyte. For instance, in some embodiments, the graphene materials and isolated graphenes of the present disclosure may be associated with an electrolyte. In some embodiments, the electrolyte may be placed between two graphene materials in an electronic device. In some embodiments, the electrolyte includes, without limitation, solid state electrolytes, liquid electrolytes, aqueous electrolytes, organic salt electrolytes, ion liquid electrolytes, and combinations thereof. In some embodiments, the electrolyte is a solid state electrolyte. In some embodiments, the solid state electrolyte is made from inorganic compounds. In some embodiments, the solid state electrolyte includes polymeric electrolytes. In some embodiments, the solid-state electrolyte is made from poly(vinyl alcohol) (PVA) and sulfuric acid ($H_2SO_4$).

Electronic Device Components

The graphenes associated with the graphene materials and isolated graphenes of the present disclosure can be utilized as various electronic device components. For instance, in some embodiments, the graphenes of the present disclosure may be utilized as an electrode in an electronic device. In some embodiments, the graphenes of the present disclosure may be utilized as a positive electrode, a negative electrode, and combinations thereof. In some embodiments, the graphenes of the present disclosure may be utilized as interdigitated electrodes.

In some embodiments, the graphenes of the present disclosure may be utilized as conductive fillers in an electronic device. In some embodiments, the graphenes of the present disclosure may be utilized as conductive wires in an electronic device.

In some embodiments, the graphenes of the present disclosure may be utilized as a current collector in an electronic device. In some embodiments, the graphenes of the present disclosure may be utilized as a current collector and an electrode in an electronic device.

In some embodiments, the graphenes of the present disclosure may be utilized as additives in an electronic device. In some embodiments, the isolated graphenes of the present disclosure may be utilized as additives in an electronic device, such as an energy storage device.

In some embodiments, the graphenes of the present disclosure are used in energy storage devices. In some embodiments, the graphenes of the present disclosure are used as part of a battery anode. In some embodiments, the graphenes of the present disclosure are used as part of a battery cathode. In some embodiments the graphenes of the present disclosure may be used in batteries as conductive fillers, such as anodes or as cathodes. In some embodiments, the graphenes of the present disclosure are utilized as additives in the electronic device.

Advantages

In some embodiments, the methods of the present disclosure provide a one-step and scalable approach for making various types of graphene materials and isolated graphenes. In some embodiments, the methods of the present disclosure may employ roll-to-roll manufacturing processes for more efficient manufacturing of the graphene materials and isolated graphenes. In some embodiments, the methods of the present disclosure may be utilized to form graphene materials and isolated graphenes without the utilization of any metals, such as metal surfaces or metal catalysts.

The graphenes of the graphene materials and isolated graphenes of the present disclosure can have various advantageous properties. For instance, in some embodiments, the electrochemical performance of the graphenes is enhanced with three times larger areal capacitance and 5 to 10 times larger volumetric energy density at various power densities. In some embodiments, the graphenes have decomposition temperatures of more than about 900° C. In some embodiments, the graphenes are stable at temperatures up to about 2,000° C. In some embodiments, the graphene has high electrical conductivity.

As such, electronic devices that contain the graphene materials and isolated graphenes of the present disclosure can have various advantageous properties. For instance, in some embodiments, the electronic devices of the present disclosure have a capacitance ranging from about 2 mF/cm$^2$ to about 1000 mF/cm$^2$. In some embodiments, the electronic devices of the present disclosure have a capacitance ranging from about 10 mF/cm$^2$ to about 20 mF/cm$^2$. In some embodiments, the electronic devices of the present disclosure have a capacitance of more than about 4 mF/cm$^2$. In some embodiments, the electronic devices of the present disclosure have a capacitance of more than about 9 mF/cm$^2$. In some embodiments, the electronic devices of the present disclosure have a capacitance of about 16.5 mF/cm$^2$.

In some embodiments, the electronic devices of the present disclosure retain at least 90% of their capacitance value after more than 10,000 cycles. For instance, in some embodiments, the electronic devices of the present disclosure retain at least 95% of their capacitance value after more than 10,000 cycles. In some embodiments, the electronic devices of the present disclosure retain at least 90% of their capacitance value after more than 7,000 cycles. In some embodiments, the electronic devices of the present disclosure retain at least 90% of their capacitance value after more than 9,000 cycles.

In some embodiments, the capacitance of the electronic devices of the present disclosure increase by at least 110% of their original value after more than 10,000 cycles. For instance, in some embodiments, the capacitance of the electronic devices of the present disclosure increase by at least 110% of their original value after more than 2,500 cycles.

In some embodiments, the electronic devices of the present disclosure have power densities that range from about 5 mW/cm$^2$ to about 200 mW/cm$^2$. In some embodiments, the electronic devices of the present disclosure have power densities of about 9 mW/cm$^2$.

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Laser-Induced Porous Graphene Films from Commercial Polymers

In this Example, a one-step, scalable approach for producing and patterning porous graphene films with 3-dimensional (3D) networks from commercial polymer films using a CO$_2$ infrared laser is reported. The sp$^3$-carbon atoms are photothermally converted to sp$^2$-carbon atoms by pulsed laser irradiation. The resulting laser-induced graphene (LIG) exhibits high electrical conductivity. Moreover, the LIGs can be readily patterned to interdigitated electrodes for in-plane microsupercapacitors with specific capacitances of >4 mF·cm$^{-2}$ and power densities of ~9 mW·cm$^{-2}$. As such, the materials demonstrate a new application in energy storage.

It has recently been demonstrated that fabrication of MSCs using conventional lithography techniques requires masks and restricted operational conditions. While there have been recent developments in laser-scribing hydrated graphene oxide (GO) films, Applicants show in this Example a one-step laser-scribing method on commercial polymer films in air to form 3D graphene layers. The approach is scalable and cost-effective in fabricating large-area devices. Moreover, the approach can be transferrable to a roll to roll process.

Example 1.1. Laser Scribing

Figure 2:
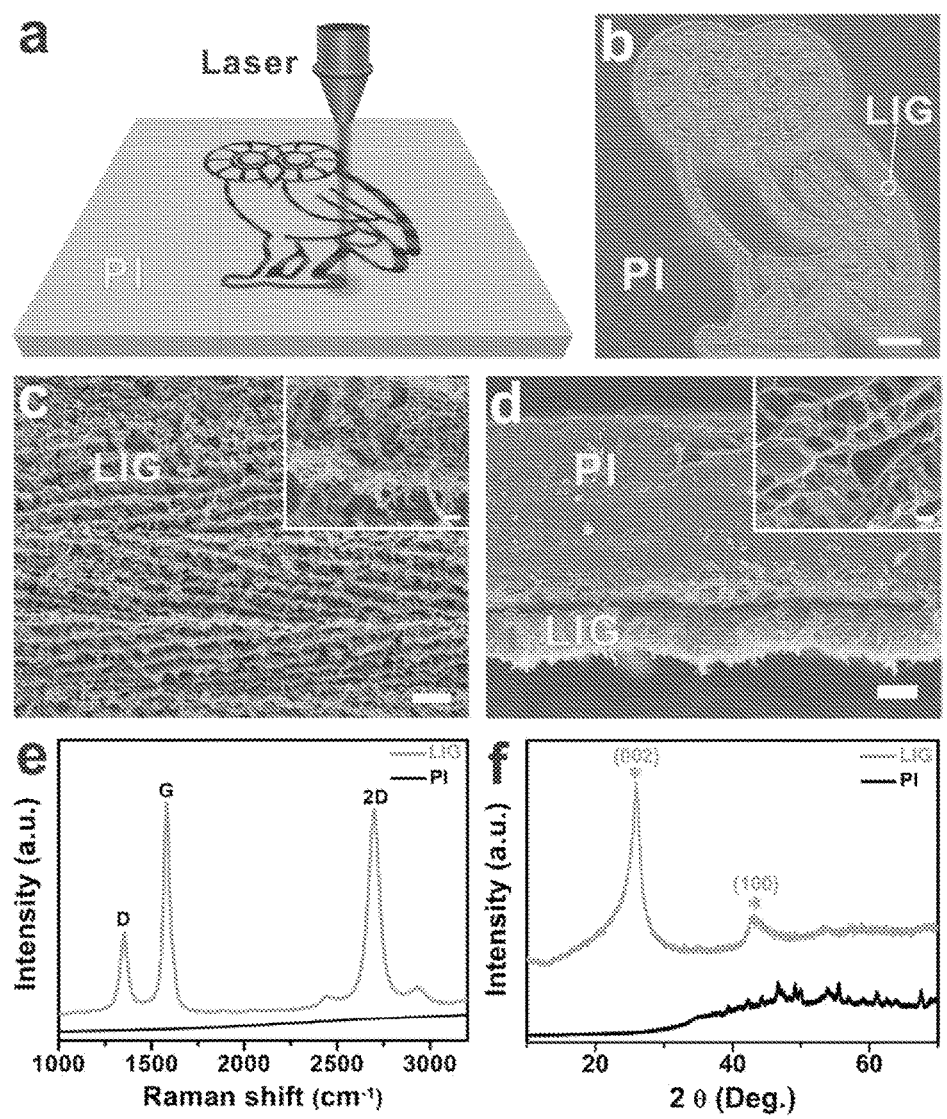
FIG. 2 provides data and images relating to laser-induced graphene (LIG) formed from commercial polyimide (PI) films using a $CO_2$ laser at a power of 3.6 W to write patterns.
Figure 3:
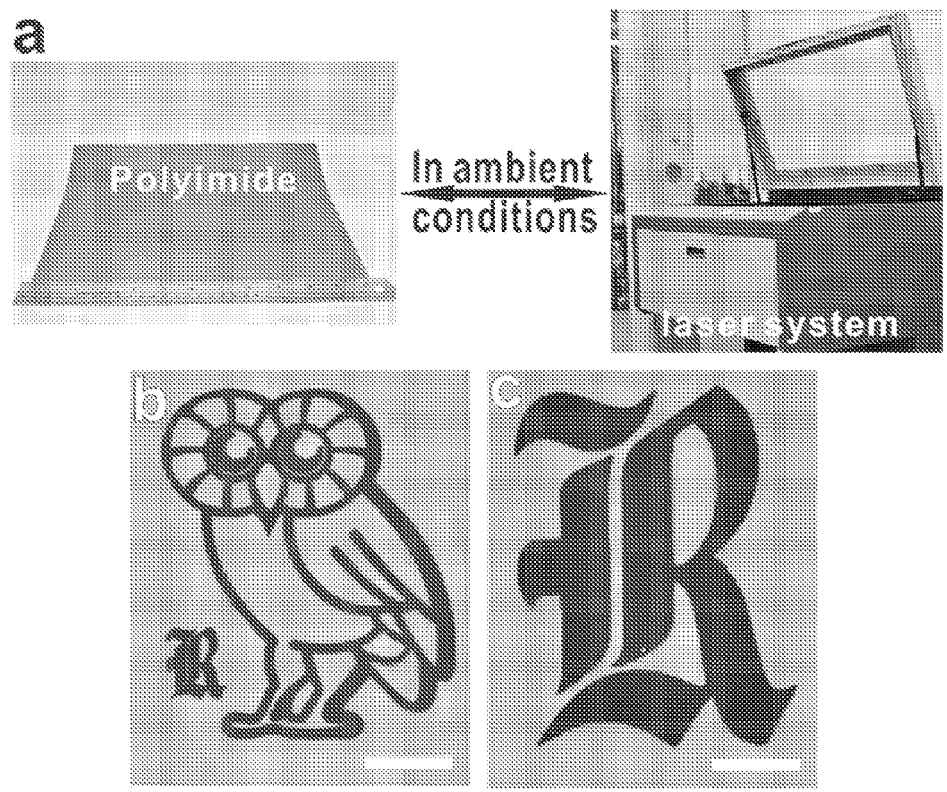
FIG. 3 provides images of materials and equipment for production of LIG from PI by laser scribing.

As depicted in FIGS. 2A and 3A, irradiation of a commercial polyimide (PI) film by a CO$_2$ infrared laser under ambient conditions converts the film into porous graphene (also referred to as laser-induced graphene (LIG)). With computer-controlled laser scribing, LIG can be readily written into various geometries, as shown in the scanning electron microscopy (SEM) image in FIGS. 2B, 3B and 3C. The photographs in FIGS. 3B-C show two distinguished areas: black LIG after PI was exposed to the laser, and light orange PI that was unexposed.

Without being bound by theory, theoretical calculations partially suggest that enhanced capacitance may result from LIG's unusual ultra-polycrystalline lattice of pentagon-heptagon structures. Combined with the advantage of one-step processing of LIG in air from commercial polymer sheets, which would allow the employment of a roll-to-roll manufacturing process, this technique provides a rapid route to polymer-written electronic and energy storage devices.

Example 1.2. Analytical Characterization

LIG films obtained with a laser power of 3.6 W, denoted as LIG-3.6 W, were further characterized with SEM, Raman spectroscopy, X-ray diffraction (XRD), X-ray photoelectron spectroscopy (XPS), and Fourier transform infrared (FTIR) spectroscopy. FIG. 2C shows that LIG films exhibit the appearance of a foam with porous structures resulting from the rapid liberation of gaseous products. Cross-sectional SEM images of LIG reveal ordered porous morphology (FIG. 2D). These porous structures render enhanced accessible surface areas and facilitate electrolyte penetration into the active materials.

Figure 4:
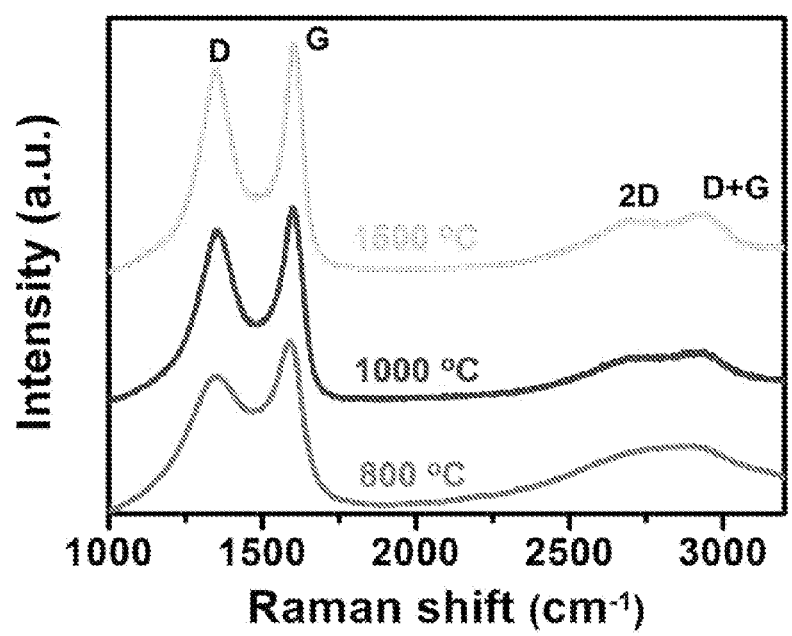
FIG. 4 provides Raman spectra of control samples. PI sheets were carbonized in a furnace under Ar flow of 300 sccm for 3 h with the following annealing temperatures: 800° C., 1000° C. and 1500° C. Raman spectra show that these carbonized materials were glassy and amorphous carbon.

The Raman spectrum of LIG (FIG. 2E) shows three prominent peaks: the D peak at ~1350 cm$^{-1}$ induced by defects or bent sp$^2$-carbon bonds, the first-order allowed G peak at ~1580 cm$^{-1}$, and the 2D peak at ~2700 cm$^{-1}$ originating from second order zone boundary phonons. If PI is carbonized at temperatures ranging from 800 to 1500° C., the resulting Raman spectrum is similar to that of glassy carbon (FIG. 4). However, the spectrum for LIG (FIG. 2E) is clearly different from that of glassy carbon. The 2D peak of LIG can be fitted with only one Lorentzian peak centered at 2700 cm$^{-1}$, the same as in single-layer graphene (SLG), but with a larger full width at half maximum (FWHM) of ~60 cm$^{-1}$. This 2D band profile is typical of that found in 2D graphite consisting of randomly stacked graphene layers along the c axis. Finally, D/G intensity ratio indicates a high degree of graphene formation in the LIG films.

The XRD pattern (FIG. 2F) shows an intense peak centered at 2θ=25.90, giving an interlayer spacing ($I_c$) of ~3.4 Å between (002) planes in the LIG. The pattern indicates the high degree of graphene formation. The asymmetry of the (002) peak, with tailing at smaller 2θ angles, also points to an increased $I_c$. The expanded $I_c$ can be attributed to regions where defects are distributed on hexagonal graphene layers. The peak at 2θ=42.90 is indexed to (100) reflections which are associated with an in-plane structure. Using equations 2 and 3, and the methods described in this Example, the crystalline size along the c-axis ($L_c$) and a-axis ($L_a$) are calculated to be ~17 nm and ~32 nm, respectively.

Figure 5:
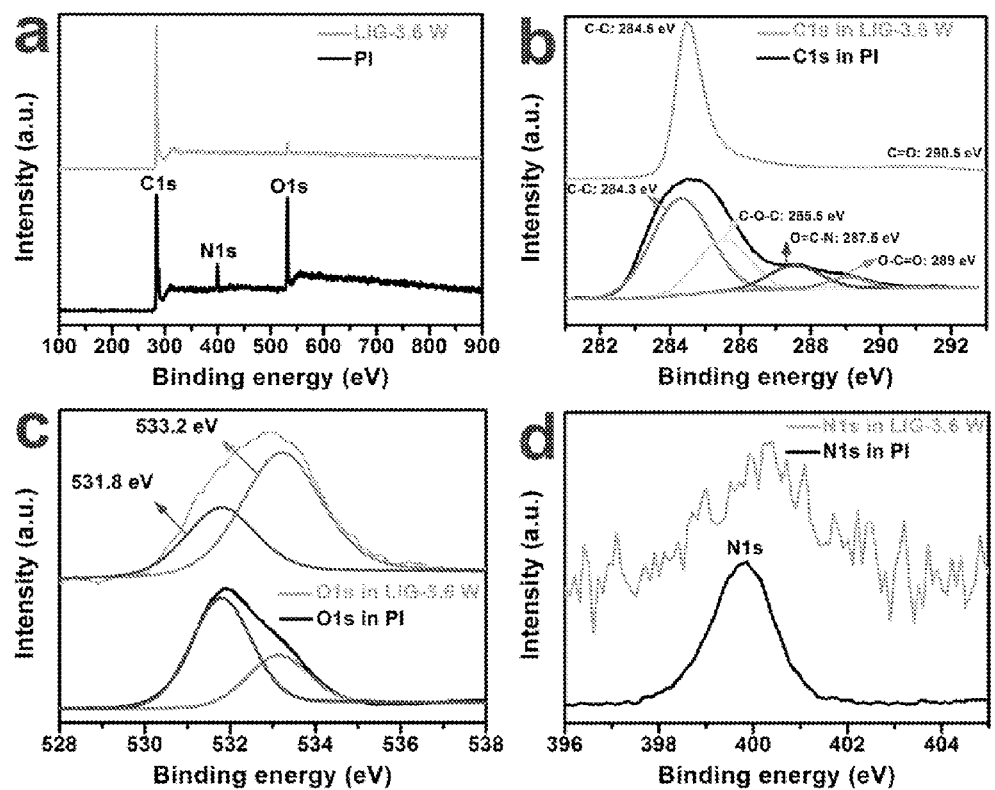
FIG. 5 provides x-ray photoelectron spectroscopy (XPS) characterization of LIG-3.6 W films (i.e., LIGs formed by exposing PI sheets to lasers powered at 3.6 W).
Figure 6:
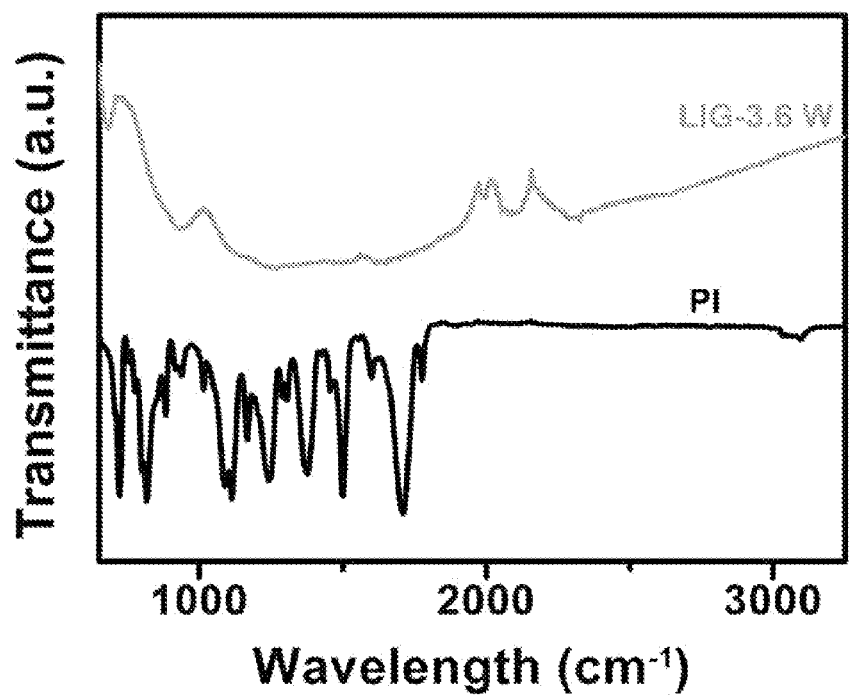
FIG. 6 provides Fourier transform infrared (FTIR) spectra of LIG-3.6 W and PI films. FTIR spectra of PI show distinct peaks at 1090-1776 $cm^{-1}$, corresponding to the well-defined stretching and bending modes of the C—O, C—N, and C=C bonds. After the laser scribing, a broad absorption from 1000 $cm^{-1}$ to 1700 $cm^{-1}$ shows that the laser scribing leads to a large variation in the local environment.

The XPS spectrum of LIG-3.6 W shows a dominant C—C peak with greatly suppressed C—N, C—O and C═O peaks (FIG. 5). Such results suggest that LIG films are dominated by $sp^2$-carbons, agreeing well with the Raman and XRD results. This is further confirmed by comparison of the distinctive FTIR spectra of PI and LIG-3.6 W (FIG. 6).

Figure 7:
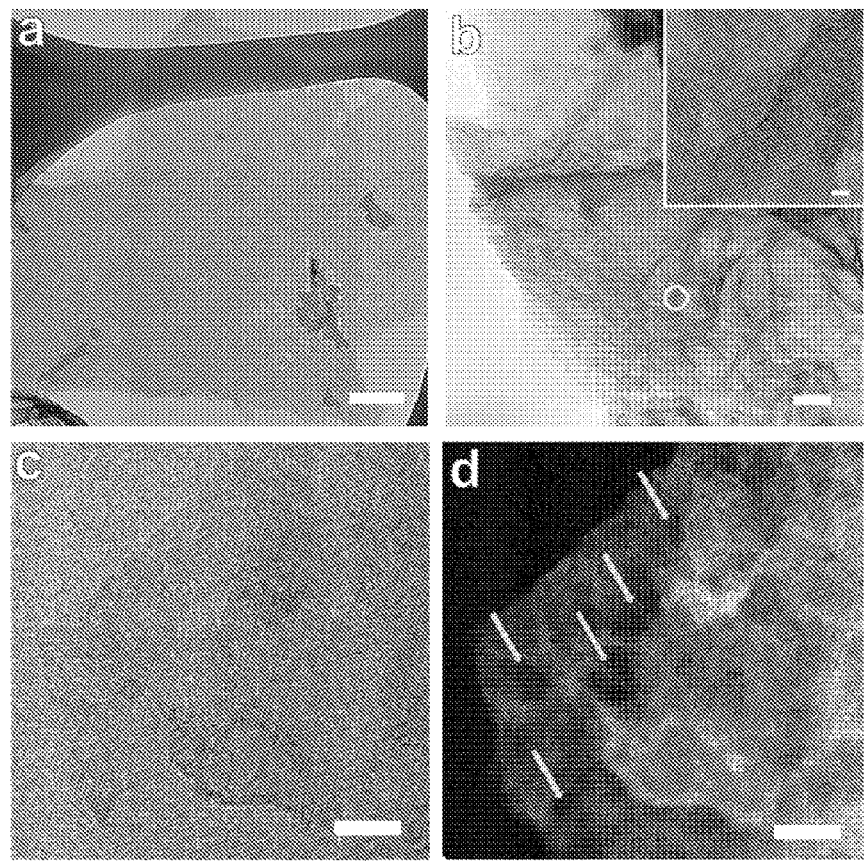
FIG. 7 provides a transmission electron microscopy (TEM) characterization of LIG-3.6 W flakes.
Figure 8:
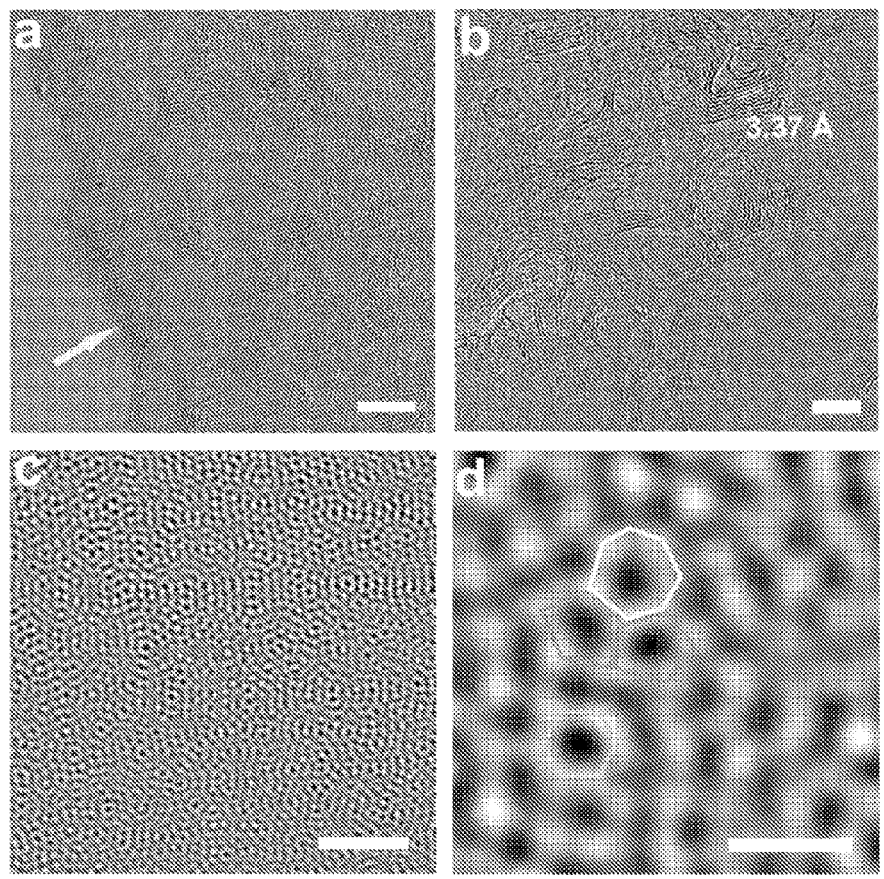
FIG. 8 provides TEM images of LIG obtained with a laser power of 3.6 W.
Figure 9:
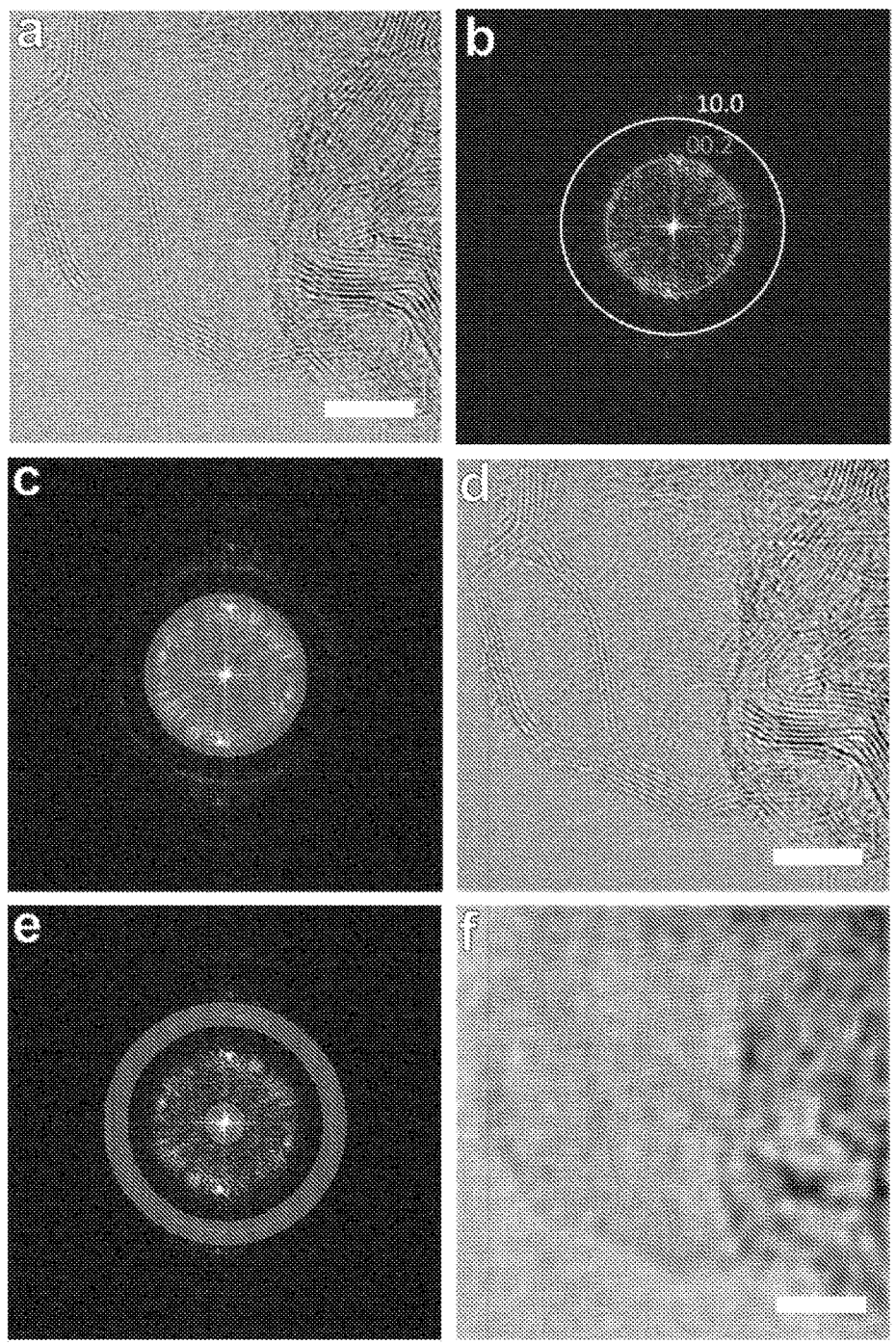
FIG. 9 provides a TEM characterization of LIG-3.6 W flakes using filtering techniques.

The micro- and nano-structure of LIG flakes was investigated by transmission electron microscopy (TEM). FIG. 7A shows thin LIG flakes with few-layer features as further indicated from the edges of the flake in FIG. 8A. Moreover, ripple-like wrinkled structures can be observed from the surface of the flakes. These structures in graphene have been shown to improve the electrochemical performance of devices. Thicker flakes exhibit mesoporous structures (FIG. 7B). High-resolution TEM (HRTEM) images in FIG. 8B reveals that the nano-shaped ripples are exposed edges of graphene layers. The formation of these ripples could be attributed to thermal expansion caused by laser irradiation. The average lattice space of ~3.4 Å shown in FIG. 8B corresponds to the distance between two neighboring (002) planes in graphitic materials, and it agrees well with the XRD results. The aberration-corrected scanning transmission electron microscopy (Cs-STEM) image (FIG. 8C) shows the unusual ultra-polycrystalline feature of LIG flakes with disordered grain boundaries. This observation is further depicted in FIG. 8D, where a hexagon lattice and a heptagon with two pentagons is shown. These abundant pentagon-heptagon pairs can account for the curvature of the graphene layers leading to the porous structure (FIGS. 7C-D and 9). Theoretical calculations suggest that the aforementioned defects could enhance electrochemical capacity (as discussed in detail herein).

Figure 10:
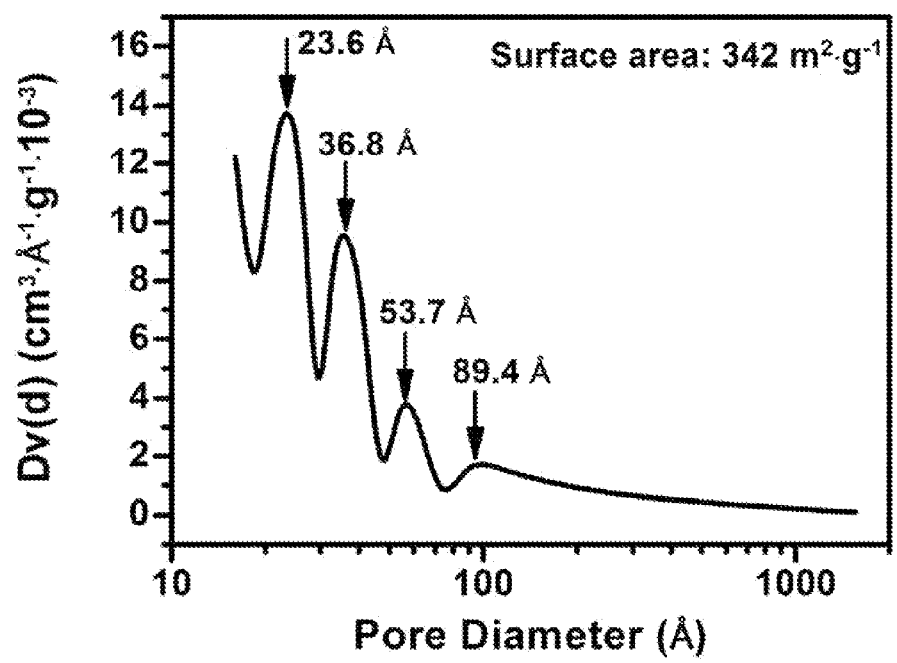
FIG. 10 provides a BET specific surface area of LIG-3.6 W. The surface area of this sample was ~342 $m^2 \cdot g^{-1}$. Pore sizes are distributed at 2.36 nm, 3.68 nm, 5.37 nm and 8.94 nm.
Figure 11:
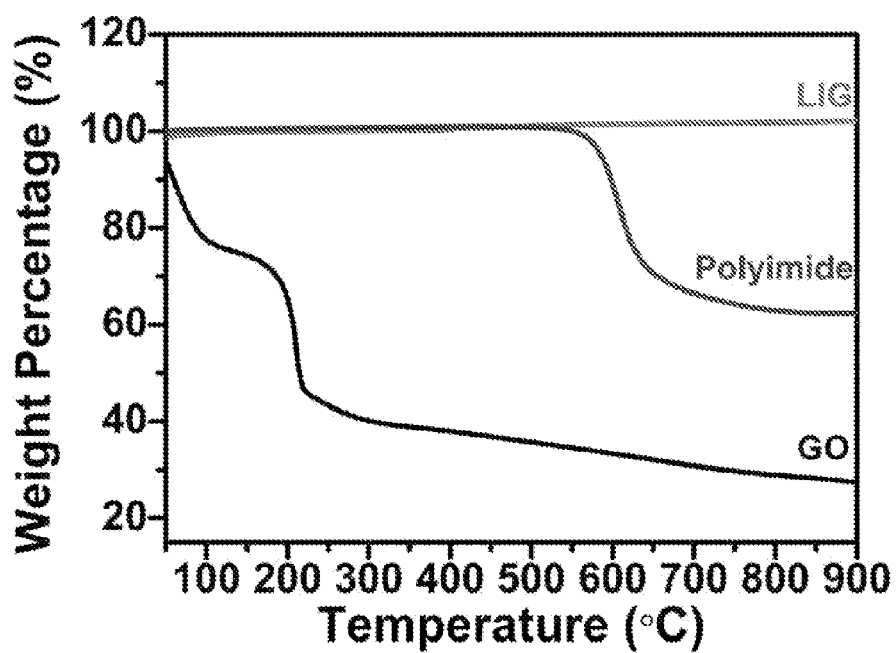
FIG. 11 provides thermogravimetric analysis (TGA) characterizations of LIG-3.6 W, PI and graphene oxide (GO) in argon. Compared to GO, which significantly decomposes at ~190° C., LIG is stable at >900° C. PI starts to decompose at 550° C.

LIG has a surface area of ~340 $m^2 \cdot g^{-1}$ by BET, with pore sizes of less than 9 nm (FIG. 10). Thermogravimetric analysis (TGA) measurement under argon (FIG. 11) shows that the decomposition temperature of PI is ~550° C. and LIG is >900° C., while that of the often used graphene precursor, graphene oxide (GO), is ~190° C.

Example 1.3. Effect of Laser Power

Figure 12:
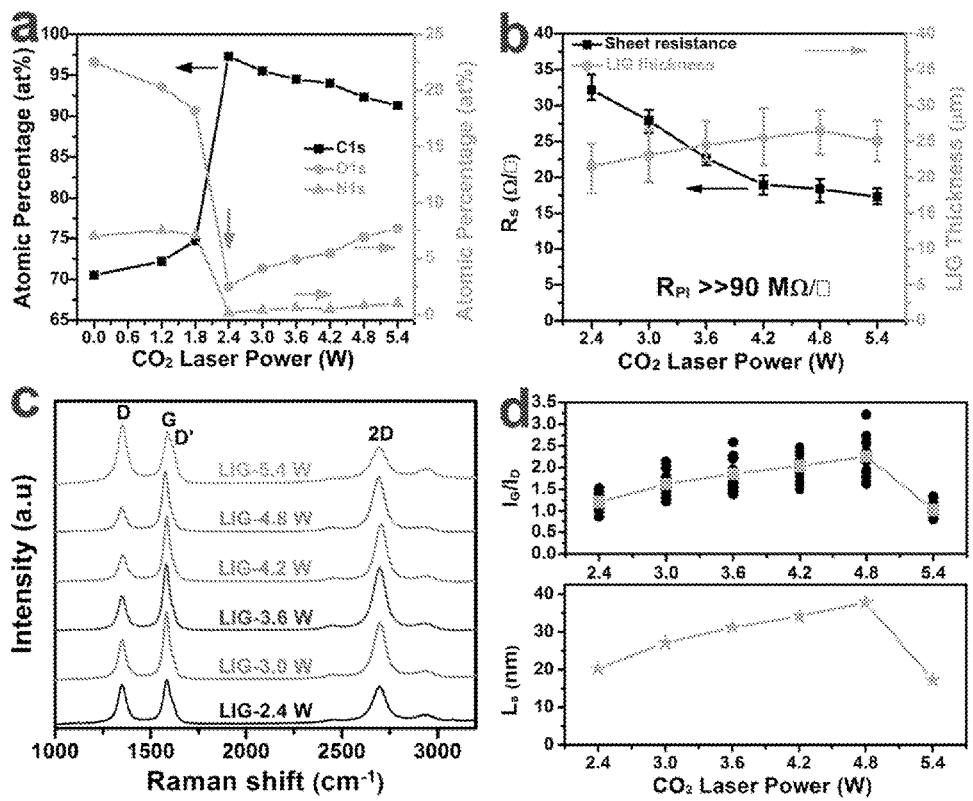
FIG. 12 provides characterizations of LIG prepared with different laser powers.

To investigate the effect of laser power, LIG was prepared using powers ranging from 2.4 W to 5.4 W in 0.6 W increments at a scan rate of 3.5 inches per second. In FIG. 12A (plotted from Table 1), beginning at 2.4 W, the atomic percentage of carbon sharply increases from the original 71% in PI to 97% in LIG while the atomic percentages of both nitrogen and oxygen decrease precipitously to <3%. This threshold power effect has been well-studied in UV ablation of polymers.

| Materials | Carbon (%) | Oxygen (%) | Nitrogen (%) |
|---|---|---|---|
| Polyimide | 70.5 | 22.5 | 7.0 |
| LIG-1.2 W | 72.2 | 20.3 | 7.5 |
| LIG-1.8 W | 74.7 | 18.2 | 7.1 |
| LIG-2.4 W | 97.3 | 2.5 | 0.2 |
| LIG-3.0 W | 95.5 | 4.1 | 0.4 |
| LIG-3.6 W | 94.5 | 4.9 | 0.6 |
| LIG-4.2 W | 94.0 | 5.5 | 0.5 |
| LIG-4.8 W | 92.3 | 6.9 | 0.8 |
| LIG-5.4 W | 91.3 | 7.7 | 1.0 |

Table 1 provides a summary of atomic percentage of elements in raw material (PI) and LIG derived from different laser powers. All of the data were obtained by high-resolution XPS scans.

Figure 13:
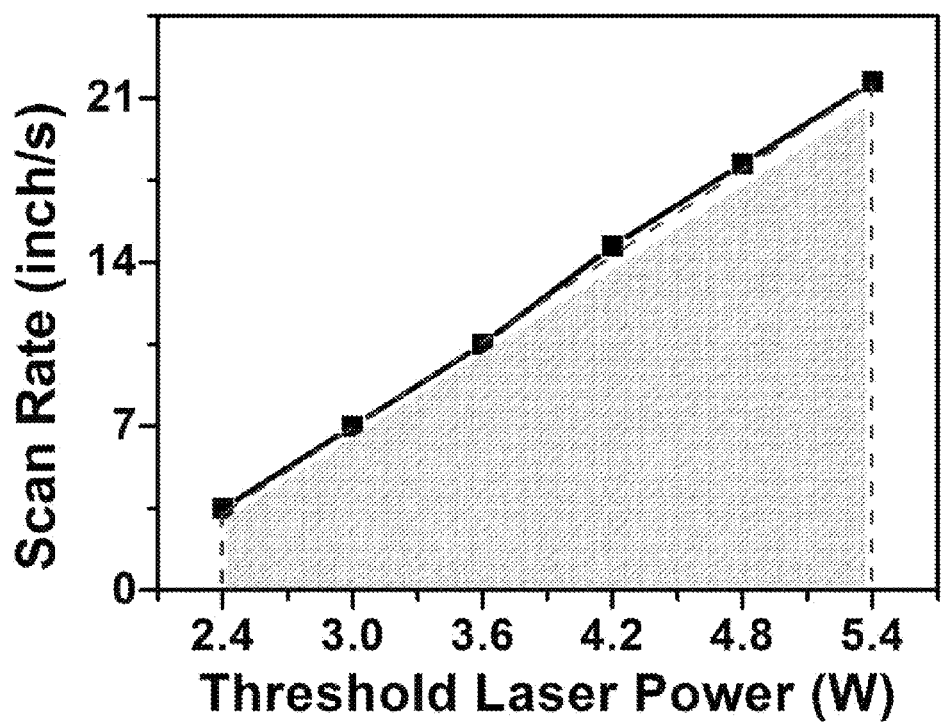
FIG. 13 provides a correlation of threshold laser power to scan rate. The threshold power shows a linear dependence on the scan rate. Conditions indicated by the shaded area lead to laser-based graphene-induction.

The threshold power shows a linear dependence on the scan rate (FIG. 13). If the scan rate increases, higher threshold power needs to be applied in order to initiate the graphitization. Meanwhile, the sheet resistance ($R_s$) of LIG-2.4 W is reduced to <35 Ω $\Box^{-1}$ (FIG. 12B). Below the threshold of 2.4 W, PI is an insulator with $R_s$>>90 MΩ $\Box^{-1}$ (instrument limit). As the laser power increases to 5.4 W, $R_s$ is gradually reduced to a minimum value of <15 Ω $\Box^{-1}$; the translated conductivity is ~25 S·$cm^{-1}$, higher than in laser-reduced GO. FIG. 12B shows two distinct slopes of Rs vs. laser power. The slope when the laser power was <4.2 W is larger than the one when it was >4.2 W. This suggests that when the laser power is <4.2 W, the thermal power dominates the quality of the films. Therefore, increased laser power leads to higher graphene formation. As the thermal power rises above 4.2 W, oxidation starts to play an increasingly deleterious role in the quality of the films. Therefore the slope lessens.

Figure 14:
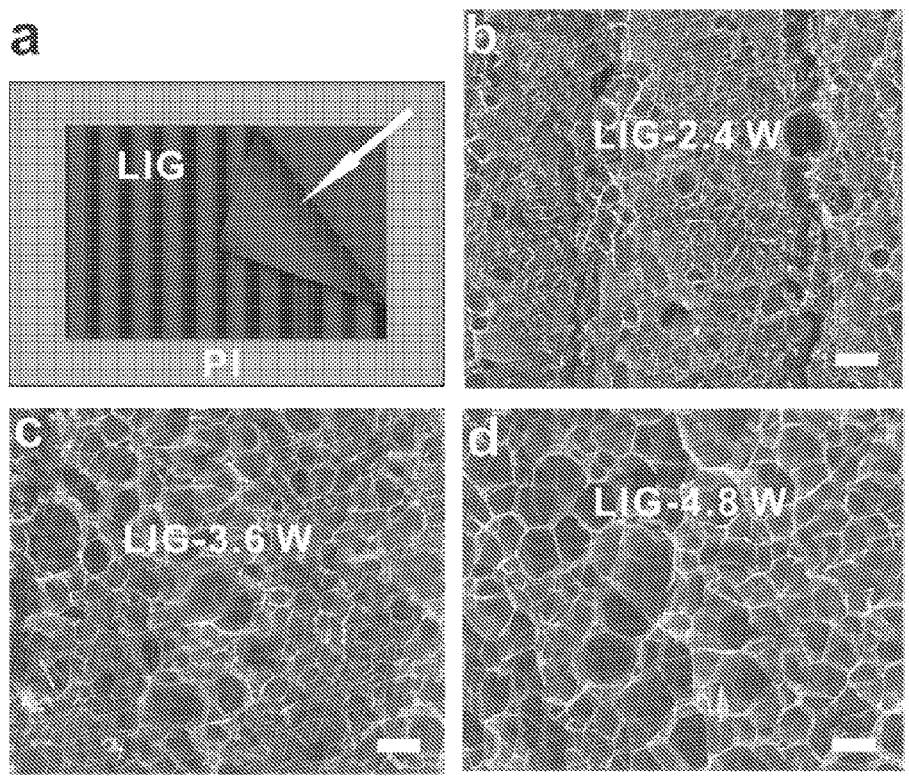
FIG. 14 provides characterizations of backsides of LIG films.

As expected, higher laser power tends to increase porosity, as shown in the SEM images taken on the backsides of the LIG films (FIG. 14) that had been peeled off the PI substrate. Raman spectroscopy is a powerful tool to obtain crystalline size ($L_a$) along the a-axis of graphitic materials by analyzing ratios of the integrated intensities of G and D peaks ($I_G/I_D$). FIG. 12C shows representative Raman spectra of LIG films attained with laser powers from 2.4 to 5.4 W. The statistical analysis of $I_G/I_D$ vs. laser powers is plotted in the upper panel of FIG. 12D. The $L_a$ values calculated from the average $I_G/I_D$ ratio using eq 4 and the methods described in this Example is shown in the lower panel of FIG. 12D, showing increased $L_a$ up to ~40 nm as the laser power rises to 4.8 W. This increase can be attributed to increased surface temperatures. Further increase in power degrades the quality of the LIG with $L_a$ of ~17 nm in LIG-5.4 W, which is attributable to the partial oxidation of LIG in air. This can be further verified from profound defect-correlated D' peaks centered at ~1620 $cm^{-1}$ in LIG-5.4 W (FIG. 12C).

Example 1.4. Discussion

Laser ablation of polymers has been studied since the early 1980s. Because of its complex nature, the detailed mechanism is still debated as being a photothermal or photochemical process, or both. Since photochemical processes tends to occur in lasers with short wavelengths and ultra-short pulse widths, Applicants' infrared LIG formation is more likely to be caused by photothermal effects due to its long wavelength (~10.6 μm) and relatively long pulses (~14 μs). The energy from laser irradiation results in lattice vibrations which could lead to extremely high localized temperatures (>2500° C.) that can be qualitatively detected by laser-induced fluorescence. This high temperature could easily break the C—O, C=O and N—C bonds, as confirmed by the dramatically decreased oxygen and nitrogen contents in LIG (FIG. 12A). These atoms would be recombined and released as gases. Aromatic compounds are then rearranged to form graphitic structures, during which oxidation of these graphitic structures can be minimized by an overlayer of the evolved gases.

Figure 15:
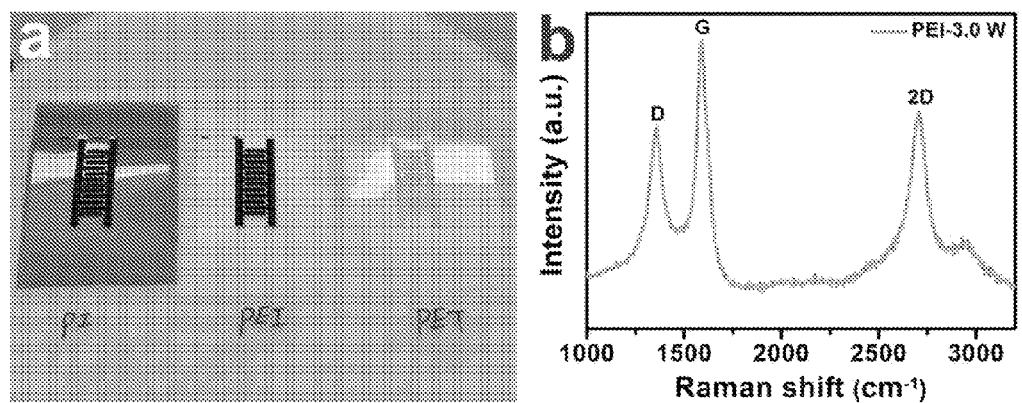
FIG. 15 provides characterization of LIG from different polymers.
Figure 59:
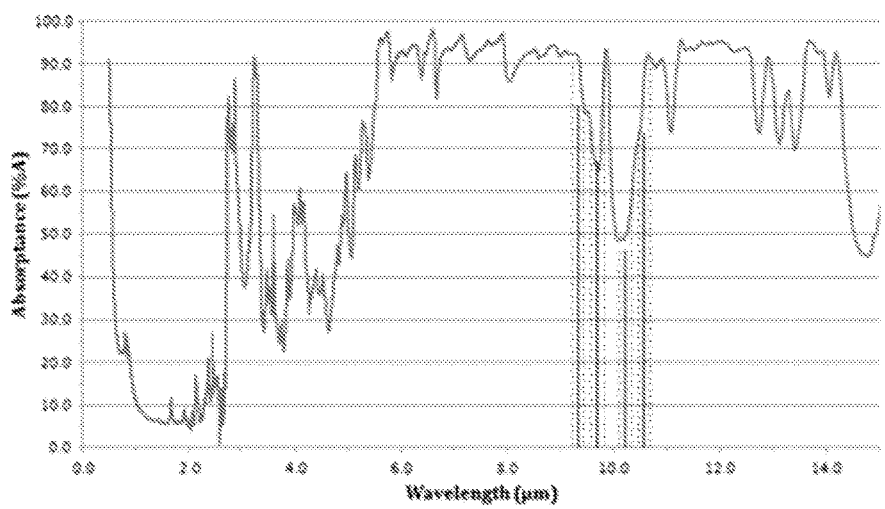
FIG. 59 provides an absorption spectrum of a polyimide film. The four vertical lines represent where a tunable $CO_2$ laser could specifically address key lines of polymer absorbance to induce graphene formation.

Without being bound by theory, Applicants have found that the mechanism of laser graphitization in polymers is strongly correlated to the structural features present in the repeat units, such as aromatic and imide repeat units. Attempts were made to generalize this laser induced graphitization process by testing 15 different polymers. Out of them, only two polymers, PI and poly(etherimide) (PEI), both of which contain aromatic and imide repeat units, can form LIG in this example (Table 2 and FIG. 15). Four other step growth polymers and all 9 of the chain growth polymers tested did not afford LIG in this Example. The reason for other step growth polymers being inactive is not conclusively known, but suggested by the fact that at 10.6 μm, the $CO_2$ laser wavelength has a strong absorbance in the polyimide film (FIG. 59). However, use of lasers that have other wavelengths can be used to target polymers that have absorbances at the laser wavelength line. Additionally, one could add a compound to a polymer wherein the added compound absorbs well at the frequency of the laser used, and that additive becomes spectroscopically excited by the laser, thereby transferring its energy, thermally or photochemically, to the polymer, causing the polymer to form graphene. In some cases the added compound would act as a sensitizer.

| Full Name | Symbols | Unit | Graphitized? |
|---|---|---|---|
| Kapton Polyimide | PI | [structure] | Yes |
| Ulse Polyetherimide | PEI | [structure] | Yes |
| Polyether ether ketone | PEEK | [structure] | No |
| Polyethylene terephthalate | PET | [structure] | No |
| Polyethylene naphthalate | PEN | [structure] | No |
| Fluorinated ethylene propylene | FEP | [structure] | No |

-continued

| Full Name | Symbols | Unit | Graphitized? |
|---|---|---|---|
| Perfluoroalkoxy alkanes | PFA | | No |
| Teflon | PTFE | | No |
| Polystyrene | PS | | No |
| Polycarbonate | PC | | No |
| Polyethylene | PE | | No |
| Polyvinyl alcohol | PVA | | No |
| Poly(methyl methacrylate) | PMMA | | No |
| Acrylonitrile butadiene styrene | ABS | | No |
| Poly(acrylonitrile) | PAN | | No |

Table 2 provides a summary of polymers, their chemical repeat units and their LIG-forming capability. Out of 15 polymers, only PI and PEI were successfully converted to LIG in this example. Nonaromatic hydrocarbons undergo almost complete degradation without graphene formation. Formation of LIG from poly- or heterocyclic structures such as the imide group in PI and PEI polymers favor LIG formation. PAN films are not commercially available and were thus prepared in-house. Though PAN is a precursor to carbon fiber, it does not form graphene well unless heated slowly to permit cyclization and N-extrusion.

Example 1.5. Fabrication of LIG-MSCs

Figure 16:
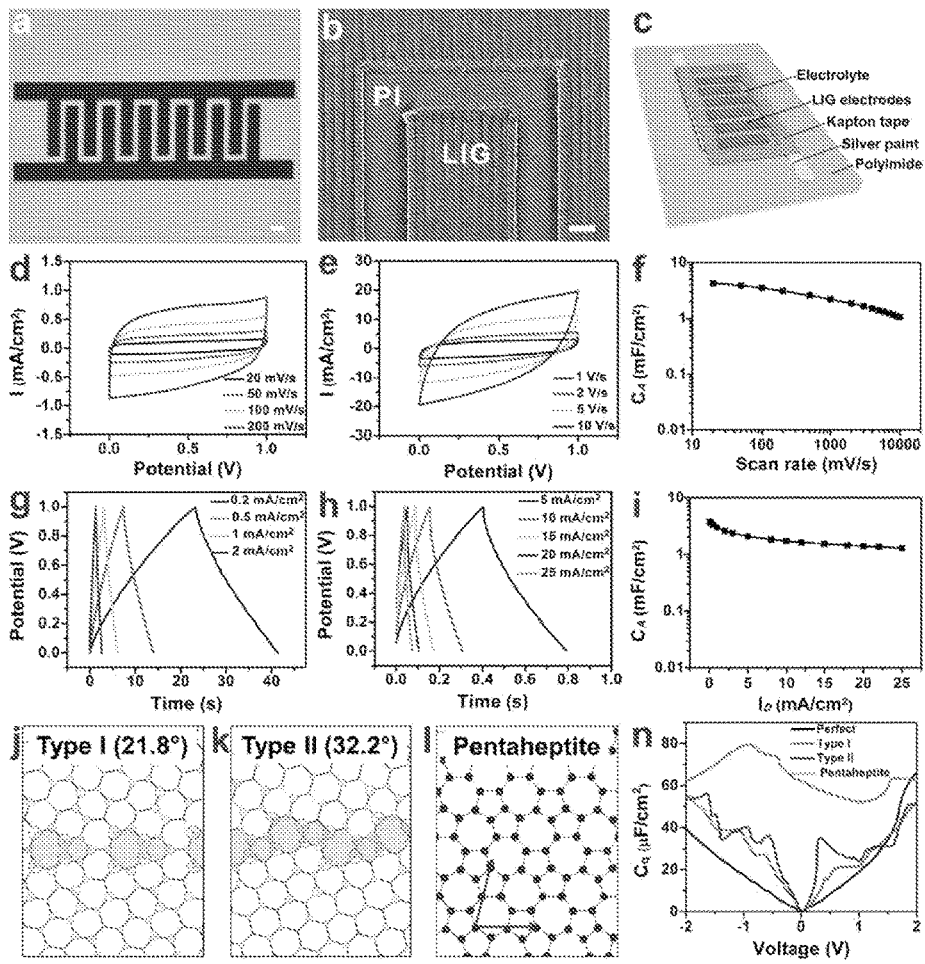
FIG. 16 provides electrochemical performances of LIG-microsupercapacitor (LIG-MSC) devices from LIG-4.8 W in 1 M $H_2SO_4$ with their GB-induced properties.

Next, Applicants fabricated in-plane interdigitated LIG microsupercapacitors (LIG-MSCs) in which LIG serves as both the active electrodes and the current collectors. Well-defined LIG-MSC electrodes are directly written on PI sheets with a neighboring distance of ~300 μm (FIGS. 16A-B). This distance can be further decreased by using a smaller laser aperture. After writing, silver paint was applied on common positive and negative electrodes, and then Kapton tape was employed to define the active electrodes.

Figure 17:
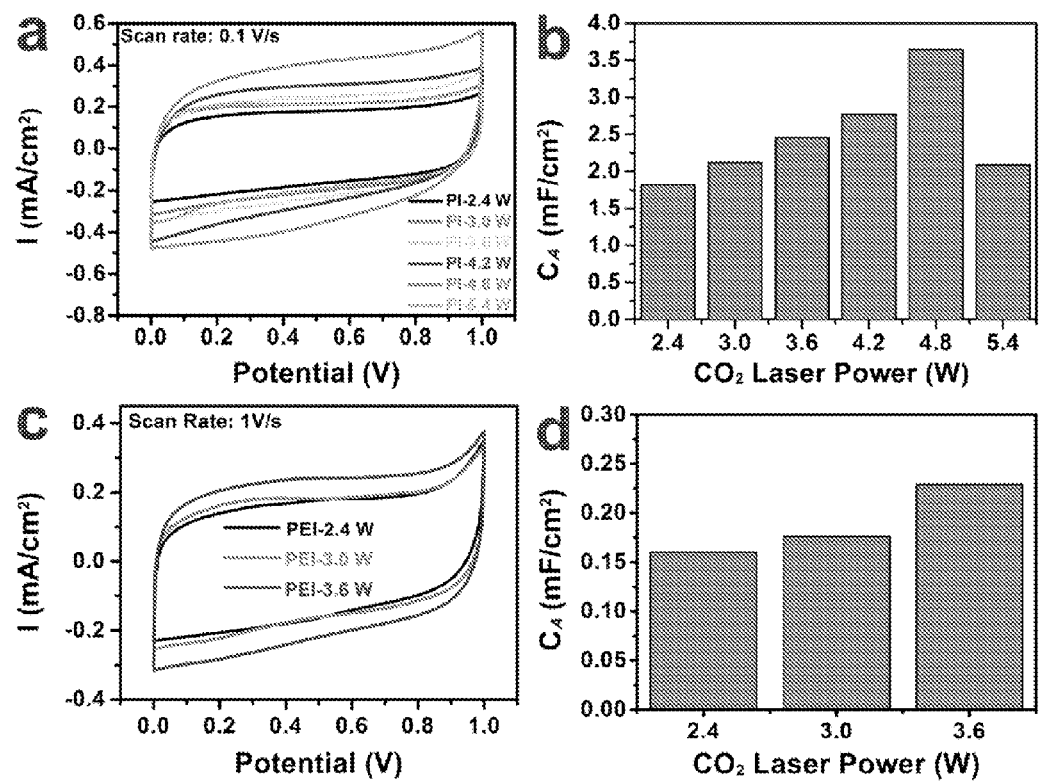
FIG. 17 provides electrochemical characterizations of LIG-MSCs obtained from PI and PEI using different laser powers in 1 M $H_2SO_4$.
Figure 18:
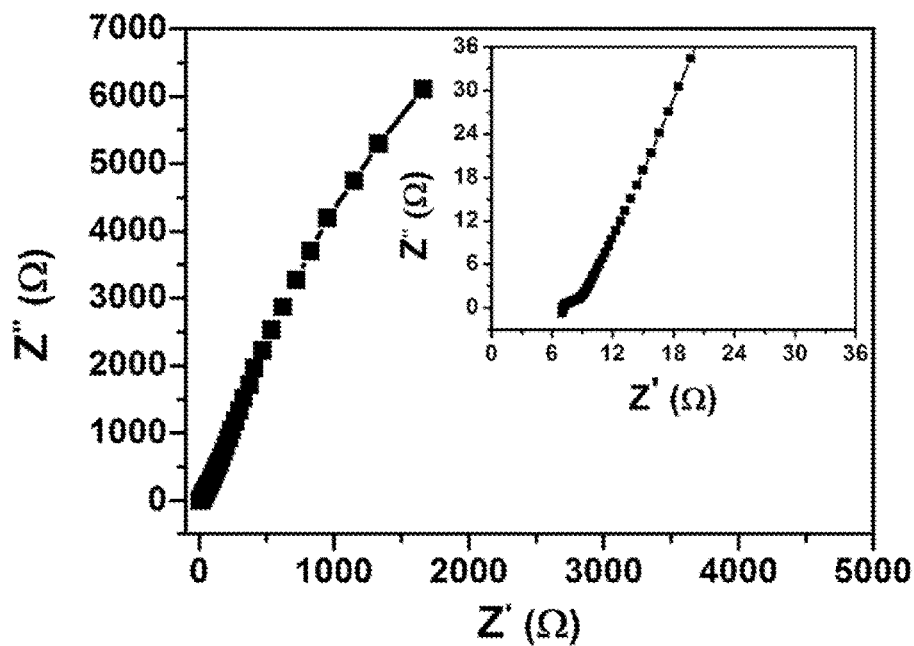
FIG. 18 provides impedance spectroscopy of LIG-MSCs obtained from PI using a laser power of 4.8 W in 1 M $H_2SO_4$. Equivalent series resistance is as low as 7Ω obtained at a high frequency range.

FIG. 16C depicts the device architecture of the fabricated LIG-MSCs. Cyclic voltammetry (CV) and galvanostatic charge-discharge (CC) measurements were performed to investigate the electrochemical performance of the fabricated LIG-MSCs. All CV curves of LIG-MSCs made with LIG electrodes at various laser powers are pseudo-rectangular in shape, which indicates good double-layer capacitive behaviors (FIG. 17). LIG-MSCs constructed with LIG-4.8 W electrodes generally exhibit the highest specific areal capacitance ($C_A$) (FIG. 17B). The $C_A$ of LIG-MSCs made from PEI is ~10% of those from PI (FIGS. 17C-D), possibly associated with the lower nitrogen content. Therefore, all other electrochemical measurements were carried out on LIG-MSCs made from PI with a laser power of 4.8 W. FIGS. 16D-E are the CV curves at scan rates ranging from 20 to 10,000 mV·s$^{-1}$. Although there exist certain levels of oxygen or nitrogen contents in LIG, the devices do not exhibit pseudo-capacitive behavior, as suggested from CV curves at a small rate of 20 mV·s$^{-1}$, which shows no anodic and cathodic peaks. Even at a high rate of 10,000 mV·s$^{-1}$, the CV curve maintains its pseudo-rectangular shape, and this is suggestive of high power performance. The $C_A$ as a function of scan rate is shown in FIG. 16F. At a scan rate of 20 mV·s$^{-1}$, the $C_A$ is >4 mF·cm$^{-2}$, which is comparable to or higher than the values obtained in recently reported GO-derived supercapacitors. The specific capacitance of the material by weight is ~120 F·g$^{-1}$. At 10,000 mV·s$^{-1}$, the $C_A$ is still higher than 1 mF·cm$^{-2}$. This optimal capacitive behavior is further confirmed by the nearly triangular CC curves at varying current densities from 0.2 to 25 mA·cm$^{-2}$ (FIGS. 16G-H). From the $C_A$ vs. discharge current densities ($I_D$) plotted in FIG. 16I, the LIG-MSCs can deliver $C_A$ of ~3.9 mF·cm$^{-2}$ at $I_D$ of 0.2 mA·cm$^{-2}$ and still maintain 1.3 mF·cm$^{-2}$, even when the devices are operated at $I_D$ of 25 mA·cm$^{-2}$. This value is comparable or higher than those reported for some carbon-based MSCs at the same current densities. The impedance measurement shows a low equivalent series resistance of 7Ω (FIG. 18).

Figure 19:
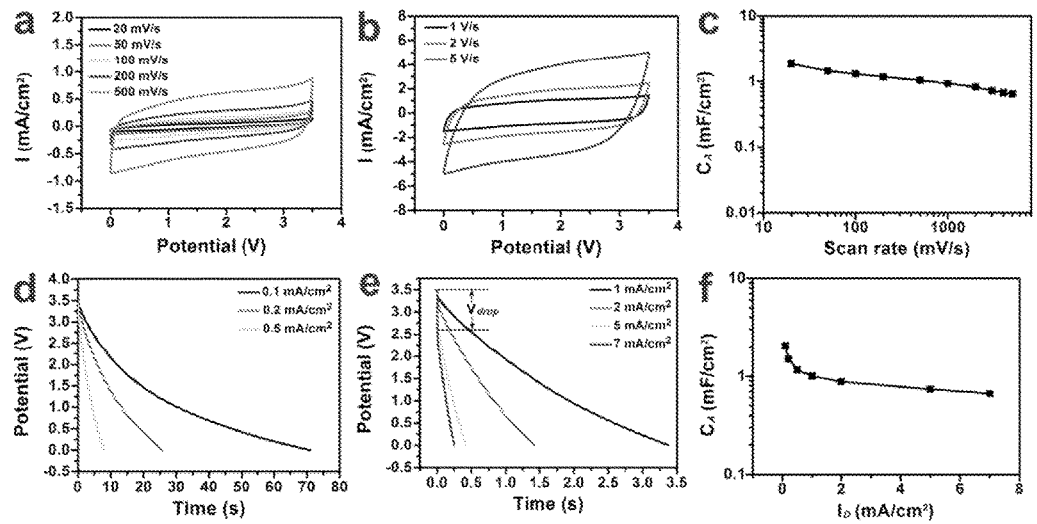
FIG. 19 provides electrochemical characterizations of LIG-MSCs obtained with a laser power of 4.8 W in BMIM-$BF_4$.
Figure 20:
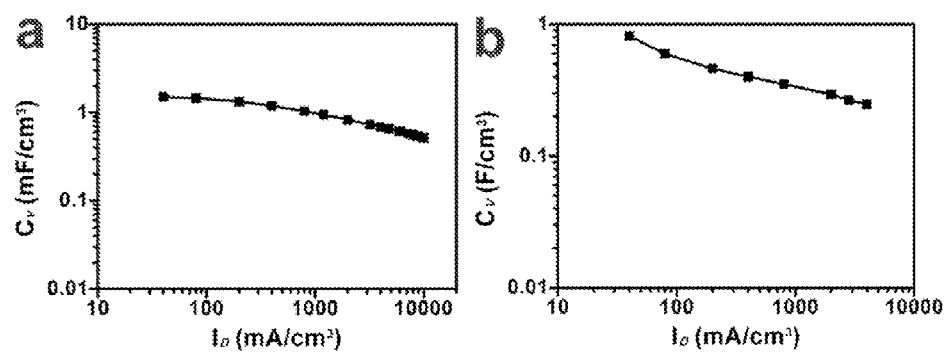
FIG. 20 provides a comparison of volumetric capacitances that are calculated from CC curves of LIG-MSCs in aqueous electrolyte and ionic liquid (IL).

Other than aqueous electrolyte, Applicants also explored the use of an ionic liquid electrolyte in LIG-MSCs. FIG. 19 shows CV and CC curves of LIG-MSCs in 1-butyl-3-methylimidazolium tetrafluoroborate (BMIM-BF$_4$), which suggest optimal capacitive behaviors. The corresponding specific volumetric capacitances ($C_V$) vs. discharge volumetric current densities ($I_D$) is shown in FIG. 20.

Figure 21:
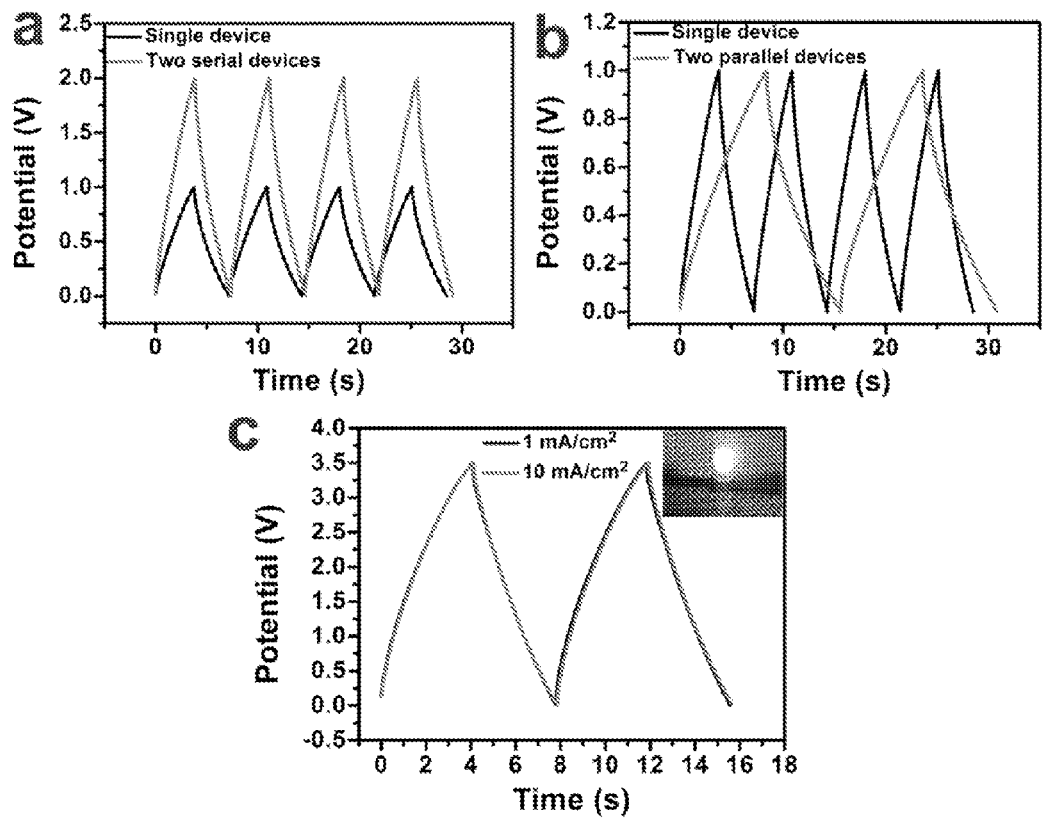
FIG. 21 provides electrochemical performance of LIG-MSCs in series/parallel combinations. Electrolyte for devices in FIGS. 21A-B is 1 M $H_2SO_4$, and for devices in FIG. 21C is BMIM-$BF_4$.
Figure 22:
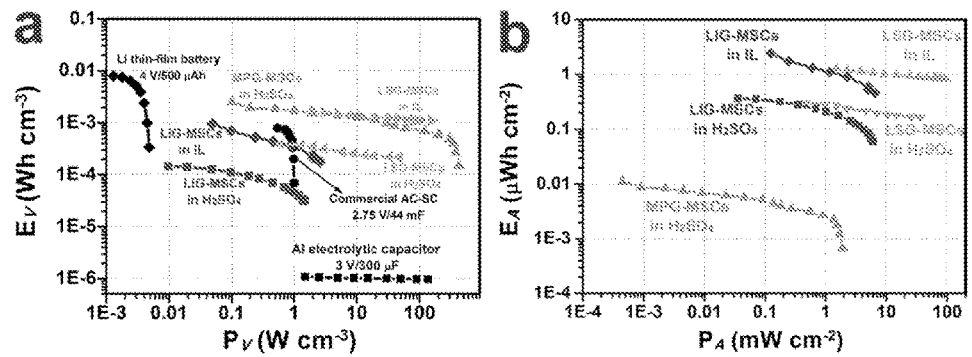
FIG. 22 provides a comparison Ragone plots of different energy storage devices.
Figure 23:
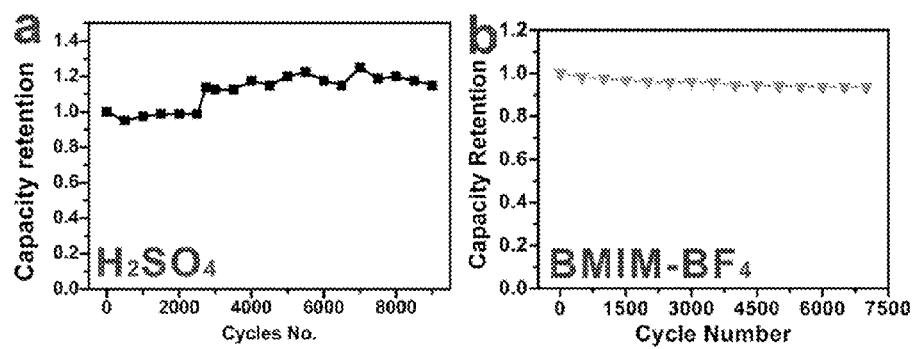
FIG. 23 provides capacity retention of LIG-MSCs constructed with LIG-4.8 W in 1 M $H_2SO_4$ and ionic liquid (BMIM-$BF_4$).
Figure 24:
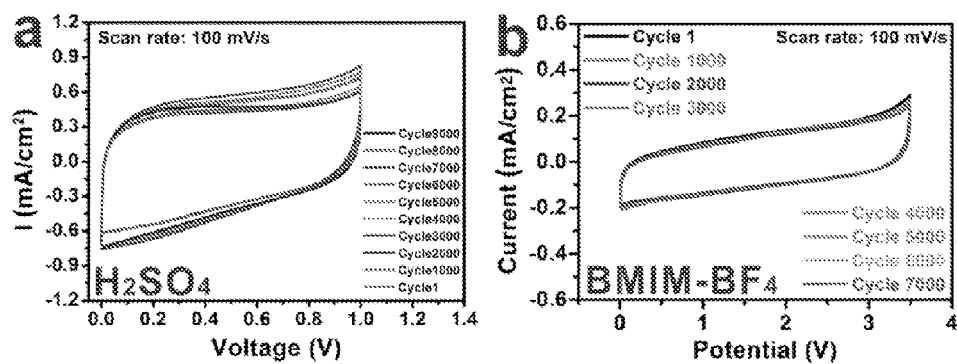
FIG. 24 provides CV curves of LIG-MSCs obtained with laser power of 4.8 W in IM $H_2SO_4$ (FIG. 24A) and BMIM-$BF_4$ (FIG. 24B). The curves were obtained at a sweep rate of 100 $mV \cdot s^{-1}$ after every 1000 cycles.

For practical applications requiring either higher operation potential or current or both, supercapacitors need to be connected in serial and/or parallel configurations. As shown in FIG. 21, the output potentials and currents can be well-controlled by serial and parallel connections to power light-emitting diodes (LEDs). Compared with commercial devices such as aluminum electrolytic capacitors (AECs), thin film Li-ion batteries, and activated carbon supercapacitors (AC-SCs), LIG-MSCs offer more energy or power density or both as seen from the Ragone plots (FIG. 22). When compared with recently demonstrated reduced GO-film (called MPG films) MSCs (MPG-MSCs) and laser-scribed graphene MSCs (LSG-MSCs), LIG-MSCs can deliver comparable $E_V$, although power performance needs to be enhanced. Using specific areal energies ($E_A$) and power ($P_A$) densities, one can obtain reasonable values for comparing performance of in-plane MSCs intended for commercial applications. FIG. 22B shows that LIG-MSCs exhibit ~100× higher $E_A$ and ~4×$P_A$ than MPG-MSCs. Furthermore, LIG-MSCs offer slightly better $E_A$ than LSG-MSCs with comparable power performance. In addition, cycling performance shows that there is negligible capacitance degrading after 9000 cycles in aqueous electrolytes and 7000 cycles in ionic liquid electrolytes (FIG. 23). Moreover, CV curves at every 1000 cycles show no involved pseudo-capacitive peaks (FIG. 24).

Without being bound by theory, it is envisioned that the high capacitance of the LIG-MSC can be attributed to the 3D network of highly conductive graphene showing high surface area and abundant wrinkles, which provide easy access for the electrolyte to form a Helmholtz layer. Moreover, density function theory (DFT) calculations suggest that the ultra-polycrystalline nature of LIG-MSC can also improve the capacitance. The total capacitance (C) is contributed by the quantum capacitance ($C_q$), and the liquid electrolyte ($C_l$) consisting of Helmholtz and diffusion regions: $C^{-1}=C_q^{-1}+C_l^{-1}$. $C_l$ is mostly controlled by surface area. $C_q$ represents the intrinsic property of the electrode material and can be calculated from its electronic structure in eq 1:

$$C_q(V) = \frac{1}{SV} \int_0^V eD(\varepsilon_F - eV')dV' \qquad (1)$$

Figure 25:
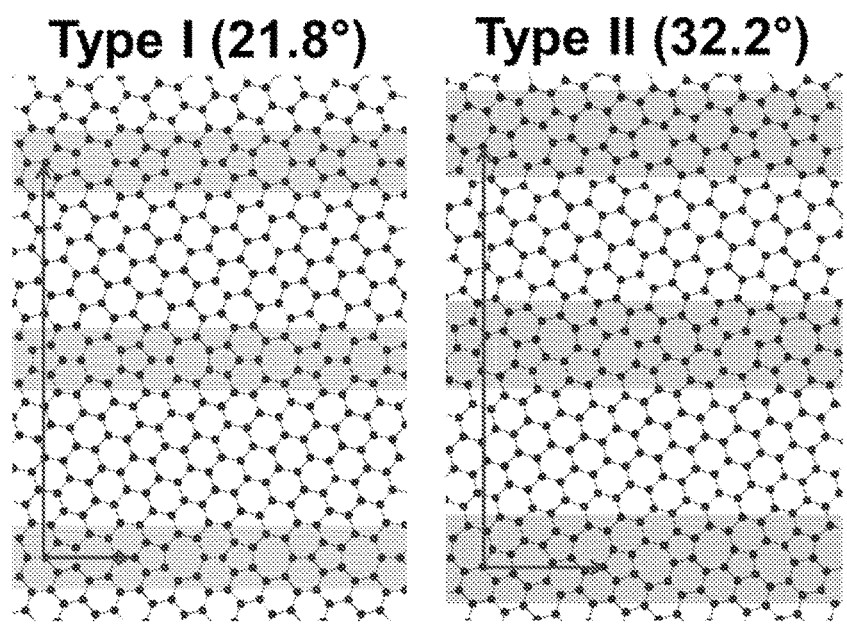
FIG. 25 provides atomic structures of the calculated polycrystalline graphene sheets. The arrows indicate the unit cell, and the grain boundary regions are shaded. Numbers show two types of misorientation angles (21.8° and 32.2°) between grains.

In equation 1, S is the surface area, V is the applied voltage, D is the density of states, $\varepsilon_F$ is the Fermi level, and e is the electron charge. The ultra-polycrystalline nature suggested by FIGS. 8C-D as well as FIG. 12D indicate the abundance of grain boundaries (GBs), which are composed of pentagon and heptagon pairs. These defects are more 'metallic' than regular hexagons, and therefore can be expected to enhance the charge storage performance. Calculations are performed by using DFT. The GB effect is modeled by a planar polycrystalline graphene sheet (FIG. 25). Two types of GBs are considered as representatives (FIGS. 16J-K).

As another case, Applicants also consider a graphene sheet fully composed of pentagons and heptagons (FIG. 16L, also referred to as a "pentaheptite."). The calculated $C_q$ is shown in FIG. 16N. Clearly, a polycrystalline sheet has a much higher $C_q$ than perfect graphene, as a result of a higher density of states near the Fermi level due to the presence of GBs. The type II GB enhances the storage more than in type I, as it has a higher defect density along the GBs. The highest $C_q$ is found in pentaheptite due to its highest disorders and metallicity. Though here only the $C_q$ is calculated, it can be expected that the $C_{tot}$ increases as $C_q$ increases. These results suggest that GBs-rich LIG with maintained electric conductivity would be able to deliver higher capacitance than perfect defect-free graphitic materials. Chemical doping of its rich ultra-polycrystalline domains of pentagon-heptagon rings might further enhance the capacitance. This is the first theoretical calculation that shows the effect of pentagon-heptagon grain boundaries on charge storage, a result that could inspire theoreticians to further explore the potential of these materials.

In summary, Applicants have demonstrated in this Example a one-step and scalable approach for the preparation of porous graphene from commercial polymer sheets using $CO_2$ laser irradiation under ambient conditions. Applicants have established that the physical and chemical properties of the resulting LIG structures render them uniquely suitable for energy storage devices delivering promising electrochemical performance. The use of commercially available polymer sheets would allow for roll-to-roll manufacturing, which can facilitate commercialization. Theoretical modeling suggests that the enhanced capacitance could partially come from defect-rich boundaries in LIG.

Example 1.7. Methods

Kapton polyimide (PI, Cat. No. 2271K3, thickness: 0.005") and other polymers sheets used in this Example were all purchased from McMaster-Carr unless stated otherwise. The polymers were used as received unless noted otherwise. Laser scribing on polymer sheets were conducted with a carbon dioxide ($CO_2$) laser cutter system (Universal X-660 laser cutter platform): 10.6 μm wavelength of laser with pulse duration of ~14 μs. The beam size is ~120 μm. Laser power was varied from 2.4 W to 5.4 W with increments of 0.6 W. The laser system offers an option of controlling the scan rates from 0.7 to 23.1 inches per second. The laser system also provides an option of setting pulses per inch (ppi) with a range from 10 to 1000 ppi. By experimentation it was discovered that the ppi rate played little role in changing the threshold power. Other than as specifically stated, the same scan rate of 3.5 inch/s and 1000 ppi were used for all experiments. All of the laser experiments were performed under ambient conditions.

Example 1.8. Device Fabrication

LIG electrodes were directly written using the computer-controlled $CO_2$ laser. In the MSCs, the LIG serves as both the active electrodes and current collectors. For better electrical connection, silver paint was applied on the common areas of the positive and negative electrodes. The electrodes were extended with conductive copper tapes and then connected to electrochemical workstation. To protect the contact pads from the electrolyte, Kapton polyimide tape was employed to define the interdigitated area (FIG. 16C).

Example 1.9. Characterization

SEM images were taken on a FEI Quanta 400 high resolution field emission instrument. The TEM and HRTEM were performed using a 2100F field emission gun. Aberration-corrected scanning transmission electron microscopy (Cs-STEM) images were taken using an 80 KeV JEOL ARM200F equipped with a spherical aberration corrector. The LIG films were peeled off and sonicated in chloroform before being transferred onto a C-flat TEM grid. X-ray photoelectron spectroscopy (XPS) was performed using a PHI Quantera SXM Scanning X-ray Microprobe with a base pressure of $5\times10^{-9}$ Torr. All of the survey spectra were recorded in 0.5 eV step size with a pass energy of 140 eV. Elemental spectra were recorded in 0.1 eV step sizes with a pass energy of 26 eV. All the spectra were corrected using C1s peaks (284.5 eV) as references. X-ray diffraction (XRD) was conducted on a Rigaku D/Max ultima II with Cu Kα radiation ($\lambda$=1.54 Å). A Renishaw Raman microscope using 514-nm laser excitation at room temperature with a laser power of 5 mW was employed to obtain Raman spectra. A Nicolet infrared spectroscope was used to acquire the FTIR spectra. The surface area of LIG was measured with a Quantachrome autosorb-3b BET surface analyzer. TGA (Q50, TA Instruments) thermograms were carried out between 100° C. to 900° C. at 5° C.·$min^{-1}$ under argon; the water content was calculated from the weight loss between room temperature and 100° C. The sheet resistances were measured using a Keithley four-point probe meter (model: 195A, detection limit: 20 MΩ). The LIG samples for XRD, BET and TGA experiments were powder scratched from LIG films. Other characterizations were conducted directly on LIG films.

The crystalline size ($L_c$) along the c-axis and domain size in the a-axis ($L_a$) and of LIG are calculated from the characteristics of the XRD (002) and (100) peaks using the eqs 2 and 3, respectively:

$$L_c = \frac{0.89\lambda}{B_{1/2}(2\theta)\cos\theta} \quad (eq\ 2)$$

$$L_a = \frac{1.84\lambda}{B_{1/2}(2\theta)\cos\theta} \quad (eq\ 3)$$

In the above equations, $\lambda$ is the wavelength of the X-ray ($\lambda$=1.54 Å) and $B_{1/2}$ (2θ) (in radian units) is the full width at half-maximum of the peaks (200) and (100). Using Raman spectroscopic data, and calculating the crystalline size in the a-axis ($L_a$) from the ratio of integrated intensity of the G peak ($I_G$) and D peak ($I_D$), the $L_a$ can be obtained by eq 4:

$$L_a = (2.4\times10^{-10})\times\lambda_l^4\times\left(\frac{I_G}{I_D}\right) \quad (eq\ 4)$$

In the above equation, $\lambda_l$ is wavelength of the Raman laser ($\lambda_l$=514 nm).

Example 1.10. Measurements

CV, galvanostatic CC measurements, and electrochemical impedance spectroscopy (EIS) were performed using a CHI 608D workstation (USA). All of measurements were conducted in ambient conditions for aqueous electrolytes (1 M $H_2SO_4$). The LIG-MSCs using 1-butyl-3-methylimidazolium tetrafluoroborate (BMIM-$BF_4$, Sigma-Aldrich) were assembled and measured in an argon-filled glove box (VAC, model: NEXUS) with controlled $O_2$ and $H_2O$ levels lower than 1 ppm. To ensure full diffusion of ions onto surfaces of LIG electrodes, the microdevices were soaked in electrolyte for 2 to 3 h before measurements. EIS was performed using the sinusoidal signal of 10 mV amplitude at a frequency ranging from 10 mHz to 100 kHz.

Example 1.11. Calculation of Parameters as Indications for Electrochemical Performance of LIG-MSCs The specific areal capacitances ($C_A$, in mF·$cm^{-2}$) based on the CV curves were calculated by eq 5:

$$C_A = \frac{1}{2\times S\times v\times(V_f-V_i)}\int_{V_i}^{V_f} I(V)dV \quad (eq\ 5)$$

In the above equation, S is the total surface area of active electrodes (in $cm^2$) with 0.6 $cm^2$ for the devices configuration used in this work; v is the voltage sweep rate (in V·$s^{-1}$); $V_f$ and $V_i$ are the potential limits of CV curves; and I(V) is the voltammetric current (in amperes). $\int_{V_i}^{V_f} I(V)dV$ is the integrated area from CV curves.

The total surface area of the device including the spacing between electrodes was ~0.86 $cm^2$, which is used for calculating the power and energy density in the Ragone plot shown in FIG. 22. The specific areal ($C_A$, in mF·$cm^{-2}$) and volumetric capacitance ($C_V$, in F·m$^3$) were calculated from charge-discharge (CC) curves by eq 6 and 7:

$$C_A = \frac{I}{S \times (dV/dt)} \quad \text{(eq 6)}$$

$$C_V = \frac{C_A}{d} \quad \text{(eq 7)}$$

In the above equations, I is the discharge current (in amperes) and dV/dt is the slope of galvanostatic discharge curves. S is the total area of the active positive and negative electrodes and d is the thickness of active materials. For the devices used in FIGS. 18 and 20A, d was ~25 µm.

The specific areal ($E_A$, in µWh·cm$^{-2}$) and volumetric energy densities ($E_V$, in Wh·m$^{-3}$) were calculated from eq 8 and 9:

$$E_A = \frac{1}{2} \times C_A \times \frac{(\Delta V)^2}{3600} \quad \text{(eq 8)}$$

$$E_V = \frac{1}{2} \times C_V \times \frac{(\Delta V)^2}{3600} \quad \text{(eq 9)}$$

In the above equations, $\Delta V = V_{max} - V_{drop}$ is the discharge potential range ($V_{max}$ is the maximum voltage, 1 V for $H_2SO_4$, 3.5 V for BMIM-BF$_4$), $V_{drop}$ is voltage drop indicated from the difference of the first two data points in the discharge curves. The specific areal ($P_A$, in mW·cm$^2$) and volumetric ($P_V$, in W·cm$^3$) power densities were obtained from eq 10 and 11:

$$P_A = \frac{E_A}{\Delta t} \times 3600 \quad \text{(eq 10)}$$

$$P_V = \frac{E_V}{\Delta t} \times 3600 \quad \text{(eq 11)}$$

In the above equations, $\Delta t$ is discharge time (in s).

Example 1.12. DFT Calculations of Perfect and Polycrystalline Graphene Layers

DFT calculations were performed with projector-augmented wave pseudopotentials and Perdew-Burke-Ernzerhof exchange-correlation functional, as implemented in VASP. All structures were relaxed until the force on each atom was <0.01 eVÅ$^{-1}$. Two types of polycrystalline sheets are considered, as shown in FIG. 21. Monkhorst-Pack (MP) k-points sampling is used, with a vacuum space >15 Å in the non-periodic direction. To obtain the density of states (DOS), Applicants used the tetrahedron method with Blöchl corrections with a 45×7×1 k-points mesh.

Example 2. Fabrication of Flexible Boron-Doped Laser Induced Graphene Microsupercapacitors In this Example, Applicants demonstrate that boron-doped porous graphene can be prepared in ambient air using a facile laser induction process from boric acid containing polyimide sheets. At the same time, active electrodes can be patterned for flexible microsupercapacitors. As a result of boron doping, the highest areal capacitance of as-prepared devices reaches 16.5 mF/cm$^2$, three times higher than non-doped devices, with concomitant energy density increases of 5 to 10 times at various power densities. The superb cyclability and mechanical flexibility of the device is also well-maintained.

In particular, Applicants report in this Example that boron-doped LIG (B-LIG) can be synthesized with a laser induction method that is performed in air using a standard commercial laser writing tool as found in common machine shops. The synthesis starts by dissolving $H_3BO_3$ into poly (pyromellitic dianhydride-co-4,4'-oxydianiline amic acid) (or poly(amic acid), PAA) solution as a boron precursor, followed by condensation of the PAA to produce boric acid containing PI sheet. Subsequent laser induction using a commercial $CO_2$ laser writes patterns on the as-prepared PI sheet under ambient conditions. During the laser induction, the surface of the PI sheet, with its $H_3BO_3$, transforms into B-LIG. At the same time, the B-LIG on the PI film can be patterned into interdigitated shapes for flexible MSCs.

The resulting B-LIG has significantly improved electrochemical performance over the non-doped structures, with three times higher capacitance and 5 to 10 times higher energy density than Applicants achieved in pristine boron-free samples (e.g., Example 1). The transformation of PAA to PI is preferred for the successful formation of LIG with high electrochemical properties. Meanwhile, the cyclability and flexibility of as-prepared devices are well-maintained, demonstrating the potential of B-LIG materials for future low-cost energy storage devices.

Figure 26:
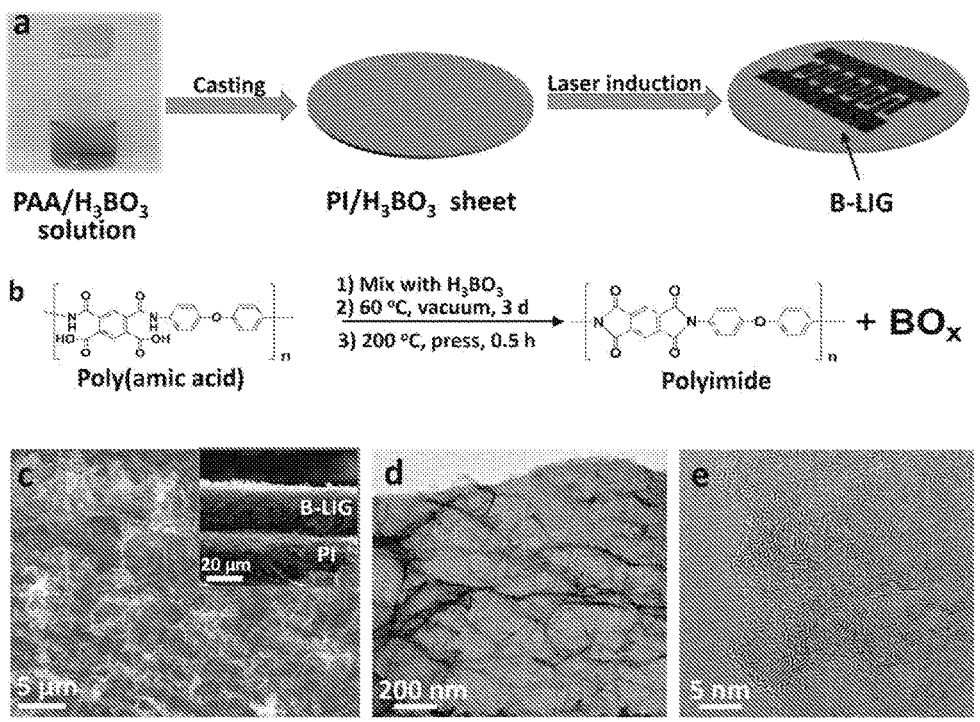
FIG. 26 provides data and images relating to the formation of boron-doped LIG (B-LIG) and fabrication of MSCs containing the B-LIGs (B-LIG-MSC).

FIG. 26A shows a scheme for the synthesis and patterning process of B-LIG materials for MSCs. Starting with a 12.8 wt % PAA solution in NMP, various weight percentages of $H_3BO_3$ (0, 1, 2, 5 and 8 wt % relative to PAA) were added and mixed under bath-sonication for 30 minutes to form a uniform precursor solution. Next, the solution was poured into an aluminum dish and the solvent removed in a vacuum oven at 60° C. for 3 days, resulting in a solid PAA/$H_3BO_3$ sheet. The PAA/$H_3BO_3$ sheet was then placed in a hydraulic press (Carver press) and heated to 200° C. for 30 min under a pressure of ~0.3 MPa to dehydrate the PAA/$H_3BO_3$ sheet and form the PI/$H_3BO_3$ film. During this step, PAA and $H_3BO_3$ will dehydrate and transform into PI and BO$_x$ as shown in FIG. 26B. The dehydration from PAA to PI is preferred for successful formation of LIG and will be discussed in detail herein.

Figure 27:
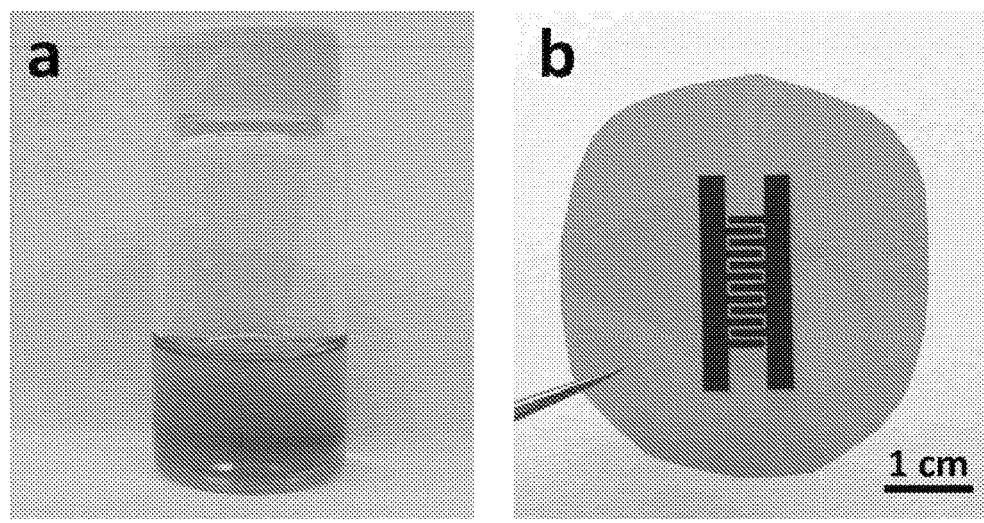
FIG. 27 is shows photographs of a PAA solution with 5 wt % of $H_3BO_3$ (FIG. 27A) and patterned B-LIG on the PI/$H_3BO_3$ sheet after laser induction (FIG. 27B).

Finally, a standard $CO_2$ laser cutting system was used under ambient conditions to convert PI/$H_3BO_3$ to xB-LIG (x=0, 1, 2, 5, and 8, which denotes the initial $H_3BO_3$ loading weight percentages). Optical images of the PAA/$H_3BO_3$ solution and patterned B-LIG on a PI/$H_3BO_3$ sheet are presented in FIG. 27.

Here, the incorporation of $H_3BO_3$ into the PAA was preferable. Attempts to incorporate boron from sources other than $H_3BO_3$, including ammonia borane and m-carborane, resulted in little or no boron doping of the LIG. Without being bound by theory, Applicants envision that this is because boric acid dehydrates and polymerizes on heating while the other two evaporate or sublime, causing the failure of boron doping. The major advantage of this synthetic process is that B-LIG can be fabricated and patterned at the same time during laser induction, making it an ideal material for future roll-to-roll processing.

The morphology of formed B-LIG was characterized using scanning electron microscopy (SEM) and transmission electron microscopy (TEM). FIG. 26C shows an SEM image of the as-prepared 5B-LIG that exhibits a porous structure due to the rapid formation of gaseous products during laser induction. The inset in FIG. 26C reveals that the thickness of 5B-LIG on the PI sheet surface is ~25 µm. FIG. 26D shows the TEM image of 5B-LIG at low magnification containing few-layer graphene structures with nanoscale ridges and wrinkles, which would be beneficial for higher accessible surface area and therefore enhanced electrochemical performance.

Figure 28:
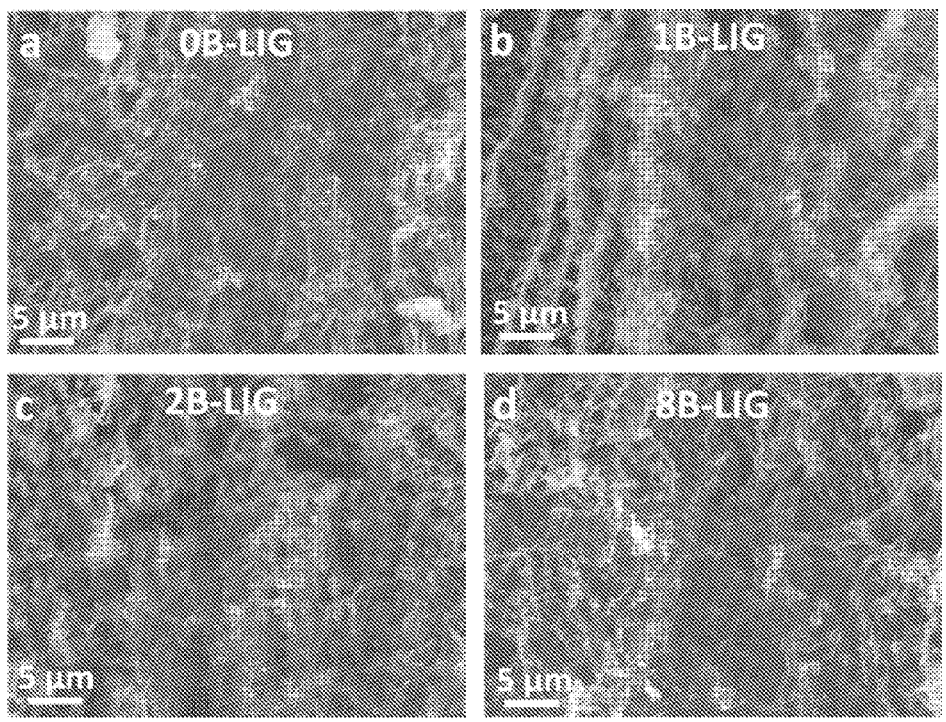
FIG. 28 shows SEM images of LIG materials with different boron loadings, including 0B-LIG (FIG. 28A), 1B-LIG (FIG. 28B), 2B-LIG (FIG. 28C), and 8B-LIG (FIG. 28D).
Figure 29:
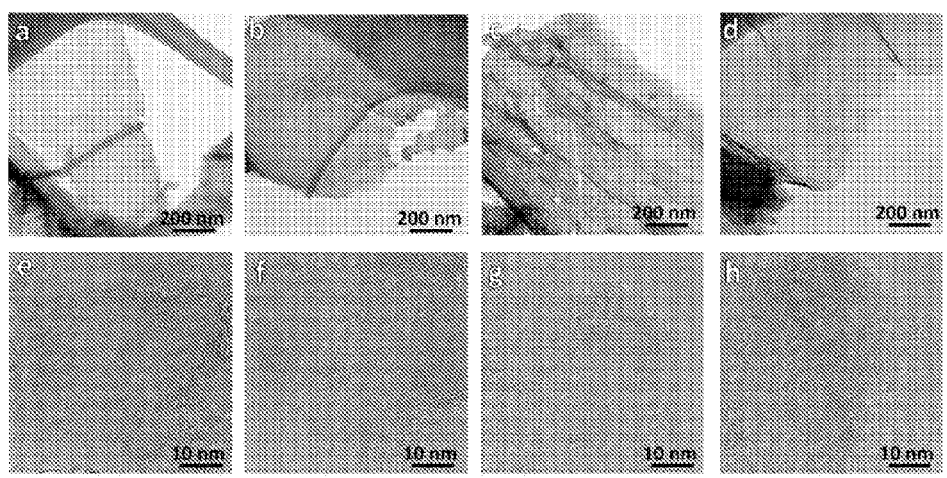
FIG. 29 provides TEM and HRTEM images of LIG materials with different boron loadings, including 0B-LIG (FIGS. 29A and 29E), 1B-LIG (FIGS. 29B and 29F), 2B-LIG (FIGS. 29C and 29G), and 8B-LIG (FIGS. 29D and 29H).

High-resolution TEM (HRTEM) image in FIG. 26E further confirms the graphitic nature of the 5B-LIG nanosheet. Numerous graphene edges were found on the surface of the 5B-LIG nanosheet, again indicating a highly accessible surface area. For comparison, LIG materials with different loadings of $H_3BO_3$ (0B-LIG, 1B-LIG, 2B-LIG, and 8B-LIG) were also prepared and imaged with SEM and TEM (FIGS. 28-29). No significant difference was found among these samples, indicating that the loading of $H_3BO_3$ has little effect on the morphology of the resulting LIG.

Figure 30:
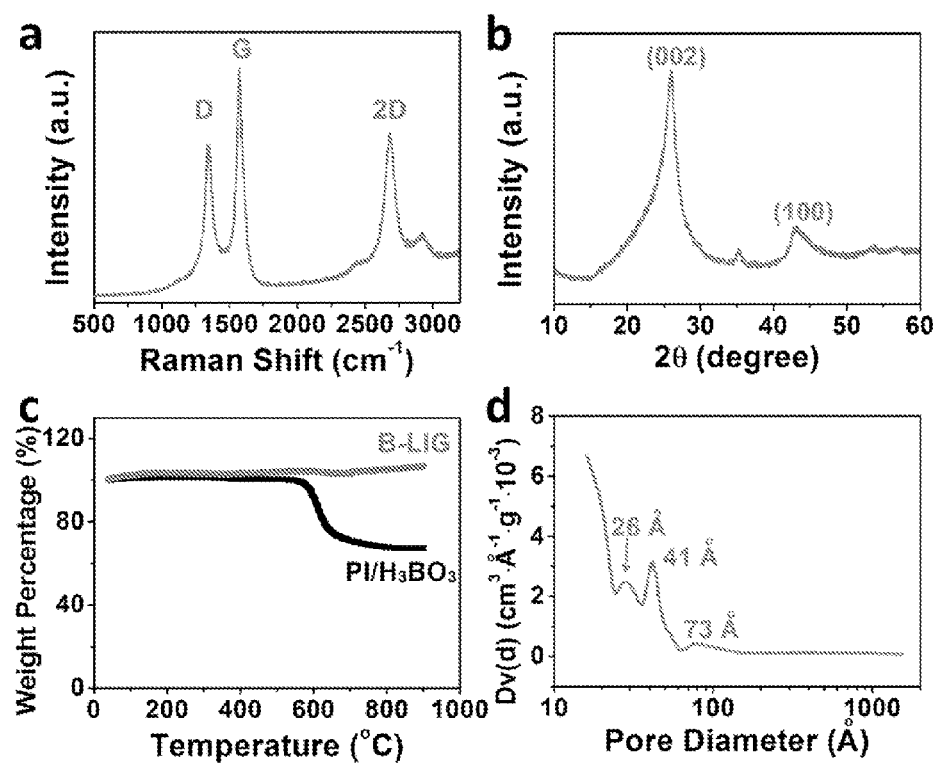
FIG. 30 provides data relating to the characterization of 5B-LIG materials.

Raman spectroscopy and powder X-ray diffraction were further used to characterize the morphology of the B-LIG material. The Raman spectrum of 5B-LIG in FIG. 30A shows three characteristic peaks for graphene derived material: the D peak at ~1350 $cm^{-1}$ induced by defects or disordered bent sites, the G peak at ~1590 $cm^{-1}$ showing graphitic $sp^2$ carbon, and the 2D peak at ~2700 $cm^{-1}$ originating from second order zone boundary phonons. The large D peak observed here could arise from numerous graphene edges, consistent with TEM observations (FIG. 26E), boron doping into the LIG sheets, or the bending of the graphene layers in the porous structure.

Figure 31:
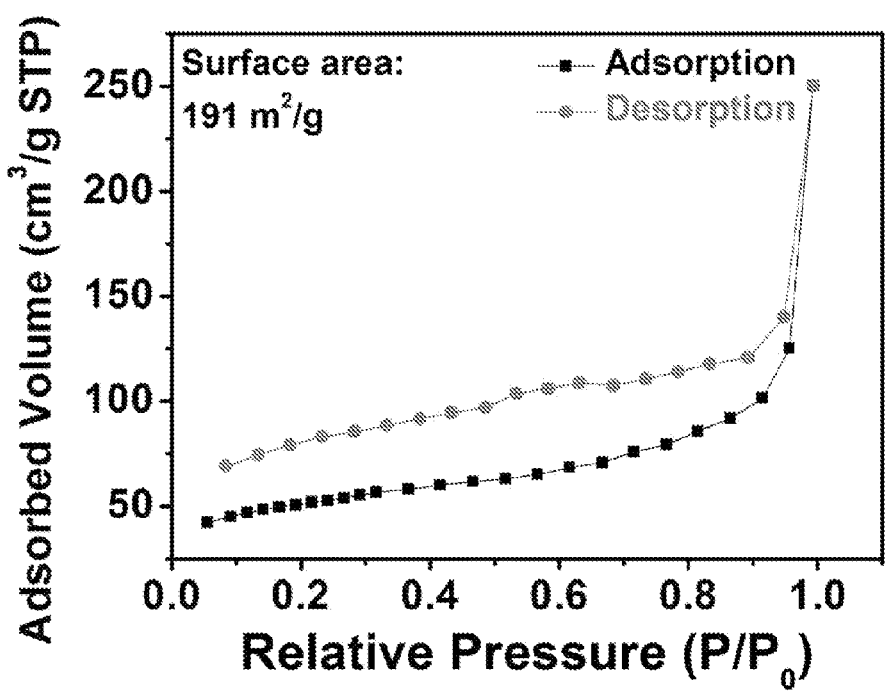
FIG. 31 shows the BET measurement of B-LIG materials. The calculated surface area is 191 m$^2$/g.

The XRD pattern in FIG. 30B shows a prominent peak at 2θ=260, indicating an interlayer spacing of ~3.4 Å between (002) graphitic crystal planes in 5B-LIG. A (100) graphitic crystal phase was also found at 2θ=430. The high degree of graphitization of 5B-LIG is also verified by thermogravimetric analysis (TGA) measurement under argon (FIG. 30C). The PI/$H_3BO_3$ substrate begins to decompose at 550° C., whereas 5B-LIG remains stable over 900° C. From BET analysis (FIG. 31), the surface area of 5B-LIG is 191 $m^2$/g. FIG. 30D shows the pore size distribution of 5B-LIG, which are all <10 nm (26 Å, 41 Å and 73 Å).

Figure 32:
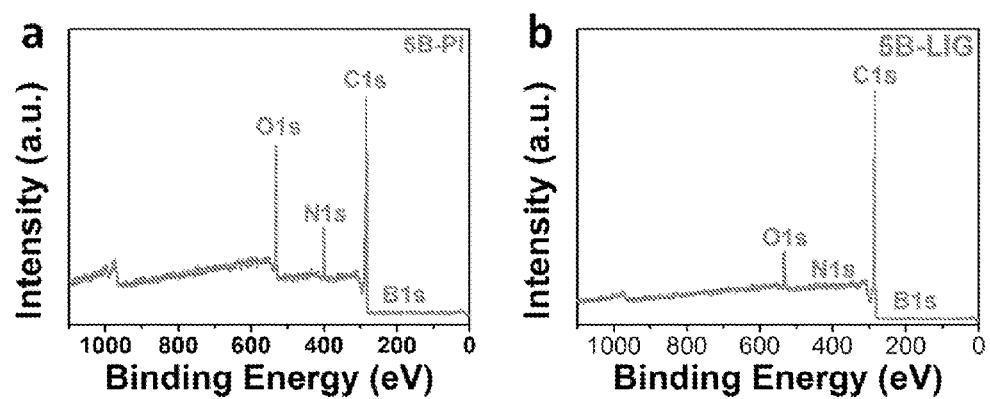
FIG. 32 shows XPS survey spectra for 5B-PI (FIG. 32A) and 5B-LIG (FIG. 32B).
Figure 33:
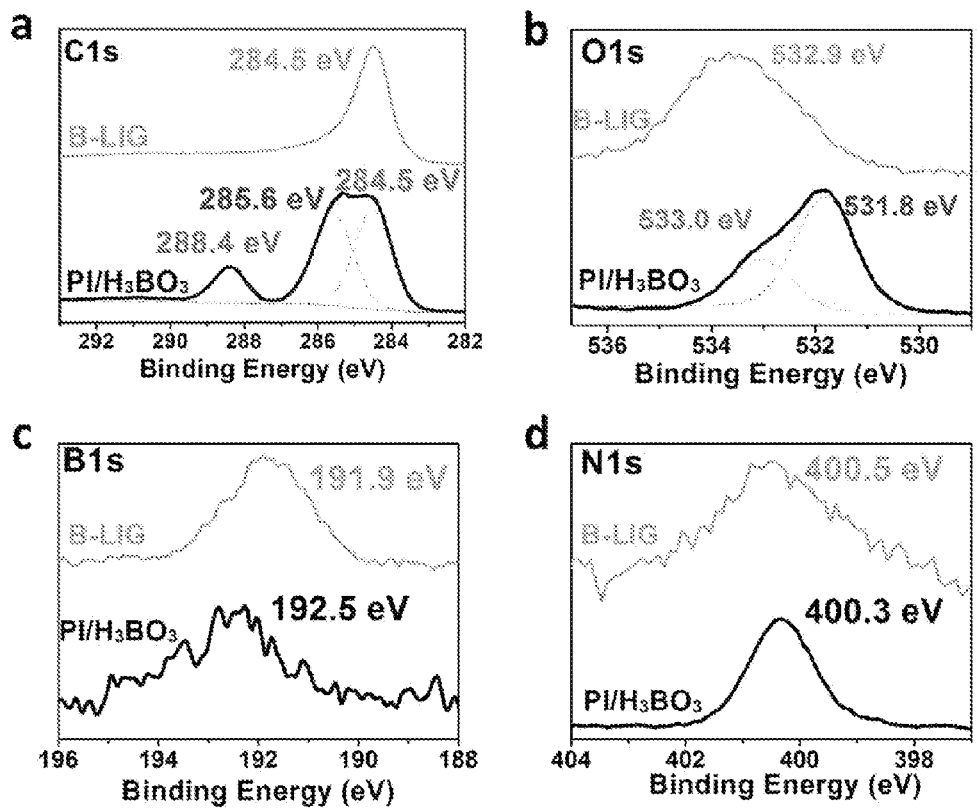
FIG. 33 shows XPS spectra of 5B-LIG and PI/H$_3$BO$_3$ sheets.

To confirm the boron doping in the product, X-ray photoelectron spectroscopy (XPS) was performed on a $H_3BO_3$-loaded sample before and after laser induction, as shown in FIG. 32 for survey spectra and FIG. 33 for elemental spectra. Prior to laser induction, the C1s peak originating from PI/$H_3BO_3$ could be fitted by three sub-peaks: 284.5, 285.6 and 288.4 eV, representing C—C, C—N and C—O—C=O bonding, respectively (FIG. 33A). For the O1s peak, two sub-peaks can be found at 533.0 and 531.8 eV, representing C—O and C=O bonding (FIG. 33B). After laser induction, the 5B-LIG only showed a single prominent peak at 284.5 eV for C1s and 532.9 eV for O1s, and the atomic percentage of carbon increased from 72% to 84%, whereas oxygen decreased from 19% to 4.3%, indicating that the imide group containing C=O bonding forms a graphitic structure. Also, the B1s peak (FIG. 33C) shifted from 192.5 eV in B-PI down to 191.9 eV in 5B-LIG after laser induction, showing that boron in the LIG sheet was in the oxidized form ($BCO_2$). The position of N1s changed little after laser treatment (FIG. 33D), but its atomic percentage dropped from 7.6% to 2.0%, again indicating that the imide group is the main reacting site during laser induction process.

Figure 34:
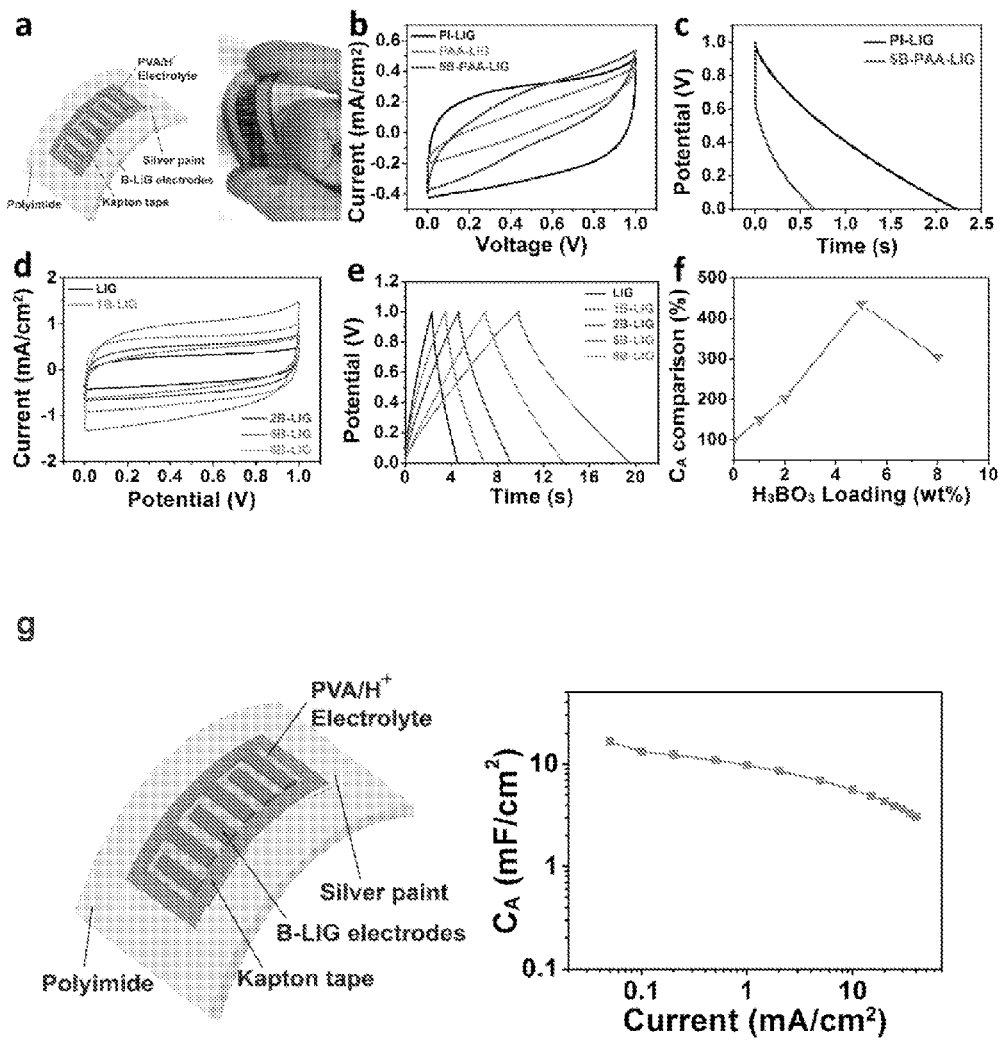
FIG. 34 provides an electrochemical performance comparison of LIG-MSCs with different H$_3$BO$_3$ loadings.

To investigate the electrochemical properties of the B-LIG, it was directly patterned into interdigitated electrodes during laser induction and then fabricated into in-plane MSCs, as shown in FIG. 34A. A solid-state electrolyte made from poly(vinyl alcohol) (PVA) and $H_2SO_4$ was used to ensure the flexibility of the device (as discussed in Example 3, Applicants have shown that polymeric electrolytes promote a better electrochemical performance from LIG than conventional aqueous electrolytes).

To demonstrate the importance of the dehydration reaction of PAA to PI, PAA sheets with or without $H_3BO_3$ were directly laser induced and fabricated into MSC to first compare their electrochemical performance. Cyclic voltammetry (CV) and charge-discharge (CC) measurements of corresponding MSC devices are exhibited and compared in FIGS. 34B-C. Both PAA-derived LIG-MSC and boron-doped PAA-derived LIG-MSC showed smaller and tilted CV curves compared to boron-free PI-derived LIG-MSC in FIG. 34B, representing a lower capacitance and a higher resistance. The large voltage drop observed at the initial stage of discharge run in PAA-derived LIG-MSC from FIG. 34C also indicates a higher internal resistance. This result shows that the dehydration step from PAA to PI is preferred for successful formation of B-LIG with higher quality and better electrical conductivity.

Next, Applicants compared the electrochemical performance of B-LIG with different initial $H_3BO_3$ loadings. At a scan rate of 0.1 V/s, all CV curves from xB-LIG-MSCs (x=0, 1, 2, 5, and 8) are pseudo-rectangular, as shown in FIG. 34D, representing good electrochemical double layer (EDL) character. Among them, 5B-LIG-MSC shows the largest areal capacitance ($C_A$), as evidenced by its highest CV current. From FIG. 34E, all galvanostatic CC curves from B-LIG-MSCs at a current density of 1 mA/$cm^2$ show a nearly triangular shape, further confirming the good capacitive behavior of the devices. Again, 5B-LIG-MSC exhibits the longest discharge runtime, indicating the best capacitance performance. FIG. 34F shows the influence of boron content on $C_A$, which increases from 0 to 5% reaching a maximum ~4 times greater than undoped-LIG, and then decreasing slightly at higher loadings. When the boron doping level is low, increasing boron dopants into LIG will increase the hole charge density thus enhancing the electrons charge storage. However, after a saturation threshold, additional boron doping might induce more scattering sites for electrons in the LIG sheet, lowering the conductivity of the material, causing the decrease of $C_A$. In addition, higher $H_3BO_3$ loadings could inhibit the dehydration process of PAA, resulting in the retardation of efficient PI formation. As a result, an optimum content of $H_3BO_3$ is needed to maximize the device performance.

Figure 35:
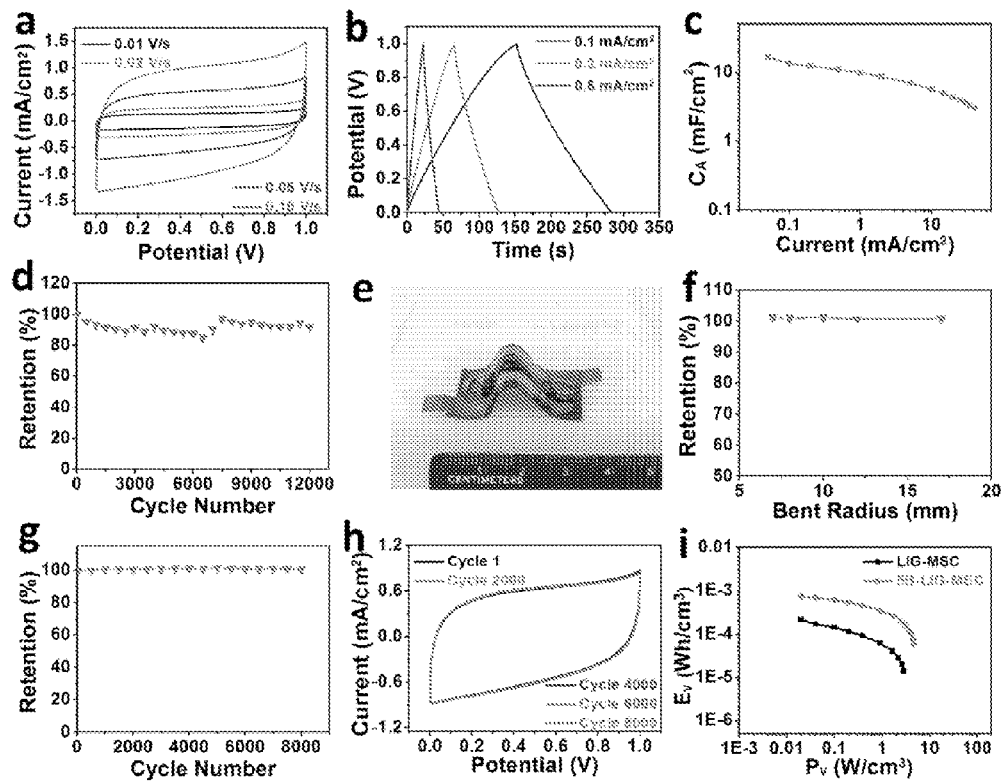
FIG. 35 provides data relating to the electrochemical performance of 5B-LIG-MSC.

Because 5B-LIG-MSC shows the highest $C_A$ among different $H_3BO_3$ loading samples, it was chosen to further examine the electrochemical performance of the 5B-LIG-MSC. FIG. 35A show CV curves of a 5B-LIG-MSC at scan rates of 0.01, 0.02, 0.05 and 0.10 V/s. The maintained pseudo-rectangular shape of CV curves over different scan rates represents good EDL formation of the devices.

Figure 36:
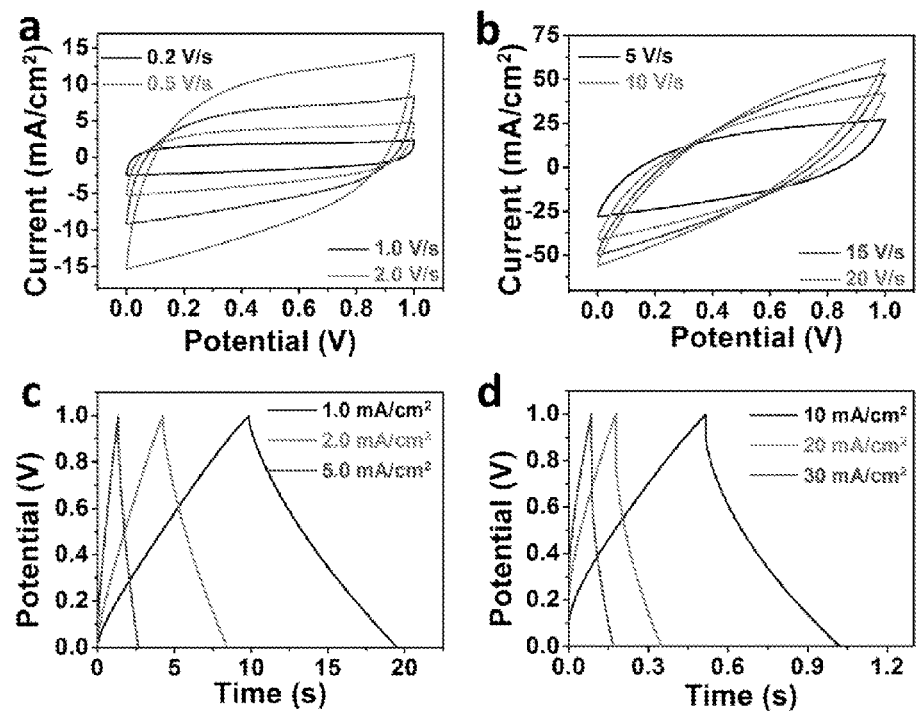
FIG. 36 provides additional electrochemical performance of 5B-LIG-MSC.

FIG. 35B shows the galvanostatic CC curves at different current densities (0.1, 0.2 and 0.5 mA/$cm^2$), all of which are nearly triangular, further confirming their optimal capacitive behaviors. Additional CV curves at higher scan rates and CC curves at higher current densities are shown in FIG. 36 to demonstrate that 5B-LIG-MSC can operate over a wide range of scan rates and current densities. The $C_A$ determined from these CC curves shows little decrease over current densities covering two orders of magnitude, with a maximum of 16.5 mF/$cm^2$ at a current density of 0.05 mA/$cm^2$, which is four times larger than that of the non-doped LIG made from the same process without $H_3BO_3$ incorporated. Furthermore, $C_A$ of 5B-LIG-MSC remains over 3 mF/$cm^2$ even when operated at a high current density of 40 mA/$cm^2$, indicating optimal power performance.

Figure 37:
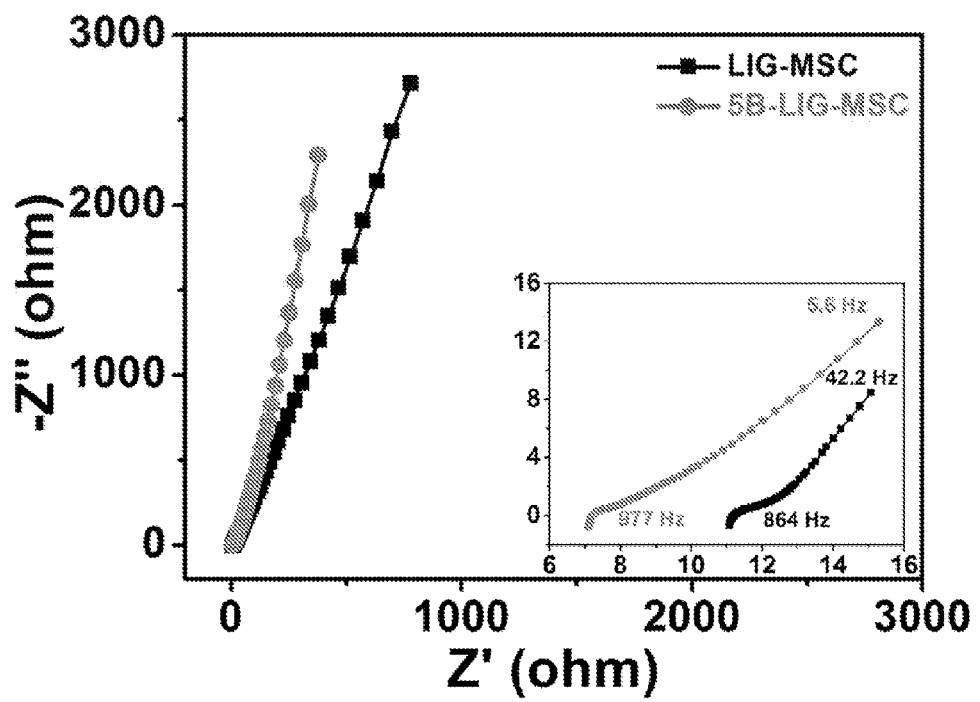
FIG. 37 provides impedance performances of LIG-MSC and 5B-LIG-MSC. The testing frequency is ranging from 10$^6$ Hz to 0.01 Hz. This typical Nyquist plot shows a small semicircle for both devices at a high frequency region, corresponding to a fast ionic transport and low external resistance of devices. At the lower frequency region, the Nyquist plot exhibits a linear part resulting from the interface between the electrolyte and the electrode. This interface results in internal resistance of devices. From this Nyquist plot, Applicants can see that 5B-LIG-MSC has both smaller external and internal resistances than LIG-MSC. These results indicate faster ionic transport and better electrode-electrolyte interface in 5B-LIG-MSC.

Electrochemical impedance measurements shown in FIG. 37 further demonstrate that both external and internal resistances of 5B-LIG-MSC are lower than that of LIG-MSC. These results indicate faster ionic transport and better electrode-electrolyte interface when the LIG material is doped with boron. The cyclability of 5B-LIG-MSCs was also tested over 12000 CC cycles at a current density of 1.0 mA/cm$^2$ with over 90% of the capacitance retained (FIG. 35D), proving high stability of performance from the B-LIG-MSC.

In addition to high $C_A$, the assembled MSC from 5B-LIG also shows optimal durability under mechanical stress. When the device was bent and fixed (FIG. 35E) at different bending radii (from 7 to 17 mm), the calculated $C_A$ from discharge runtime remained essentially constant, as shown in FIG. 35F. Furthermore, after 8000 bending cycles at a radius of 10 mm, the $C_A$ of the device was unchanged (FIG. 35G), and CV curves during different bending cycles as shown in FIG. 35H are identical to each other, suggesting that bending had little effect on the electrochemical performance of 5B-LIG-MSC.

Figure 38:
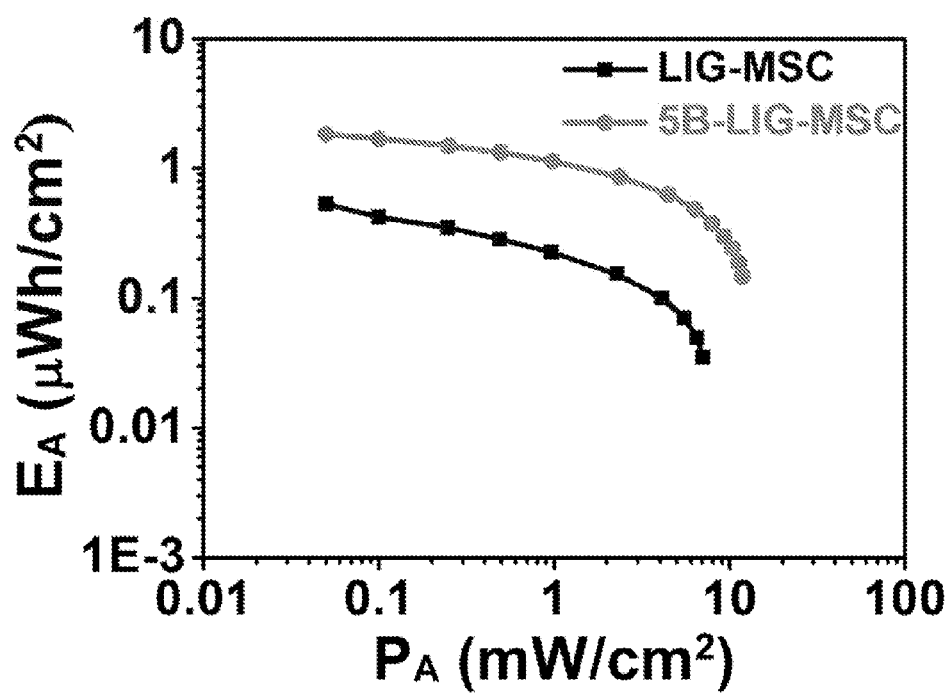
FIG. 38 provides an areal Ragone plot of 5B-LIG-MSC and LIG-MSC.

To further demonstrate the high capability of 5B-LIG-MSC over non-doped devices, a Ragone plot of volumetric power density ($P_V$) vs. energy density ($E_V$) was compared and shown in FIG. 35I. Under different $P_V$, the $E_V$ of 5B-LIG-MSC was 5 to 10 times larger than that of LIG-MSC without boron doping. To better evaluate its commercial potential, a Ragone plot of 5B-LIG-MSC with specific areal energy density and power density is also provided in FIG. 38. The remarkable electrochemical performance, cyclability over charge-discharge times, and stability under bending makes B-LIG a promising candidate as an energy storage unit for next-generation flexible and portable electronics.

In summary, Applicant report in this Example a facile and robust laser induction process to prepare boron-doped graphene structures from polyimide films, which can be used as an active material for flexible in-plane microsupercapacitors. With boron doping, the electrochemical performance of B-LIG is enhanced with three times larger areal capacitance and 5 to 10 times larger volumetric energy density at various power densities. Also, the transformation of PAA to PI is preferred for the successful formation of LIG with high quality and good electrochemical property. Meanwhile, the cyclability and flexibility of the as-prepared device is well-maintained. Considering the simplicity of material synthesis in ambient air and the easy device fabrication, boron-doped LIG materials hold promise for energy-storage devices in portable microelectronics.

Example 2.1. Materials Synthesis and Device Fabrication 7.8 g of poly(pyromellitic dianhydride-co-4,4'-oxydianiline amic acid) (PAA) solution (12.8 wt %, 575798-250ML, Sigma-Aldrich) was used as precursor solution for formation of a polyimide sheet. Various amounts of $H_3BO_3$ (B0394, Aldrich) (10 mg for 1 wt %, 20 mg for 2 wt %, 50 mg for 5 wt %, and 80 mg for 8 wt %) were added to the PAA solution with bath sonication for 30 minutes, and then poured into an aluminum dish and placed in a vacuum oven at 60° C. and a pressure of ~120 mm Hg for 3 days to evaporate the solvent. The filming process was done in a hydraulic press (Carver, No. 3912) with an applied load of $3 \times 10^5$ Pa at 200° C. for 30 minutes to dehydrate the PAA/$H_3BO_3$ and form the PI/$H_3BO_3$ sheet. Laser induction was then conducted on the PI/$H_3BO_3$ substrate with a 10.6 µm carbon dioxide ($CO_2$) laser cutter system (Universal X-660 laser cutter platform at a pulse duration of ~14 µs). The laser power was fixed at 4.8 W during laser induction. All experiments were performed under ambient conditions. To fabricate in-plane MSCs, LIG was patterned into 12 interdigitated electrodes with a length of 5 mm, a width of 1 mm, and a spacing of ~300 µm between two neighboring microelectrodes (FIG. 27B). After that, Pellco® colloidal silver paint (No. 16034, Ted Pella) was first applied on the common areas of both electrodes for better electrical contact. The electrodes were then extended with conductive copper tape which were connected to an electrochemical workstation (CHI608D, CHI Instruments) for testing.

A Kapton polyimide tape was employed to protect the common areas of the electrodes from electrolyte. Polymer electrolyte was made by stirring 10 mL of DI water, 1 mL of sulfuric acid (98%, Sigma-Aldrich), and 1 g of polyvinyl alcohol ($M_w$=50000, Aldrich No. 34158-4) at 80° C. overnight. For the MSC device, ~0.25 mL of electrolyte was dropped onto the active B-LIG area on PI substrate, followed by placing the device overnight in a desiccator that was connected to a house vacuum (~120 mm Hg) to remove excess water.

Example 2.2. Material Characterization

SEM images were obtained on a FEI Quanta 400 high resolution field emission SEM. TEM and HRTEM images were obtained using a JEOL 2100F field emission gun transmission electron microscope. TEM samples were prepared by peeling off 5B-LIG from a PI substrate, followed by sonicating them in chloroform, and dropping them onto a lacey carbon copper grid. Raman spectra were recorded on a Renishaw Raman microscope using a 514-nm laser with a power of 5 mW. XRD was conducted on a Rigaku D/Max Ultima II with Cu Kα radiation (λ=1.54 Å). The surface area of 5B-LIG was measured with a Quantachrome Autosorb-3b BET surface analyzer. TGA (Q50, TA instrument) was carried out from room temperature to 900° C. at 5° C./min under argon flow. XPS was performed using a PHI Quantera SXM Scanning X-ray Microprobe with a base pressure of $5 \times 10^{-9}$ Torr. Survey spectra were recorded in 0.5 eV step size with a pass energy of 140 eV. Elemental spectra were recorded in 0.1 eV step sizes with a pass energy of 26 eV. All the spectra were corrected using C1s peaks (284.5 eV) as references. CV and galvanostatic CC measurements were performed using a CHI 608D workstation (USA). All of measurements were conducted under ambient conditions.

Example 2.3. Calculation of Parameters as Indications for Electrochemical Performance of LIG Derived Devices The specific areal capacitances ($C_A$, in mF/cm$^2$) and volumetric capacitances ($C_V$, in F/m$^3$) from galvanostatic charge-discharge (CC) curves can be calculated by the following equations:

$$C_A = \frac{I}{S \times (dV/dt)} \quad (1)$$

$$C_V = \frac{C_A}{d} \quad (2)$$

In the above equations, I is the discharge current (in amperes); dV/dt is the slope of galvanostatic discharge curves; and S is total area of active positive and negative electrodes. Considering the dimensions of 12 such electrodes (5 mm in length and 1 mm in width), S is calculated as 0.6 cm². d is the thickness of active materials with 25 μm, as revealed in FIG. 26C inset.

The specific areal ($E_A$, in μWh/cm²) and volumetric energy densities ($E_V$, in Wh/m³) are calculated using the following equations:

$$E_A = \frac{1}{2} \times C_A \times \frac{(\Delta V)^2}{3600} \quad (3)$$

$$E_V = \frac{1}{2} \times C_V \times \frac{(\Delta V)^2}{3600} \quad (4)$$

The specific areal ($P_A$, in mW/cm²) and volumetric ($P_V$, in W/cm³) power densities are obtained from the following equations:

$$P_A = \frac{E_A}{\Delta t} \times 3600 \quad (5)$$

$$P_V = \frac{E_V}{\Delta t} \times 3600 \quad (6)$$

In the above equation, $\Delta t$ is discharge time (in seconds).

Example 3. Flexible and Stackable Laser Induced Graphene Supercapacitors

In this Example, Applicants demonstrate that laser induction can be utilized to transform commercial polyimide films into porous graphene for the fabrication of flexible, solid-state supercapacitors. Two different solid-state electrolyte supercapacitors are described, namely vertically stacked graphene supercapacitors and in-plane graphene microsupercapacitors, each with enhanced electrochemical performance, cyclability, and flexibility. Devices with a solid-state polymeric electrolyte exhibit areal capacitance of >9 mF/cm² at a current density of 0.02 mA/cm², over twice that of conventional aqueous electrolytes. Moreover, laser induction on both sides of polyimide sheets enables the fabrication of vertically stacked supercapacitors to multiply its electrochemical performance while preserving device flexibility.

In particular, Applicants demonstrate in this Example the fabrication of flexible laser induced graphene (LIG) based super capacitors (SCs) by using a solid-state polymeric electrolyte, poly(vinyl alcohol) (PVA) in $H_2SO_4$. Two flexible, solid-state SCs are described: LIG-SCs and LIG-MSCs. These devices show areal capacitance of >9 mF/cm² at a discharge current density of 0.02 mA/cm², which is over twice that achieved when using aqueous electrolytes. Furthermore, by laser induction of both sides of the PI sheets, solid state LIG-SCs can be stacked to form high density energy storage devices that multiply their electrochemical performance while maintaining flexibility.

FIG. 39A schematically illustrates the process in fabricating flexible, solid-state LIG-SCs. The process begins by first transforming the surface of a PI sheet into porous graphene under laser induction using a commercially available, computer controlled $CO_2$ laser cutting system, and then assembling either a single LIG-SC or stacked LIG-SC.

Figure 39:
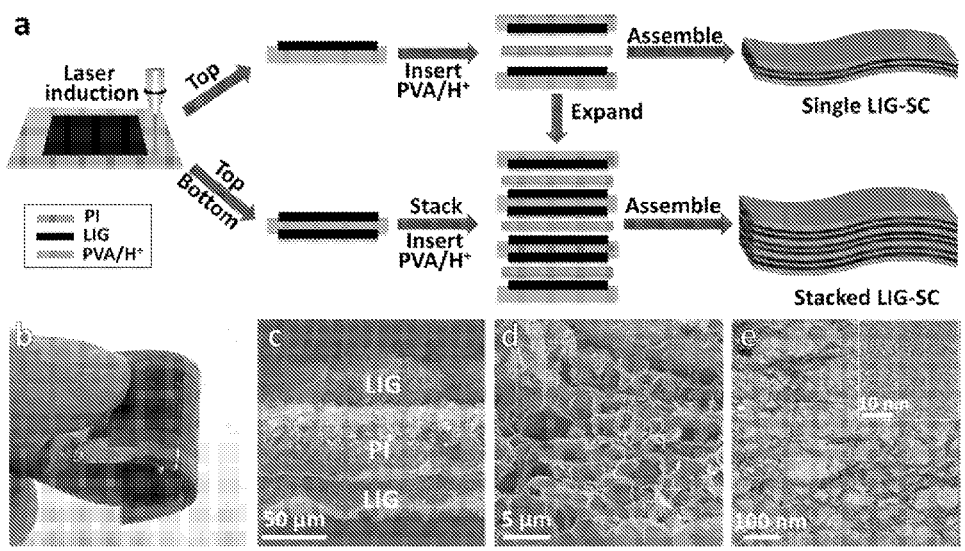
FIG. 39 provides data and illustrations relating to the fabrication and characterization of LIG super capacitors (LIG-SCs).
Figure 40:
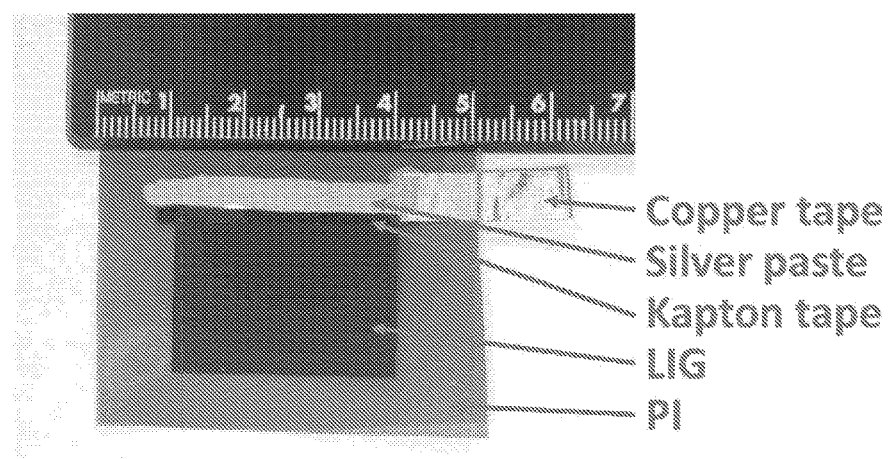
FIG. 40 is a photograph of a half-side LIG electrode for LIG-SCs.
Figure 41:
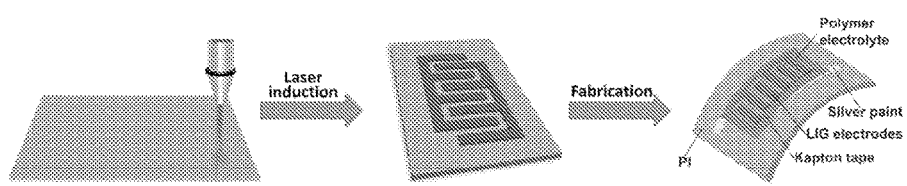
FIG. 41 is an illustration of the fabrication process of a solid-state LIG-MSC.

FIGS. 40 and 39B show the photograph of a half-side LIG electrode and a typical single LIG-SC device manually bent to demonstrate its intrinsic flexibility. An advantage of this fabrication method is that LIG can be easily produced under ambient conditions on both sides of the PI sheet with a remaining central insulating PI layer to separate them (FIG. 39C), which then facilitates layer-by-layer stacking of LIG-SCs. Alternatively, this same technique can also be used to pattern LIG into interdigitated electrodes for fabrication of solid state in-plane LIG-MSCs (FIG. 41). This one-step approach is both straightforward and cost-effective, and could easily fit into a scalable, roll-to-roll process for industrial production of graphene-based energy storage systems.

The formed LIG showed very similar morphology and graphene properties as the LIGs in Examples 1-2. FIG. 39C shows a cross sectional scanning electron microscope (SEM) image, where a thick LIG layer (~25 μm) is clearly formed on both sides of the PI substrate after laser induction and is separated by an unexposed middle PI layer that serves to electrically isolate the top and bottom LIG layers from each other. The SEM image in FIG. 39D shows the porous structure of LIG and the transmission electron microscope (TEM) image in FIG. 39E shows the nanoscale ripples and wrinkles in the LIG films. Also, the high-resolution TEM (HRTEM) image in the inset of FIG. 39E reveals that these LIG sheets contain numerous graphene edges resulting in more accessible surface area and therefore better electrochemical performance.

Figure 43:
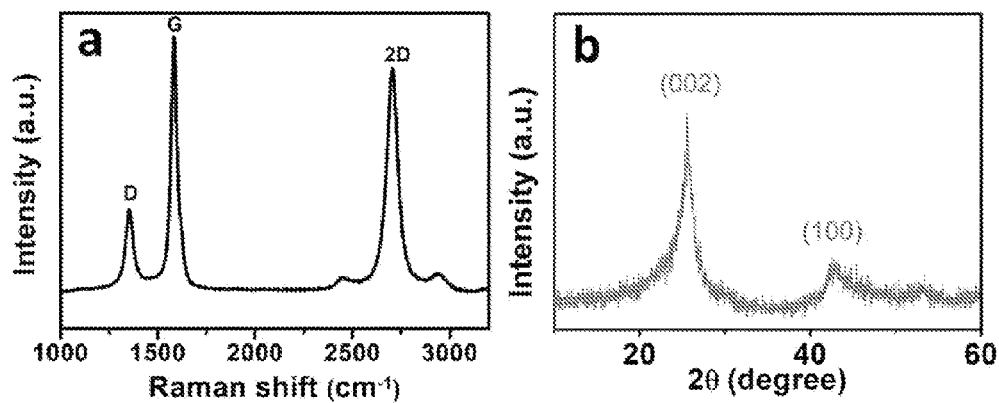
FIG. 43 provides data relating to the characterization of LIGs.

The Raman spectrum of LIG in FIG. 43A clearly shows three characteristic peaks of graphene derived material, specifically, a D peak at ~1350 cm⁻¹ induced by defects, folding or symmetry-broken carbon, G peak at ~1590 cm⁻¹ generated by graphitic carbon, and a 2D peak at ~2700 cm⁻¹ originating from second-order zone boundary phonons. Without being bound by theory, it is envisioned that the D peak could arise from numerous graphene edges existing in LIG flakes, which are also observed in the above TEM images.

Figure 44:
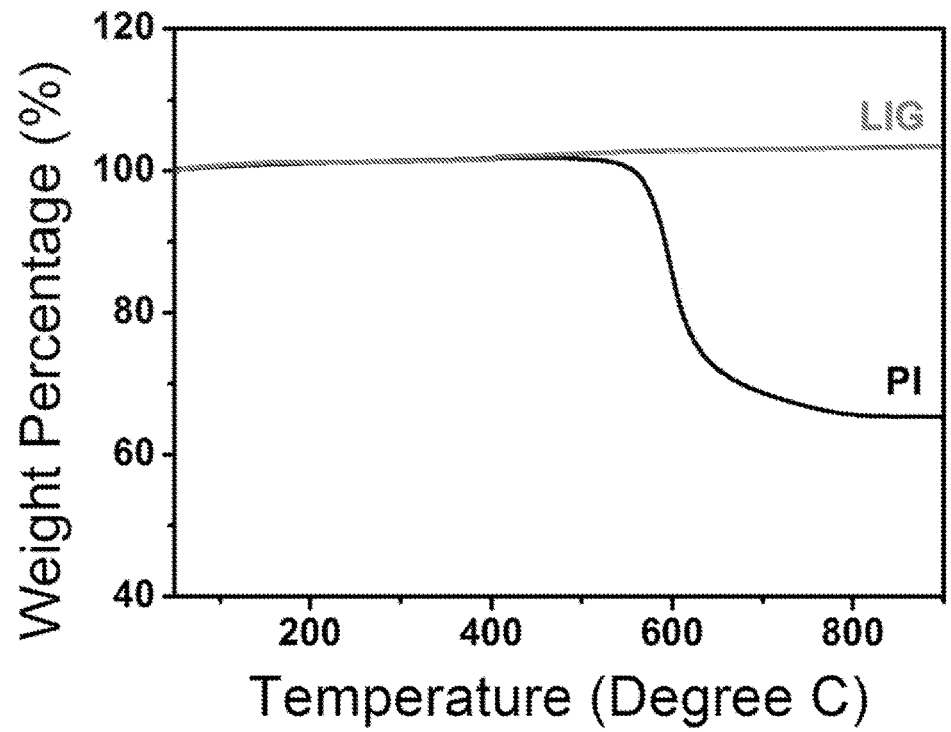
FIG. 44 provides a TGA plot of LIG and PI substrates under argon. PI starts to decompose at ~550° C., while LIG remains stable up to 900° C. The LIG for this analysis was removed from the underlying PI film as described in the Methods.
Figure 45:
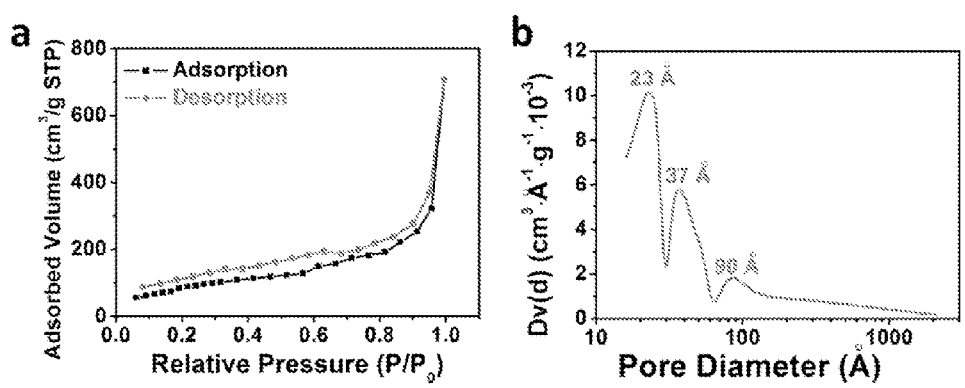
FIG. 45 provides a BET measurement of LIGs.

The XRD pattern in FIG. 43B shows a prominent peak at 2θ=25.60, indicative of an interlayer spacing of ~3.4 Å between (002) graphitic crystal planes in LIG. The high degree of graphitization of LIG is further supported by thermogravimetric analysis (TGA) under argon (FIG. 44), since PI decomposes at ~550° C., whereas LIG remains stable at >900° C. BET analysis in FIG. 45A shows that the surface area of LIG is ~330 m²/g with a pore size distribution between 2-10 nm (FIG. 45B).

To investigate its electrochemical performance, LIG was first fabricated into a flexible, single LIG-SC by sandwiching a solid, polymeric electrolyte (PVA and $H_2SO_4$) between two single-sided LIG-PI sheets which functioned both as the working electrode and current collector. The cyclic voltammetry (CV) curves shown in FIG. 42A were pseudo-rectangular over varying scan rates (5, 10, 20, and 50 mV/s), which is indicative of good EDL stability. In addition, FIG. 42B shows that when different current densities (0.02, 0.05, 0.10, and 0.20 mA/cm²) were applied, the galvanostatic charge-discharge (CC) curves were nearly triangular, indicating good capacitive behavior. From the initial stage of discharge, the negligible voltage drop shows that the device has low internal resistance.

Figure 46:
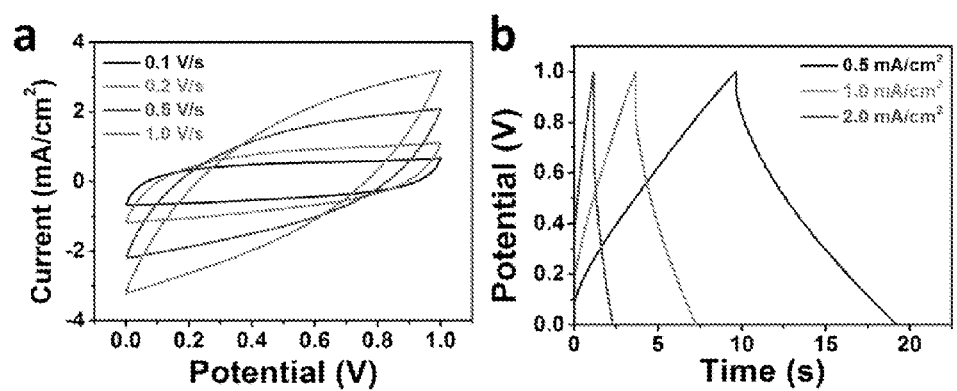
FIG. 46 provides additional electrochemical performance of a flat, single LIG-SC.

Additional CV curves at higher scan rates and CC curves at higher current densities can be found in FIG. 46 to show that LIG-SC can be charged and discharged over a wide range of scan rates (5 to 1000 mV/s) and current densities (0.02 to 2.0 mA/cm²). The calculated areal capacitances ($C_A$) from the CC curves with its corresponding current densities are shown in FIG. 42C, with the highest capacitance being 9.11 mF/cm$^2$ at a corresponding current density of 0.01 mA/cm$^2$, comparable to the values reported in the literature for graphene based microsupercapacitors (0.4 to 2 mF/cm$^2$). Also, the single LIG-SC shows excellent cycle stability, where after 8000 CC cycles, the device retained over 98% of its capacity (FIG. 42D).

Figure 47:
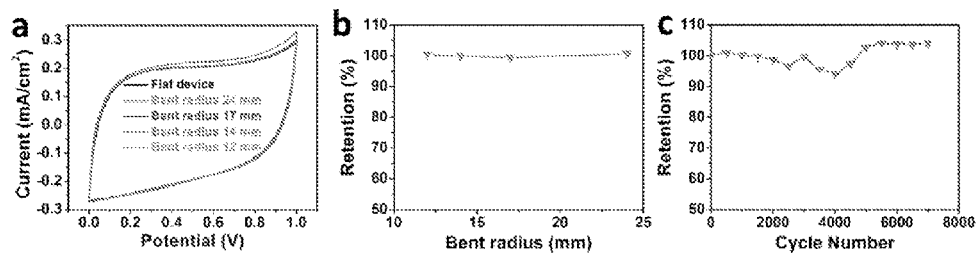
FIG. 47 provides electrochemical performance of LIG-SCs under bending.

Next, the assembled single LIG-SCs performance stability was tested under mechanical bending. FIG. 47A compares the CV curves of a flexible single LIG-SC over different bending radii (12 mm to 24 mm) and remarkably shows that the bent device exhibits nearly identical behavior to the flat LIG-SC. Also, FIG. 47B shows that the calculated $C_A$ under different bending radii remained almost constant. From FIG. 47C, the $C_A$ was well-maintained after 7000 bending cycles at a radius of 14 mm, indicating that repeated bending has little effect on its electrochemical performance. These findings further reinforce the assertion that LIG-SC is a promising candidate for energy storage devices in flexible, portable, and wearable electronics.

Figure 48:
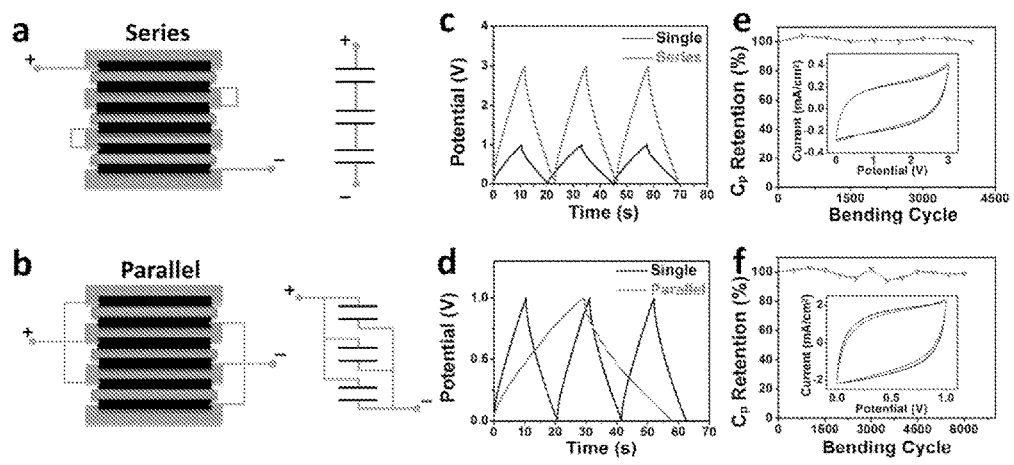
FIG. 48 provides electrochemical performances of stacked LIG-SCs in series and parallel circuits.

An additional advantage of the aforementioned method is the capability of forming LIG on both sides of an individual PI sheet, thus enabling the fabrication of stacked LIG-SC (FIG. 39). FIGS. 48A-B are illustrations of a series and parallel LIG-SC assembled from stacked solid-state LIG-SCs, where double-sided LIG sheets are layered with alternating deposits of polymeric electrolyte and capped with single-sided LIG-PI sheets. FIGS. 48C-D show the CC curves of a 3-stack solid-state series and parallel LIG-SC, respectively. Compared to a single LIG-SC, the stacked series LIG-SC has a 2× higher working voltage window, while the stacked parallel LIG-SC shows a 2× longer discharge time when operated at the same current density, resulting in a 2× higher capacitance. In both configurations, the CC curves present nearly triangular shapes with miniscule voltage drop indicating negligible internal and contact resistances.

Figure 49:
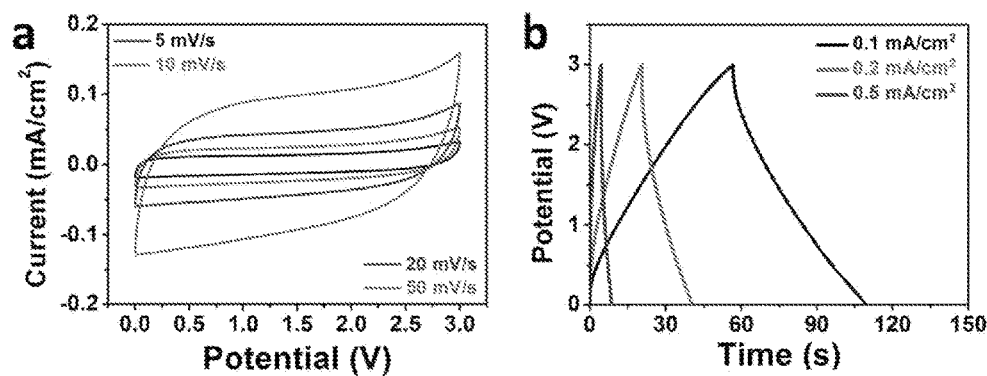
FIG. 49 provides electrochemical performances of stacked LIG-SCs in series configurations.
Figure 50:
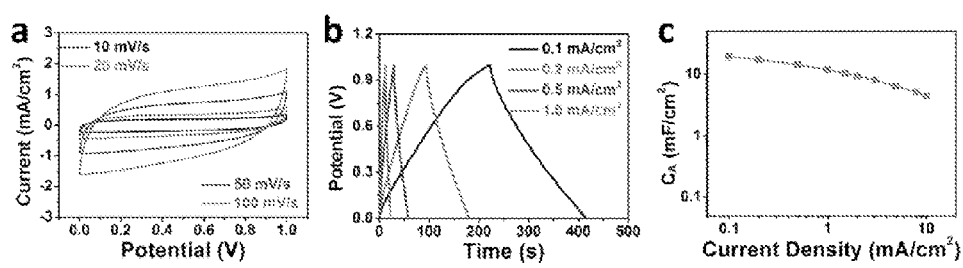
FIG. 50 provides electrochemical performance of stacked LIG-SCs in parallel.

Additional CV and CC curves at various scan rates and current densities for the stacked series and parallel LIG-SCs are shown in FIGS. 49-50 to demonstrate their remarkable durability over a wide range of scan rates and current densities. Even though the SCs are stacked, the assembled stacked LIG-SCs still show high flexibility. FIGS. 48E-F show that the capacitance of the stacked LIG-SC circuits are nearly 100% of their initial value, even after being subjected to several thousand bending cycles at a bending radius of 17 mm. Additionally, the CV curves at different bending cycles are nearly overlapped (insets of FIGS. 48E-F), indicating well maintained flexibility.

Figure 51:
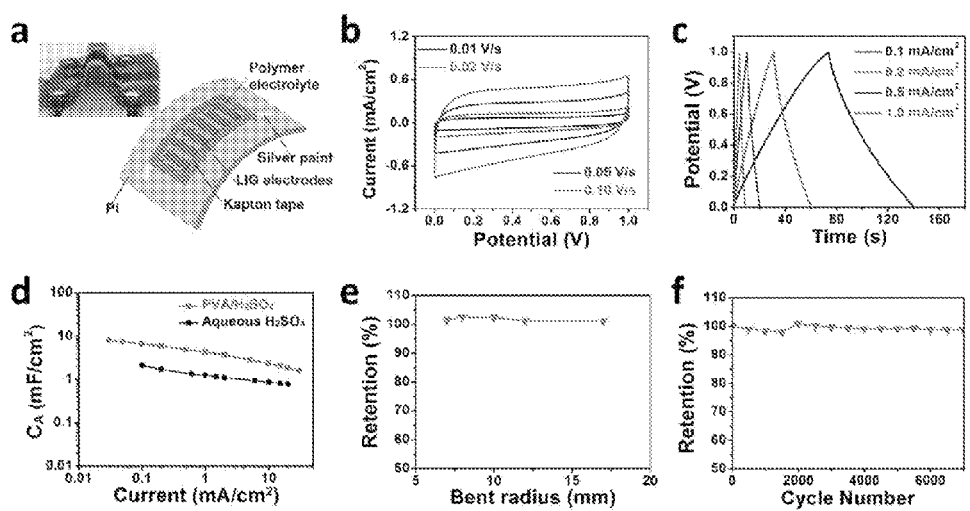
FIG. 51 provides electrochemical performances of LIG-MSC devices.
Figure 52:
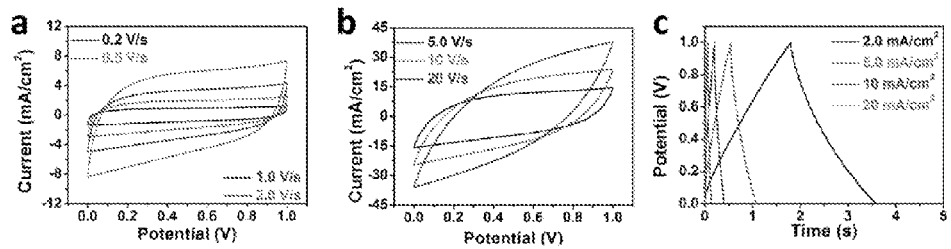
FIG. 52 provides additional data relating to the electrochemical performance of flat LIG-MSC devices.

The laser induction process can also be used to synthesize and pattern LIG into interdigitated electrodes for the fabrication of in-plane LIG-MSCs (FIG. 41). FIG. 51A is an illustration of a flexible LIG-MSC fabricated on a PI sheet that uses PVA/H$_2$SO$_4$ as solid-state electrolyte. FIG. 51B shows CV curves of the LIG-MSC device at different scan rates (0.01, 0.02, 0.05 and 0.1 V/s) with stable pseudo-rectangular shape due to good EDL formation. FIG. 51C shows the galvanostatic CC curves of LIG-MSCs at different current densities (0.1, 0.2, 0.5 and 1.0 mA/cm$^2$), all of which are nearly triangular due to their optimal capacitive behaviors. FIG. 52 shows additional CV curves at higher scan rates and CC curves at higher current densities. The calculated $C_A$ from CC curves at different current densities are plotted in FIG. 51D, where the devices strikingly exhibit a capacitance of greater than 9 mF/cm$^2$ at a current density of 0.02 mA/cm$^2$. Interestingly, at the same current densities the capacitances of the solid-state LIG-MSCs are twice that of aqueous H$_2$SO$_4$ electrolyte LIG-MSCs. Without being bound by theory, it is envisioned that this improvement could come from the high hydrophobicity of the LIG material and better interface formation between LIG electrodes and the organic polymer electrolyte.

Figure 53:
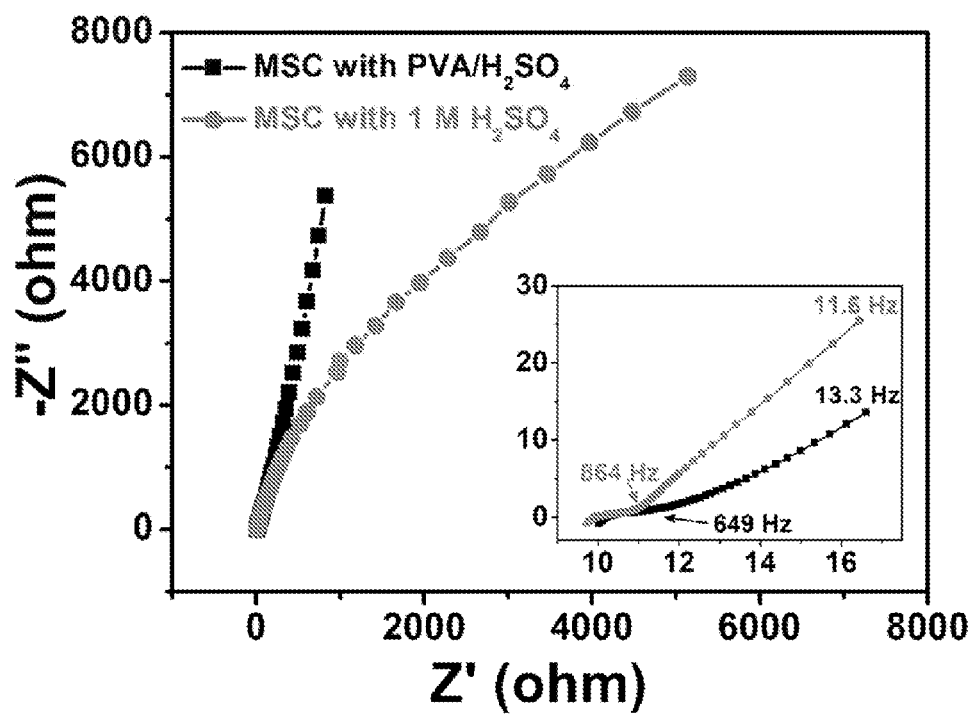
FIG. 53 provides impedance performances of LIG-MSCs with aqueous 1 M $H_2SO_4$ and PVA/$H_2SO_4$ electrolyte. This typical Nyquist plot shows a small semicircle at a high frequency region that corresponds to the ionic transport which contributes to the external resistance of the device. The lower frequency region of the Nyquist plot exhibits linearity due to the interaction between the electrolyte and electrode. This interface results in internal resistance of the device. From this Nyquist plot, Applicants can see that LIG-MSC in PVA/$H_2SO_4$ has both a smaller external and internal resistance than those in aqueous $H_2SO_4$. These results indicate faster ionic transport and better electrode-electrolyte interface in LIG-MSCs using PVA/$H_2SO_4$.
Figure 54:
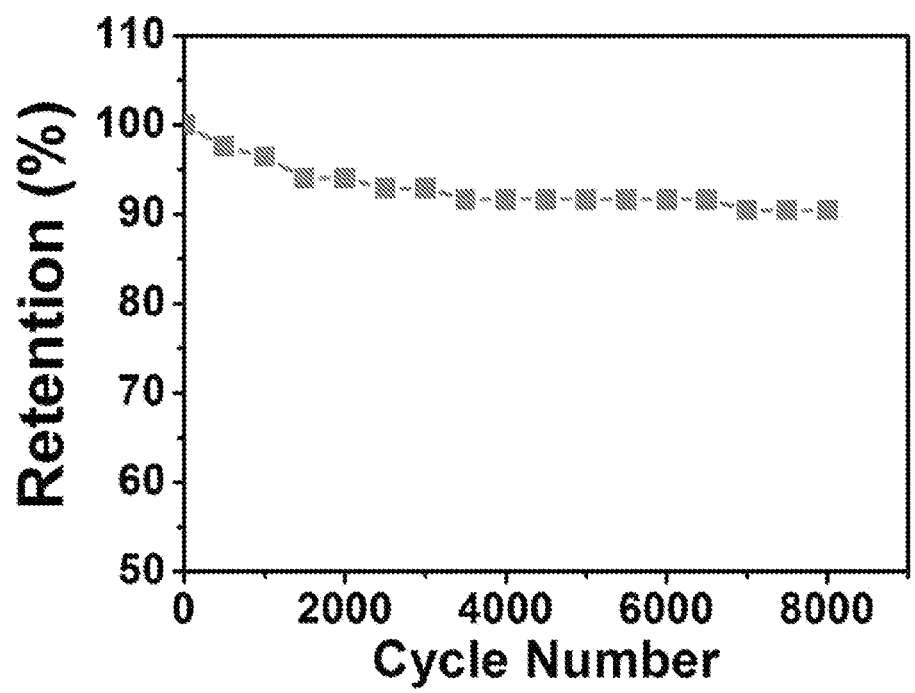
FIG. 54 provides data relating to the cyclability test of LIG-MSCs. The CC current density was set at 1.0 mA/cm². The capacitance remained >90% after 8000 cycles.
Figure 55:
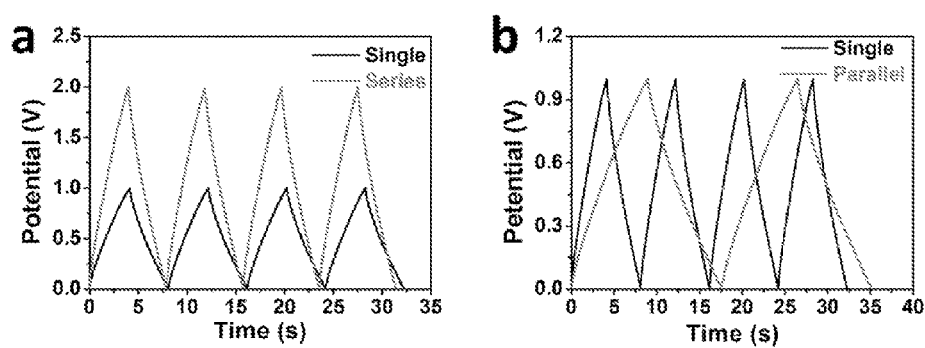
FIG. 55 provides electrochemical performance of LIG-MSCs in series or parallel combinations.

Furthermore, capacitance of the solid-state LIG-MSCs remains over 1.9 mF/cm$^2$, even when operated at a higher current density of 30 mA/cm$^2$, indicating high power performance of the device. Electrochemical impedance measurements (FIG. 53) further support faster ionic transport and better electrode-electrolyte interface in LIG-MSCs using PVA/H$_2$SO$_4$ as the electrolyte. The near absence of the semicircle in the case of MSCs with PVA/H$^+$ implies that there is high ionic conductivity at the interface of the LIG electrode and polymer electrolyte. Also, the higher slope in the Nyquist plot for MSCs with PVA/H$^+$ indicates that they have more capacitive behavior. The cyclability of solid-state LIG-MSCs was also tested over 8000 CC cycles with <10% capacitance degradation (FIG. 54). In order to test their circuit performance, two single LIG-MSC devices were connected in either series or parallel configurations as shown in FIG. 55. As expected, the working voltage was doubled when LIG-MSCs were in series, while the discharge runtime increased nearly 100% when LIG-MSCs were in parallel. In both cases, due to the solid-state electrolyte, the CC curves maintained their triangular shape and the LIG-MSC showed outstanding flexibility (FIG. 51A inset).

Figure 56:
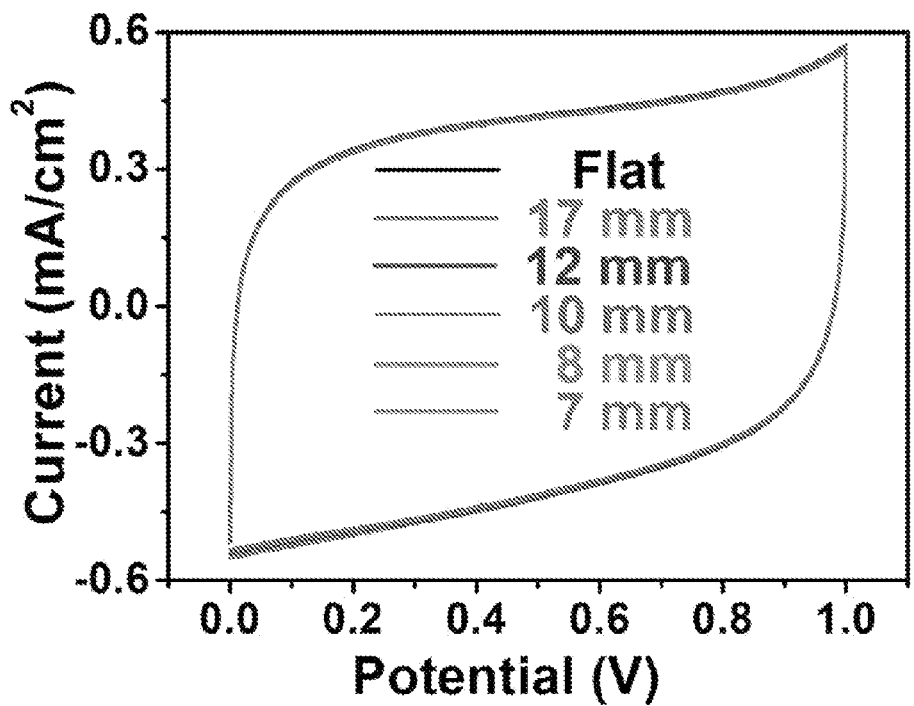
FIG. 56 provides CV curves of the flexible LIG-MSC at different bending radius. The scan rate is set at 0.1 V/s.

FIG. 51E shows that the in-plane LIG-MSCs made from LIG exhibits nearly 100% of its calculated capacitance regardless of bending radii. Similar to the single LIG-SC, CV curves of LIG-MSC over different bending radii are almost identical to the ones in the flat devices (FIG. 56). After 7000 bending cycles, the capacitance remained at its initial value (FIG. 51F), further supporting the universality of this laser induction method in producing energy storage units.

Figure 57:
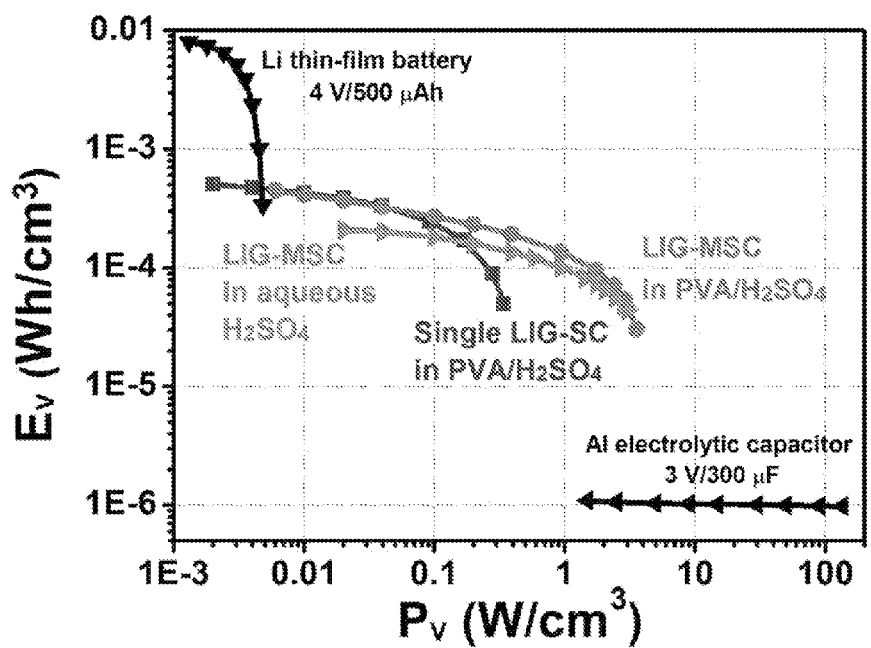
FIG. 57 provides Ragone plots of single LIG-SC, LIG-MSC and commercial energy storage devices.
Figure 58:
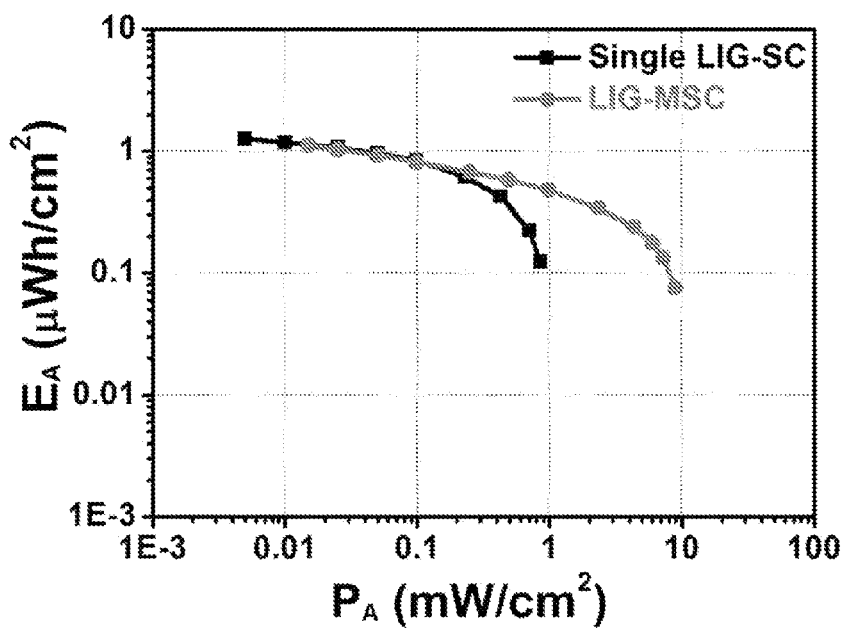
FIG. 58 provides Ragone plots of single LIG-SC and LIG-MSC in specific areal energy and power densities.

Finally, FIG. 57 is a Ragone plot comparing single LIG-SCs and LIG-MSCs in either aqueous or solid-state polymeric electrolytes to commercially available electrolytic capacitors and Li thin film batteries. Although aluminum (Al) electrolytic capacitors deliver ultrahigh power, their energy density is two orders of magnitude lower than LIG-derived devices. Similarly, although lithium ion thin-film batteries can provide high energy density, their power performance is three orders of magnitude lower than either single LIG-SCs or LIG-MSCs. Interestingly, when compared to LIG-MSC using 1 M aqueous H$_2$SO$_4$ as the electrolyte, LIG-MSC with a solid-state polymer electrolyte stores ~2× more energy. Also, a comparison between single LIG-SCs and LIG-MSCs shows that LIG-MSCs have a higher power density than LIG-SC, likely due to the reduced ion diffusion length between the microelectrodes in the LIG-MSC device. Ragone plots of single LIG-SCs and LIG-MSCs with specific areal energy density and power density are also provided in FIG. 58 to better evaluate their commercial application potential.

In summary, Applicants have demonstrated that by using a laser induction process, commercially available polyimide substrates can be readily transformed into LIG and then fabricated into flexible and stackable SCs with enhanced capacitive performance. Two different devices, LIG-SCs and LIG-MSCs, were fabricated using PVA/H$_2$SO$_4$ as a solid polymeric electrolyte and showed outstanding electrochemical performance, cyclability, and flexibility. The facile fabrication process lends itself well to commercial scalability.

Example 3.1. Materials Production and LIG Supercapacitor Fabrication

Kapton polyimide (PI, Cat. No. 2271K3, thickness: 0.005") was purchased from McMaster-Carr and used as received unless noted otherwise. Laser induction of graphene was conducted with a 10.6 µm $CO_2$ laser system (Universal X-660 laser cutter platform) at a pulse duration of ~14 µs. All experiments were conducted under ambient conditions using 4.8 W of laser power. Two types of LIG based SCs were fabricated: single or stacked LIG-SCs and in-plane LIG-MSCs. For single or stacked LIG-SCs, LIG was produced either on one side or both sides of the PI sheet with an active area of 2 cm×3 cm, whereas for MSCs, LIG was patterned into interdigitated electrodes with a length of 5 mm, a width of 1 mm, and a spacing of ~300 µm between two neighboring microelectrodes.

Figure 42:
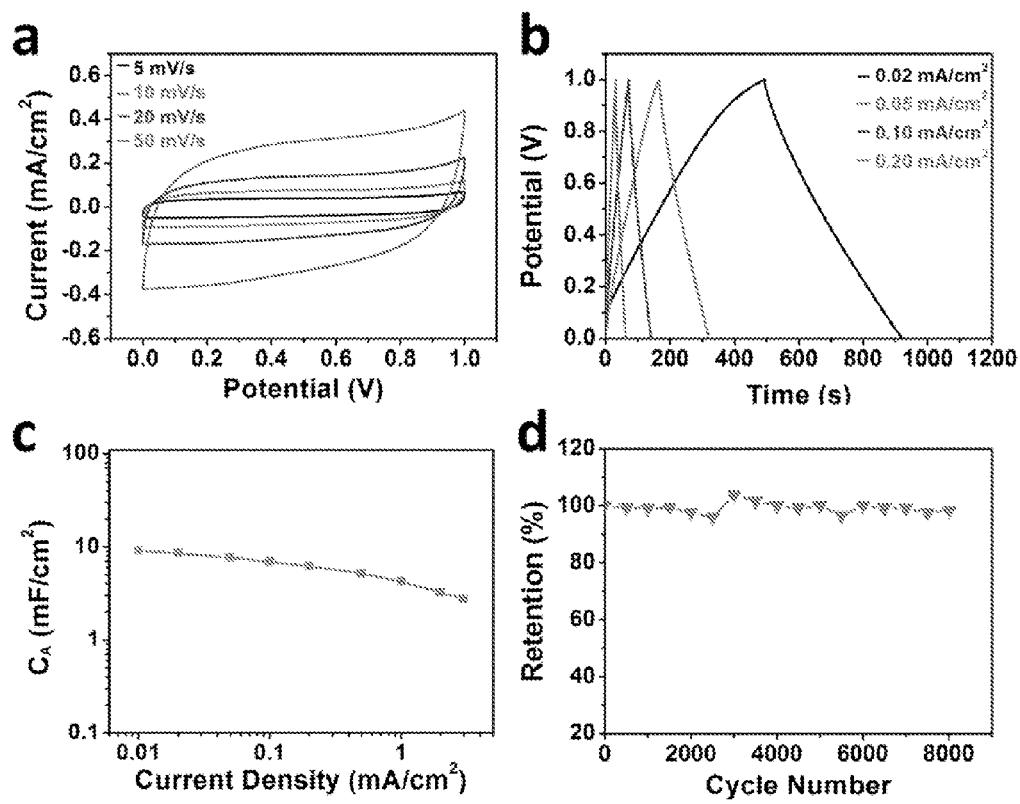
FIG. 42 provides data relating to an electrochemical performance of a single LIG-SC.

In both types of structures, Pellco® colloidal silver paint (No. 16034, Ted Pella) was applied on the common areas of each electrode for better electrical contacts. The electrodes were then extended with conductive copper tape and connected to an electrochemical workstation. A Kapton PI tape was employed to protect the common areas of the electrodes from electrolyte (FIGS. 41-42). Polymer electrolyte was made by mixing and stirring 10 mL of DI water, 1 mL of sulfuric acid (98%, Sigma-Aldrich), and 1 g of polyvinyl alcohol ($M_w$=50000, Aldrich No. 34158-4) at 80° C. overnight.

Solid-state LIG-SCs were fabricated by dropping ~1 mL of PVA-$H_2SO_4$ onto a LIG-PI substrate and then sandwiching it with a second LIG-PI substrate. Finally, the device was placed in a desiccator that was connected to house vacuum (~10 mmHg) to remove excess water overnight. For LIG-MSC devices, ~0.25 mL of PVA-$H_2SO_4$ was dropped onto the active LIG area on the PI substrate, followed by placing the device overnight in a desiccator that was connected to house vacuum to remove excess water. For comparison, the MSCs with aqueous electrolyte were also fabricated by dropping ~0.2 mL 1 M $H_2SO_4$ onto the active LIG on PI sheets.

Example 3.2. Characterization

SEM images were taken on a FEI Quanta 400 high resolution field emission SEM. The TEM and HRTEM images were taken using a JEOL 2100F field emission gun transmission electron microscope. TEM samples were prepared by peeling off LIG from the PI substrate, followed by sonicating them in chloroform, and dropping them onto a lacey carbon copper grid. Raman spectra were recorded on a Renishaw Raman microscope using 514-nm laser with a power of 5 mW. XRD was conducted on a Rigaku D/Max Ultima II with Cu Kα radiation (λ=1.54 Å). The surface area of LIG was measured with a Quantachrome Autosorb-3b BET surface analyzer. TGA (Q50, TA instrument) was carried out at room temperature to 900° C. at 5° C./min under argon. CV and constant current CC measurements were conducted under ambient conditions using a CHI 608D workstation (USA).

Example 3.3. Calculation of Parameters as Indications for the Electrochemical Performance of LIG Based Devices The specific areal capacitances ($C_A$, in mF/cm²) and volumetric capacitances ($C_V$, in F/m³) from galvanostatic charge-discharge (CC) curves can be calculated using Equations 1 and 2:

$$C_A = \frac{I}{S \times (dV/dt)} \quad (1)$$

$$C_V = \frac{C_A}{d} \quad (2)$$

In the above equations, I is the discharge current (in amperes), dV/dt is the slope of the galvanostatic discharge curve immediately following the voltage drop, S is the total area of the active positive and negative electrodes. In LIG-SC, S is the active area of LIG (2 cm×3 cm=6 cm²). As for LIG-MSC, S is the total area of LIG microelectrodes (0.05 cm²×12=0.6 cm²). d is the thickness of active materials with 25 µm as indicated in the FIG. 39C inset. The specific areal ($E_A$, in µWh/cm²) and volumetric energy densities ($E_V$, in Wh/m³) are calculated in Equations 3 and 4:

$$E_A = \frac{1}{2} \times C_A \times \frac{(\Delta V)^2}{3600} \quad (3)$$

$$E_V = \frac{1}{2} \times C_V \times \frac{(\Delta V)^2}{3600} \quad (4)$$

The specific areal ($P_A$, in mW/cm²) and volumetric ($P_V$, in W/cm³) power densities are obtained from Equations 5 and 6:

$$P_A = \frac{E_A}{\Delta t} \times 3600 \quad (5)$$

$$P_V = \frac{E_V}{\Delta t} \times 3600 \quad (6)$$

In the aforementioned equations, Δt is discharge time (in s).

Example 4. Effect of Controlling Wavelength for Production of Laser Induced Graphene Rapid heating of polyimides by absorption of a focused $CO_2$ laser beam is an exemplary process by which a polymer is converted into a graphene material. In some embodiments, the $CO_2$ laser overlaps with a vibrational absorption band of the polyimide, which is preferred for the conversion of the laser beam into heat. The energy density depends on both the spot size and the penetration depth of the beam into the material. Assuming equal spot sizes, when the beam is strongly absorbed, the energy is deposited in a thinner layer, leading to more rapid heating. On the other hand, weak absorption will lead to a larger volume absorbing the light, slower heating and less efficient conversion to graphene. In situations where greater penetration of the graphene formation is desired, the laser intensity may be increased either by focusing more tightly or increasing the laser power to produce the necessary energy density. The penetration depth, or absorption depth, is controlled by the wavelength of the laser. Hence, a wavelength-tunable laser is important for controlling the depth of the graphene formation, and thereby introduces the capability for making 3-dimensional structures in the LIG films. Furthermore, one can use a two-photon process, wherein multiple photons (e.g., two photons) cross to induce localized heating in a 3D block, for 3D printing methods.

FIG. 59 provides an absorption spectrum of a polyimide film. The spectrum shows a strong absorption band in the 9 to 11 micrometer range. The four solid lines represent center wavelength of the of two rotational-vibrational branches for two vibrational bands of the tunable $CO_2$ laser. The center frequency of each band is 9.3, 9.5, 10.3 and 10.6 micrometers. Each of these four bands consists of a number of rotational lines, which are individually selectable. This is represented by the dotted lines on either side of the solid line on the spectrum in FIG. 59. The 9.3 micrometer band has a tuning range of ≈0.15 micrometers, and the other three bands have tuning ranges of ≈0.2 micrometers.

The availability to choose from many wavelengths allows selection of a wide range of penetration depths into a polymer film by changing the wavelength of the laser (e.g., $CO_2$ laser). This also provides a mechanism to make vertical 3D structures into a polymer film. A strongly absorbed wavelength is focused on the surface to create a narrow and shallow line of LIG. Then the focus is shifted to below the surface, and the laser wavelength is changed to allow greater penetration. Next, the partially attenuated converging beam now coming to a focus below the LIG line already made. The porous LIG material allows the gases to escape as more LIG is generated below the surface layer. The process can be repeated with an even deeper focus and the laser tuned further off-resonance for greater penetration. This way, vertical structures such as deeper lines are created. One way to optimize the generation of such 3D structures is that the incoming beam is divided into two parts, which straddle the first shallow line and pass on either side as they converge to the subsurface focal point. The focal point may be shifted off the axis of the initial graphene line on the surface to provide subsurface "tunneling", as long as there is a channel of porous graphene for the gases to escape.

An alternative way to construct 3D structures is to add a new layer of polymer film or liquid precursor by spraying or flooding the surface. Then the focal point is moved up to generate a new LIG line on top of the existing LIG material below. Since the added liquid or sprayed-on material may have a different absorption strength than the LIG material already formed, then the wavelength is optimized to form LIG in the newly deposited material.

Figure 60:
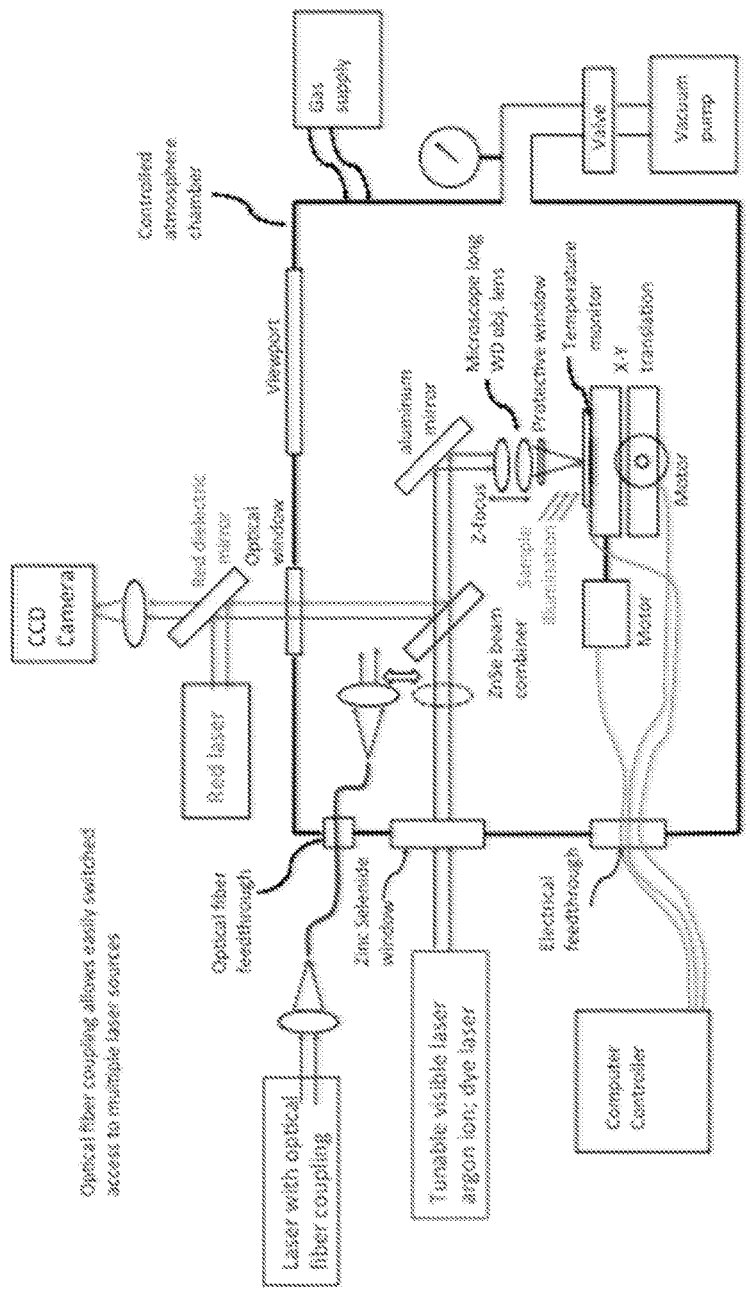
FIG. 60 is a drawing showing the use of visible lasers and an option of coupling into a controlled atmosphere chamber with an optical fiber.

FIG. 60 is a drawing showing the use of visible lasers and an option of coupling into a controlled atmosphere chamber with an optical fiber. This permits the careful control of the environment in the chamber for termination of the graphene edges with specific gases, and for the use of multiple laser sources. The optical fiber coupling could also be used with an NSOM (not illustrated). Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of producing a graphene material, wherein the method comprises:

exposing a polymer to a laser source,
    wherein the polymer is in the form of a substrate, and
    wherein the polymer lacks graphene oxide and graphite oxide; and
    wherein the exposing results in formation of graphene, and wherein the graphene is derived from the polymer.

2. The method of claim 1, wherein the exposing comprises tuning one or more parameters of the laser source.

3. The method of claim 2, wherein the one or more parameters of the laser source are selected from the group consisting of laser wavelength, laser power, laser energy density, laser pulse width, gas environment, gas pressure, gas flow rate, and combinations thereof.

4. The method of claim 2, wherein a wavelength of the laser source is tuned to match an absorbance band of the polymer.

5. The method of claim 1, wherein the polymer is chosen such that an absorbance band of the polymer matches the excitation wavelength of the laser source.

6. The method of claim 1, wherein the laser source is selected from the group consisting of a solid state laser source, a gas phase laser source, an infrared laser source, a $CO_2$ laser source, a UV laser source, a visible laser source, a fiber laser source, near-field scanning optical microscopy laser source, and combinations thereof.

7. The method of claim 1, wherein the laser source is a $CO_2$ laser source.

8. The method of claim 1, wherein the laser source has a wavelength ranging from about 20 nm to about 100 μm.

9. The method of claim 1, wherein the laser source has a power ranging from about 1 W to about 100 W.

10. The method of claim 1, wherein the polymer is in the form of at least one of sheets, films pellets, powders, coupons, blocks, monolithic blocks, composites, fabricated parts, electronic circuit substrates, and combinations thereof.

11. The method of claim 1, wherein the polymer is selected from the group consisting of homopolymers, vinyl polymers, block co-polymers, carbonized polymers, aromatic polymers, cyclic polymers, polyimide (PI), polyetherimide (PEI), polyether ether ketone (PEEK), and combinations thereof.

12. The method of claim 1, wherein the polymer comprises a doped polymer.

13. The method of claim 12, wherein the doped polymer comprises a dopant selected from the group consisting of heteroatoms, metals, metal oxides, metal chalcogenides, metal nanoparticles, metal salts, organic additives, inorganic additives, metal organic compounds, and combinations thereof.

14. The method of claim 1, wherein the polymer comprises a boron doped polymer.

15. The method of claim 1, wherein the exposing comprises exposing a surface of a polymer to a laser source, wherein the exposing results in formation of the graphene on the surface of the polymer.

16. The method of claim 15, wherein the exposing comprises patterning the surface of the polymer with the graphene.

17. The method of claim 15, wherein the graphene becomes embedded with the polymer.

18. The method of claim 15, wherein the polymer comprises a first surface and a second surface, wherein the first surface is exposed to the laser source, and wherein the graphene forms on the first surface of the polymer.

19. The method of claim 18, wherein the first surface and the second surface are exposed to the laser source, and wherein the graphene forms on the first surface and the second surface of the polymer.

20. The method of claim 18, wherein the first surface and the second surface are on opposite sides of the polymer.

21. The method of claim 1, wherein the exposing results in conversion of the entire polymer to graphene.

22. The method of claim 1, wherein the formed graphene material consists essentially of the graphene derived from the polymer.

23. The method of claim 1, wherein the graphene is selected from the group consisting of single-layered graphene, multi-layered graphene, double-layered graphene, triple-layered graphene, doped graphene, porous graphene, unfunctionalized graphene, pristine graphene, functionalized graphene, oxidized graphene, turbostratic graphene, graphene coated with metal nanoparticles, metal particles coated with graphene, graphene metal carbides, graphene metal oxides, graphene metal chalcogenides, and combinations thereof.

24. The method of claim 1, wherein the graphene comprises porous graphene.

25. The method of claim 1, wherein the graphene comprises doped graphene.

26. The method of claim 25, wherein the doped graphene comprises a dopant selected from the group consisting of heteroatoms, metals, metal oxides, metal nanoparticles, metal chalcogenides, metal salts, organic additives, inorganic additives, and combinations thereof.

27. The method of claim 1, wherein the graphene comprises boron-doped graphene.

28. The method of claim 1, wherein the graphene has a surface area ranging from about 100 $m^2/g$ to about 3,000 $m^2/g$.

29. The method of claim 1, wherein the graphene has a thickness ranging from about 0.3 nm to about 1 cm.

30. The method of claim 1, wherein the graphene comprises a polycrystalline lattice.

31. The method of claim 30, wherein the polycrystalline lattice comprises ring structures selected from the group consisting of hexagons, heptagons, pentagons, and combinations thereof.

32. The method of claim 1, further comprising a step of incorporating the graphene material into an electronic device.

33. The method of claim 32, wherein the electronic device is an energy storage device or an energy generation device.

34. The method of claim 32, wherein the electronic device is selected from the group consisting of super capacitors, micro supercapacitors, pseudo capacitors, batteries, micro batteries, lithium-ion batteries, sodium-ion batteries, magnesium-ion batteries, electrodes, conductive electrodes, sensors, photovoltaic devices, electronic circuits, fuel cell devices, thermal management devices, biomedical devices, and combinations thereof.

35. The method of claim 32, wherein the incorporating comprises stacking a plurality of graphene materials, wherein the stacking results in formation of a vertically stacked electronic device.

36. The method of claim 32, wherein the incorporating results in formation of at least one of vertically stacked electronic devices, in-plane electronic devices, symmetric electronic devices, asymmetric electronic devices, and combinations thereof.

37. The method of claim 32, wherein the graphene is utilized as at least one of an electrode, current collector or additive in the electronic device.

38. The method of claim 32, further comprising a step of associating the electronic device with an electrolyte.

39. The method of claim 38, wherein the electrolyte is selected from the group consisting of solid state electrolytes, liquid electrolytes, aqueous electrolytes, organic salt electrolytes, ion liquid electrolytes, and combinations thereof.

40. The method of claim 38, wherein the electrolyte is a solid state electrolyte.

41. The method of claim 32, wherein the electronic device has a capacitance ranging from about 2 $mF/cm^2$ to about 1000 $mF/cm^2$.

42. The method of claim 32, wherein the capacitance of the electronic device retains at least 90% of its original value after more than 10,000 cycles.

43. The method of claim 32, wherein the electronic device has power densities ranging from about 5 $mW/cm^2$ to about 200 $mW/cm^2$.

44. The method of claim 1, further comprising a step of separating the formed graphene from the polymer to form an isolated graphene.

45. The method of claim 44, further comprising a step of incorporating the isolated graphene into an electronic device.

* * * * *